US011660896B2

(12) United States Patent
Parab et al.

(10) Patent No.: US 11,660,896 B2
(45) Date of Patent: May 30, 2023

(54) APPARATUSES AND METHODS FOR PRINTING SECURITY DOCUMENTS

(71) Applicant: DE LA RUE INTERNATIONAL LIMITED, Basingstoke (GB)

(72) Inventors: Nikhil Parab, Basingstoke (GB); Andrew Francis Wallis, Basingstoke (GB); Martin Bannon, Basingstoke (GB); Miguel Augusto Da Silva Moura, Basingstoke (GB)

(73) Assignee: DE LA RUE INTERNATIONAL LIMITED, Hampshire (GB)

( * ) Notice: Subject to any disclaimer, the term of this patent is extended or adjusted under 35 U.S.C. 154(b) by 0 days.

(21) Appl. No.: 17/288,678

(22) PCT Filed: Oct. 25, 2019

(86) PCT No.: PCT/GB2019/053039
§ 371 (c)(1),
(2) Date: Apr. 26, 2021

(87) PCT Pub. No.: WO2020/084320
PCT Pub. Date: Apr. 30, 2020

(65) Prior Publication Data

US 2022/0118789 A1 Apr. 21, 2022

(30) Foreign Application Priority Data

Oct. 26, 2018 (GB) ..................................... 1817461
Jul. 8, 2019 (GB) ..................................... 1909767

(51) Int. Cl.
*B32B 3/10* (2006.01)
*B41M 3/14* (2006.01)
(Continued)

(52) U.S. Cl.
CPC .............. *B41M 3/144* (2013.01); *B41J 3/543* (2013.01); *B41M 3/14* (2013.01); *B42D 25/305* (2014.10); *B42D 25/378* (2014.10); *B42D 25/373* (2014.10)

(58) Field of Classification Search
None
See application file for complete search history.

(56) References Cited

U.S. PATENT DOCUMENTS 5,734,800 A 3/1998 Herbert et al.
5,764,254 A 6/1998 Nicoloff, Jr. et al.
(Continued)

FOREIGN PATENT DOCUMENTS

EP 0730968 A1 9/1996
EP 0 916 494 A2 5/1999
(Continued)

OTHER PUBLICATIONS

Nov. 15, 2021 Office Action issued in British Patent Application No. 1915537.3.
(Continued)

*Primary Examiner* — Christopher M Polley
(74) *Attorney, Agent, or Firm* — Oliff PLC

(57) ABSTRACT

A digitally printed security document includes: a security document substrate; a first digitally printed print working on a first surface of the substrate in a first region, the first print working including a first array of printed elements arranged according to a first grid of lattice points having a first pitch; and a second digitally printed print working on the first surface of the substrate in a second region, the second print working including a second array of printed elements arranged across a second grid of lattice points having a second pitch different from the first pitch.

16 Claims, 23 Drawing Sheets

(51) Int. Cl.

| | |
|---|---|
| ***B41J 3/54*** | (2006.01) |
| ***B42D 25/305*** | (2014.01) |
| ***B42D 25/378*** | (2014.01) |
| *B42D 25/373* | (2014.01) |

(56) References Cited

U.S. PATENT DOCUMENTS

| | | | |
|---|---|---|---|
| 5,764,264 | A | 6/1998 | Takanaka |
| 6,017,113 | A | 1/2000 | Nicoloff, Jr. et al. |
| 6,149,257 | A | 11/2000 | Yanaka et al. |
| 6,254,218 | B1 | 7/2001 | Suzuki et al. |
| 6,375,294 | B1 | 4/2002 | Kneezel |
| 7,125,091 | B2 | 10/2006 | Huang et al. |
| 7,794,077 | B2 | 9/2010 | Falser et al. |
| 2001/0015734 | A1 | 8/2001 | Kanda et al. |
| 2004/0189772 | A1 | 9/2004 | Arai |
| 2009/0141074 | A1 | 6/2009 | Kubo et al. |
| 2010/0238511 | A1 | 9/2010 | Neese |
| 2011/0227973 | A1 | 9/2011 | Larson et al. |
| 2015/0091959 | A1 | 4/2015 | Ishida |
| 2015/0266330 | A1 | 9/2015 | Peinze et al. |
| 2017/0080705 | A1 | 3/2017 | Shmaiser et al. |

FOREIGN PATENT DOCUMENTS

| | | | | | |
|---|---|---|---|---|---|
| EP | 1176021 | A1 | | 1/2002 | |
| EP | 1 880 865 | A2 | | 1/2008 | |
| GB | 2416518 | A | | 2/2006 | |
| GB | 2554498 | A | * | 4/2018 | ............. B42D 25/29 |
| JP | S58217364 | A | | 12/1983 | |
| JP | H06328736 | A | | 11/1994 | |
| JP | H09156133 | A | | 6/1997 | |
| JP | H1044473 | A | | 2/1998 | |
| JP | 2005-88548 | A | | 4/2005 | |
| JP | 2006035492 | A | | 2/2006 | |
| WO | 91/11877 | A1 | | 8/1991 | |
| WO | 9634763 | A1 | | 11/1996 | |
| WO | 01/87632 | A1 | | 11/2001 | |
| WO | WO-0187632 | A1 | * | 11/2001 | ............. B41M 3/14 |
| WO | 2011/135344 | A1 | | 11/2011 | |
| WO | 2018/011546 | A1 | | 1/2018 | |
| WO | 2018/142128 | A1 | | 8/2018 | |

OTHER PUBLICATIONS

Mar. 31, 2020 International Search Report issued in International Patent Application No. PCT/GB2019/053039.

Mar. 27, 2020 International Search Report issued in International Patent Application No. PCT/GB2019/053040.

Akira Asai et al., "Impact of an Ink Drop on Paper" Journal of Imaging Science and Technology, vol. 37, pp. 205-207, 1993.

U.S. Appl. No. 17/288,368, filed Apr. 23, 2021 in the name of Nikhil Parab.

Nov. 3, 2022 Search Report issued in European Patent Application No. 19795633.7.

Jul. 11, 2022 Third Party Observation for Application No. EP20190795633.

* cited by examiner

Fig. 4A
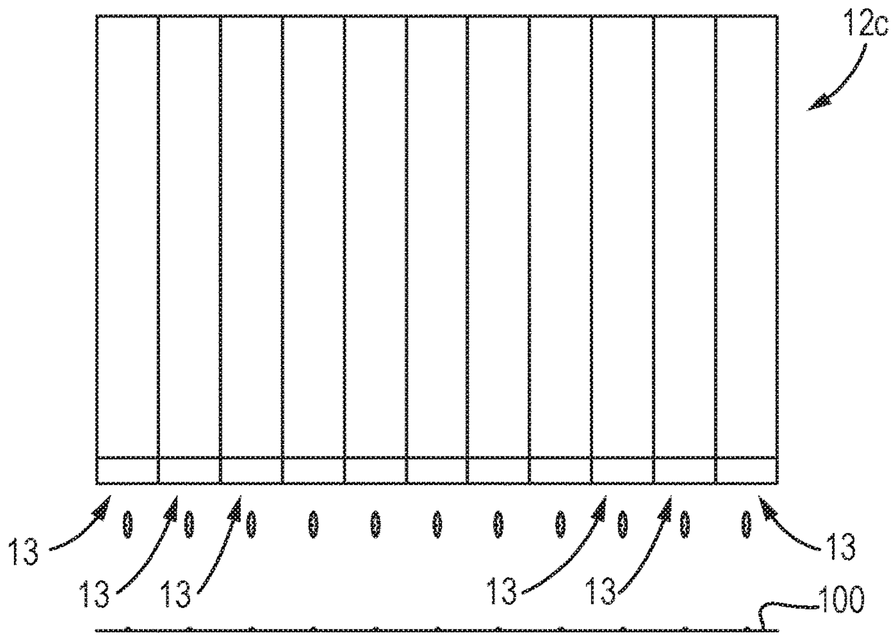
Fig. 4B
Fig. 4C
Fig. 4D
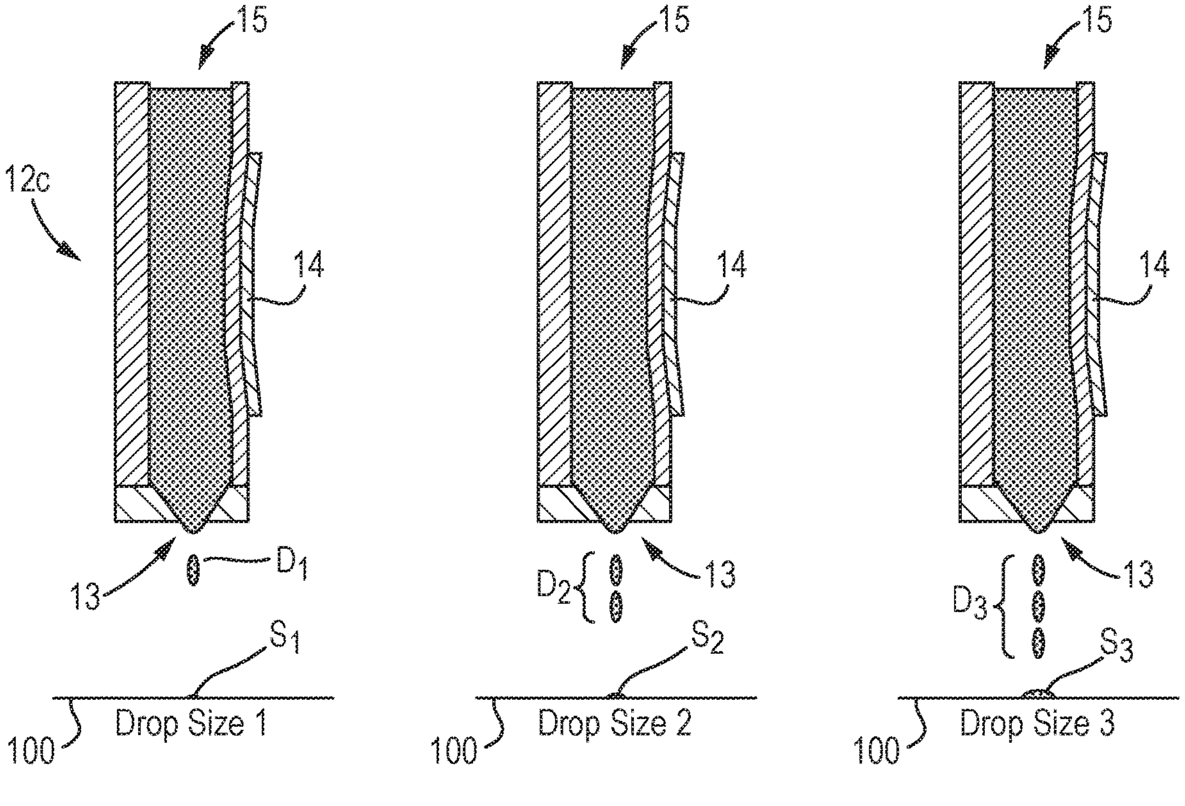

APPARATUSES AND METHODS FOR PRINTING SECURITY DOCUMENTS

FIELD OF THE INVENTION

The present invention relates digitally printed security documents, methods of digitally printing security documents, digital printing presses for printing security documents and computer implemented methods for generating printing instructions for digitally printing security documents.

BACKGROUND TO THE INVENTION

Because of the wide availability of digital printing systems, digitally printed security documents are generally viewed as nonviable as it is considered that counterfeits could be too widely produced and produced at levels that relatively convincingly replicate authentic documents. However, digital printing has certain advantages that it would be desirable to make use of in the security printing industry. In particular, digital printing does not rely on pre-produced printing plates and so would be particularly beneficial to short printing runs and for providing variable data, such as banknote serial numbers or passport identification data, that can differ between each printed security document. In order to address concerns regarding the security of digital printing techniques and thereby allow access to the benefits of digital printing in the security printing industry, it would be desirable to provide digital printing with improved security such that security documents can be produced using digital printing methods without compromising the high levels of security enjoyed by conventional security printing techniques.

SUMMARY OF THE INVENTION

The security of a digitally printed security document will, to a large extent, rely on the capabilities of the digital print press used to print the document being beyond those of commercially available digital printers. A digitally printed security document may be made secure by exhibiting those capabilities as an authentication feature in order to distinguish from counterfeits made without those digital print capabilities. To understand the digitally printed security documents of the present invention, we will therefore first describe an example of a digital printing press suitable for use in forming documents according to the present invention. A digital printing press for printing security documents may comprise: a first digital print head; a second digital print head (typically different from the first digital print head); optionally, an offset printing unit, the offset printing unit comprising one or more offset printing surfaces, wherein the offset printing unit is adapted to transport a print area of the one or more offset printing surfaces sequentially past each of the first and second digital print heads, and subsequently to transfer print received from the first and second digital print heads to a security document substrate; a transport system adapted to transport a security document substrate along a transport path through the digital printing press, wherein either the transport path takes the security document sequentially past each of the first and second digital print heads in a feed direction, or the transport path takes the security document substrate past the offset printing unit, if provided, in a feed direction; a controller adapted to control both the first and second digital print heads to execute a set of printing instructions so as to print on a security document substrate transported past the first and second digital print heads by the transport system or to print on the print area of the one or more offset printing surfaces transported past the first and second digital print heads by the offset printing unit (and to transfer the print received on the print area of the offset printing to the security document substrate), the set of printing instructions including printing instructions at a first resolution for the first digital print head for printing a first print working and printing instructions at a second resolution different from the first resolution for the second digital print head for printing a second print working; wherein the first digital print head is configured to print at the first resolution and the second digital print head is configured to print at the second resolution. All preferable features discussed below will be discussed in relation to the disclosed digital print press and this digital press may be used to form security documents according to the invention.

By providing the digital print press with first and second print heads configured to print at different resolutions, the security documents printed using the digital print press can be made to exhibit a characteristic variation in the spacing of the printed elements, e.g. the printed dots, between workings printed by the different print heads. This means that a viewer can authenticate a digitally printed security document by closely inspecting the print workings to confirm the presence of the different spacings between two different workings. If a counterfeiter attempted to scan and print a counterfeit of the security document using a conventional digital printer, the resulting security document would lack the required variation in resolution as conventional digital printers include print heads with consistent resolution as they are aiming for consistency in the print between the different colours from different print heads.

The term "resolution", used throughout this description, as it applies to print, refers to the spacing of printed elements in two dimensions, with the spacing in each direction typically being measured in dots per inch (DPI). Each resolution is typically made up of a cross-feed resolution and a feed direction resolution. Specifically, the first resolution is made up of a first cross-feed resolution and a first feed direction resolution, and the first cross-feed resolution may be the same as or different from the first feed direction resolution. Similarly, the second resolution is made up of a second cross-feed resolution and a second feed direction resolution, and the second cross-feed resolution may be the same as or different from the second feed direction resolution. Providing that the resolution is different in the cross-feed direction than in the feed direction introduces further complexity to the final printed security document and provides another means by which a viewer may gauge authenticity. In particular, the majority of conventional digital printers are configured to print with the same resolution in both the feed direction and cross-feed direction so as to provide prints with a consistent appearance in both the feed and cross-feed direction. Alternatively, it may be desirable for examples to maintain the same resolution in both the feed and cross-feed directions for each print working so that differences in pitches between the workings can be more easily identified.

A further advantage results from the fact that the different resolutions are provided by digital print heads of the same digital print press, e.g. the first and second digital print heads mounted on the same frame of the digital print press. Providing the digital print heads of different resolution on the same digital print press provides that the different printed workings will exhibit precise register, e.g. the workings will have the same relative position on each of a plurality of security documents printed using the digital print press. This would be impossible to achieve if the substrate was printed with a first working on a first digital print press and printed with a second working from a second digital print head on a second digital print press. In particular, the printed workings may provide security features, such as microtext or fine line patterns, that are perfectly registered to one another.

A yet further advantage is that perfectly registered printed workings at different resolutions are much more difficult to scan when attempting to counterfeit the security document. That is, since the digital printing is done at varying resolutions, it will not be possible to mimic features of the security document using variable frequency line spacing techniques that have been employed when counterfeiting lithographically printed security documents, for example. This lends security documents printed using the digital print press a further inherent improvement in security.

Digital printing presses according to the present disclosure may be configured to print directly onto a security document substrate, or may print onto one or more offset printing surfaces. For example, the digital print heads may print onto an offset cylinder. Alternatively, the first print head may print onto a first cylinder, which then transfers the working to a second cylinder and the second print head prints over the first working on the second cylinder. The final offset cylinder may then transfer both print workings simultaneously onto the security document substrate. This may be done by directly transferring the print workings onto the security document substrate, or indirectly via one or more intermediate offset printing surfaces, e.g. further offset printing cylinders. The optional use of an offset printing unit in this way applies to all print presses and methods disclosed herein.

The digital printing press according to the present invention also has different nozzle diameters of the print nozzles on the first and second digital print heads. This is important in the printing of security documents since these types of documents will typically require inks with significantly different properties to be used for different features of the note. For example, a digitally printed microtext feature may require an ink that is significantly different than a metallic ink used to print a metallic security feature on the document. The types of ink a digital print head can use are directly tied to, among other things, the nozzle diameter of the digital print head. Preferably, the first and/or second nozzle diameters are in the range 1 to 100 microns, preferably in the range 6 to 80 microns, wherein preferably one of the first and second nozzle diameters is in the range 1 to 40 microns, preferably in the range 6 to 20 microns, and the other is in the range 40 to 100 microns, preferably in the range 60 to 80 microns. Conventional digital print presses, on the other hand, will typically use nozzles of the same size as the inks will typically differ only in colour for producing multi-coloured images. It should be noted that other digital printing presses disclosed herein may not require the use of print heads with different nozzle sizes The digital printing press according to the present invention also has first and second digital print heads that are configured or controlled by the controller to remain static relative to the transport path or offset printing unit while the first and second digital print heads execute the respective printing instructions. That is, the digital print heads are non-scanning. It is important in the printing of security documents to be able to lay down the ink very precisely. This helps keep security documents very similar in appearance to one another and achieves high register between different printed features. Both of these are important for being able to identify counterfeit security documents printed by digital means. Furthermore, the use of non-scanning print heads ensures that a high throughput is achievable, which is important when thousands of documents may be required in any one print run. It should be noted that other digital printing presses disclosed herein may not require the use non-scanning digital print heads.

Preferably the first digital print head has a first cross-feed resolution and the second digital print head has a second cross-feed resolution different from the first cross-feed resolution, and the printing instructions for the first digital print head are at a resolution corresponding to the first cross-feed resolution and the printing instructions for the second digital print head are at a resolution corresponding to the second cross-feed resolution. The cross-feed resolution is typically established by the physical parameters of the digital print head itself and so the resolution difference can be configured when the print press is constructed. For example, an inkjet print head will have a cross-feed resolution that is determined by the physical spacing of the ink nozzles that dispense the drops of ink that build up the printed workings. Electrophotography, e.g. laser printers (also known as toner printers), on the other hand, have a cross-feed resolution that is determined by the physical step size of the laser as it scans across the photoreceptor drum.

Alternatively, or additionally, the controller may be adapted to control the first print head to print at a first feed direction resolution and to control the second print head to print at a second feed direction resolution different from the first feed direction resolution, and the printing instructions for the first digital print head are at a resolution corresponding to the first feed direction resolution and the printing instructions for the second digital print head are at a resolution corresponding to the second feed direction resolution. As mentioned, the feed direction resolution may be controlled by the controller, particularly in inkjet printing. In inkjet printing, the feed direction resolution is determined by factors such as the speed at which the paper is fed through the digital print press and the rate at which the inkjet nozzles are made to dispense drops of ink. This provides a way in which the digital print press can be configured to achieve particular differences in resolutions provided by the different digital print heads.

It will be appreciated from the above, that each print head may have different specific resolutions in each of two orthogonal directions at which it operates. In the art, the native resolution of a digital print head is considered to be the resolution at which the digital print head is configured to run. Therefore, the present invention may be considered to provide a digital print press that comprises at least two digital print heads that have different native resolutions.

As mentioned above, a preferable type of digital print head is an inkjet print head and so preferably the first and/or second digital print heads are inkjet print heads. While inkjet print heads are preferable, other digital print heads may also be used, such as laser print heads. Indeed, in some cases, security can be enhanced by providing the digital print press with different types of digital print head. For example one or more print heads may be inkjet print heads with one or more additional print heads being provided as laser print heads.

A simple type of digital print head may print a single dot size. Typically, a higher resolution print head will print a smaller dot size than a lower resolution print head. In some examples, the first digital print head is a higher resolution than the second digital print head and the first digital print head is configured to print a dot size larger than a dot size printable by the second digital print head. This use of different dot sizes can provide another characteristic that a viewer can check when confirming authenticity. While single dot sizes may be used, security can be enhanced by providing that the first digital print head is configured to print a plurality of different dot sizes and/or the second digital print head is configured to print a plurality of different dot sizes. For example, if the digital print head is an inkjet print head, it may be configured to dispense multiple different drop sizes that produce different sizes of printed dots. Typically, a higher resolution print head will print a range of smaller drop sizes than a lower resolution digital print head. Preferably, the plurality of different dot sizes printable by the first digital print head is different from the plurality of different dot sizes printable by the second digital print head.

In particular examples, the first digital print head is configured to print at least one dot size smaller than, preferably at least 25% smaller than, more preferably 50% smaller than, the smallest dot size printable by the second digital print head and/or wherein the second digital print head is configured to print at least one dot size larger than, preferably 50% larger than, more preferably 100% larger than, the largest dot size printable by the first digital print head. By providing such a significant difference between the dot sizes of different workings, printed matter printed using the secure digital print press can be easily distinguished from printed matter originating on a conventional digital printer as the dot sizes will be so similar to one another.

Preferably, the first digital print head is of a higher resolution than the second digital print head. In some particular examples, the first resolution is at least 600 DPI, preferably at least 900 DPI, more preferably at least 1200 DPI, in either or both of the feed direction and the cross-feed direction. As mentioned, higher resolution print heads typically print with smaller dot sizes and so preferably the first digital print head is an inkjet print head and is configured to print with at least one drop size of at most 50 picolitres, preferably at most 30 picolitres, more preferably at most 10 picolitres, most preferably at most 5 picolitres. Preferably the largest drop size printable by the first digital print head is at most 100 picolitres, more preferably at most 50 picolitres, most preferably at most 30 picolitres. Similarly, the second digital print head is preferably of lower resolution than the first digital print head. In some particular examples, the second resolution is at most 600 DPI, preferably at most 360 DPI, further preferably at most 200 DPI, in either or both of the feed direction and the cross-feed direction. Preferably this low resolution digital print head is an inkjet print head and is configured to print with at least one drop size of at least 10 picolitres, preferably at least 30 picolitres, more preferably at least 50 picolitres, most preferably at least 100 picolitres. Preferably the smallest drop size printable by the second digital print head is at least 6 picolitres, more preferably at least 10 picolitres, most preferably at least 20 picolitres. Some specific preferable combinations include: that the first digital print head is at least 600 DPI and the second digital print head is at most 360 DPI; that the first digital print head is at least 600 DPI and the second digital print head is at most 200 DPI; that the first digital print head is at least 900 DPI and that the second digital print head is at most 600 DPI; that the first digital print head is at least 1200 DPI and that the second digital print head is at most 600 DPI; and that the first digital print head is at least 900 DPI and that the second digital print head is at most 360 DPI.

In many examples, the first digital print head is configured to print in a first colour and the second digital print head is configured to print in a second colour different from the first colour. Preferably both the first and second colours are hues (i.e. not black, white or grey). Providing the workings in different colours ensures that a viewer can readily distinguish one working from another and so readily identify the different resolutions of the workings so as to authenticate the document. Moreover, preferably the print workings are used to contribute to multi-coloured (i.e. not greyscale) imagery on the security document. Alternatively, however, one of the first and second digital print heads may print a material that has a different appearance under different viewing conditions. For example, one of the print heads may print a fluorescent ink. While it is possible that each print head may print in only one single colour, it may also be the case that one or more of the digital print heads is configured to print in multiple colours. For example, an inkjet print head may have a first array of nozzles that print drops of ink of a first colour and a second array of nozzles that print drops of ink of a second colour, e.g. at the same resolution so that the combinations of those colours as process colours is also directly printable by that digital print head. This is true for all of the below examples and may be used across all aspects of the invention, i.e. that each digital print head may print in more than one colour.

While the above discussion has focussed on the use of two digital print heads, in practice one or more further print heads may be used. For example, the digital print press may preferably comprise a third digital print head, wherein the transport system is adapted to transport the security document substrate sequentially past each of the first, second and third digital print heads in the feed direction, and wherein the controller is adapted to control each of the digital print heads to execute a set of printing instructions so as to print on the security document substrate, the set of printing instructions including printing instructions at a third resolution for the third digital print head for printing a third print working, wherein the third digital print head is configured to print at the third resolution. The above discussion concerning the makeup of the term "resolution", i.e. the feed direction and cross-feed direction components, applies to this third resolution. Providing a third digital print head allows not only for more complex printed imagery to be constructed, but also provides another point of reference for the viewer attempting to authenticate the document. Indeed, it is foreseen that the digital print press may be modular, for example comprising a freely selectable number of digital print head stations, which may be each selectively provided with a desired digital print head depending on the print job at hand. Any number of digital print head stations may be provided, from two upwards. With increasing number of digital print heads comes increasing flexibility in the printed design and increased security and so it is foreseen that typically four or more digital print heads will be used.

Preferably, the third resolution is different from the first or second resolutions, and most preferably it is different from both resolutions. Preferably they are different from each other in the same respect. By this it is meant, for example, that all three resolutions have different cross-feed resolutions, or have different feed direction resolutions. This allows for the most straightforward comparison between the final printed workings. It is however possible that two resolutions differ from each other in the cross-feed direction, while the third resolution differs in the feed direction, for example.

Preferably the third digital print head is configured to print in a third colour and the third colour is preferably different from the first or second colours, more preferably it is different from both the first and second colours. Again, preferably the third colour is a hue.

In all of the above examples, preferably at least one of the first, second and third colours is not one of CMYK, and further preferably at least one of the first, second and third colours lies outside of the CMYK colour gamut. CMYK colours are considered to be those used in conventional CMYK printing, as will be explained further below with respect to the third aspect of the invention. Printing in non-standard colours, particularly colours outside of the CMYK colour gamut, ensures that the appearance of the printed security document is more difficult to accurately replicate with a conventional CMYK printer. For example, if the inks used all lie within the CMYK colour gamut, but do not provide the full range of the CMYK colour gamut, this can cause scanners to adjust the scanned colours to correct what it perceives as errors in the detected colours. This can lead to poor colour replication in attempted counterfeits. Alternatively, if one or more of the colours lies outside of the CMYK colour gamut, then the printed security document may contain colours that simply cannot be replicated with the inks available in a conventional CMYK printer. The combination of non-CMYK colours and different resolutions of printed workings can provide a very striking appearance of the printed workings when closely inspected that clearly indicates to a viewer the authenticity of the document. Further preferable implementations of non-CMYK colours, and further description of CMYK conventions, are described below in relation to the third aspect of the present invention and it will be appreciated that these preferable implementations may also be used as part of any security document according to the invention.

Not only is it preferable that one of the colours is not one of CMYK, alternatively or additionally, at least one of CMYK, more preferably at least one of CMY, is intentionally not used, i.e. it is preferred if one of these standard colours is entirely omitted from the digital print heads of the printing press. While conventional digital print presses aim to reproduce any colour desired by the customer, this is not a concern for a digital print press for a security document. This is because the designer will typically design to the specific constraints of the digital print press to be used and it is very common for security documents, such as banknotes in particular, to have relatively little colour variation, i.e. to exist in a much reduced colour gamut as compared with the full CMYK colour gamut. This can in fact also improve security as the reduction in the colour gamut of the printed security document can lead to errors when attempting to scan the printed document, as scanners can attempt to fit a scanned image to the CMYK colour gamut and thereby distort the scanned image.

In many preferable examples, the first digital print head, the second digital print head and the transport system are configured such that the first digital print is controllable to print the first print working on the substrate in a first region and the second digital print is controllable to print the second print working on the substrate in a second region, the first and second regions at least partially overlapping one another. Overlapping of the first and second (and preferably third) workings provides for very easy comparison of the resolutions of those workings and the sizes of the printed elements and therefore makes authenticity more readily identifiable. Furthermore, overlapping of the workings may provide additional colour variation to the printed security documents as the workings exhibit a combined colour. This additional colour variation is a particularly strong effect when one or more of the colours is a non-CMYK colour, as explained above.

In some examples, the digital print press is configured to print on a web of substrate material. In particular, the transport system may be adapted to transport a substrate web past each of the digital print heads and the security document substrate is a portion of the substrate web. Alternatively, the digital print press may be a sheet fed system. Specifically, the transport system may be adapted to transport individual sheets of security document substrate past each of the digital print heads, wherein the security document substrate is either a sheet or a portion of a sheet transported by the transport system. Typically, the digital print heads will be provided alongside one another such that the substrate passes each digital print head immediately in sequence; however, in this sheet fed example, it is possible that the sheets could be re-stacked by the transport system after the first digital print head before being singled and fed past a second digital print head.

Preferably, the transport system is adapted to transport the security document substrate sequentially past each of the first and second digital print heads such that the first and second digital print heads print on a first surface of the security document substrate. While preferable, this is not essential and, for example, the substrate may be transparent such that the first and second print workings can be printed on opposing sides of the substrate and still be directly compared.

In all of the above examples, the print heads are described as having a single fixed resolution in the cross-feed direction; however, this is not essential. In some examples, wherein the first and/or second digital print head comprises a first portion of the print head and a second portion of the print head, the first and second portions being offset in the cross-feed direction, wherein the first and/or second digital print head is configured such that a resolution of the first portion of the print head is different than a resolution of the second portion of the print head, and wherein the printing instructions for the corresponding first and/or second digital print head includes corresponding portions of the instructions at corresponding resolutions. Similarly, for colour, the first and/or second digital print head may comprise a first portion of the print head and a second portion of the print head, the first and second portions being offset in the cross-feed direction, wherein the first portion of the print head is configured to print in a first colour and the second portion of the print head is configured to print in a second colour different from the first colour. Again, preferably these colours are hues and preferably they are non-CMYK colours. The use of a digital print head with portions having a distinctly different characteristic can further enhance security since these characteristics can be provided in different regions of the same working and such that they are integrally exactly registered with one another, i.e. down to the size of a single printed dot, by virtue of the fact that they are provided by different portions of the same printing head.

In an example with a digital print head having first and second portions of different resolution, preferably a cross-feed resolution of the first portion of the print head is different than a cross-feed resolution of the second portion of the print head. Alternatively, or in addition, the controller may be adapted to control the first and second portions of the print head such that a feed direction resolution of the first portion of the print head is different than a feed direction resolution of the second portion of the print head.

In many, the first array of print nozzles has a first pitch in a direction transverse to the transport path and wherein the second array of print nozzles has a second pitch in the direction transverse to the transport path, the second pitch being different from the first pitch. Preferably, one of the first and second pitches is a non-integer multiple of the other. While some digital print heads can print in different resolutions by only selectively using their print nozzles, it is preferable that the first and second digital print heads differ physically in the number of nozzles they have available. This will mean that the digital print heads are specialised for different resolutions, i.e. they have different native resolutions, and so are able to print in high quality at these different resolutions. Furthermore, having one pitch be a non-integer multiple of the other (e.g. the first digital print head having a pitch of 2.1 times that of the second) means that it won't be physically possible for a counterfeiter to use two digital print heads having the same pitch as the smaller pitch digital print head, and mimic the larger pitch print head by using only a subset of nozzles. Suitable pitches for the first and second digital print heads are between 300 microns and 10 microns. As will be clear from the above, the first resolution typically corresponds to the first pitch of the first array of print nozzles and the second resolution corresponds to the second pitch of the second array of print nozzles, such that the first print head is controlled to print the first print working having a first cross-feed resolution and the second print head is controlled to print the second print working having a second cross-feed resolution different from the first cross-feed resolution.

Since the digital print press according to the invention is non-scanning, preferably the first and/or second digital print heads extend across the full width of the transport path or one or more offset printing surfaces. This enables the print press to print edge-to-edge on the security document. Alternatively, the print press may only print parts of the security document. That is, one or more of the print heads may not extend across the full width of the transport path or one or more offset printing surfaces. For example, the press may be configured to print only a security stripe region of the security document.

Preferably, the controller is configured to control both the first and second digital print heads to print on the security document substrate in a single pass. A single pass digital print press is advantageous for achieving high registration between printed features and for maintaining a high throughput.

Just as it is preferable that the pitch of the nozzles have a non-integer multiple relationship, preferably one of the first and second resolutions is a non-integer multiple of the other, wherein preferably a cross-feed resolution of one of the first and second resolutions is a non-integer multiple of the cross-feed resolution other. Again, this makes it harder for the counterfeiter to counterfeit the printed documents using identical digital print heads.

Preferably, the first digital print head is configured or controllable by the controller to print with one or more drop sizes, and wherein the second digital print head is configured or controllable by the controller to print with one or more drop sizes, and wherein the one or more drop sizes of the first digital print head is different from the one or more drop sizes of the second digital print head. Different drop sizes are particularly useful for creating different effects. For example, microtext may require relatively small drop sizes and printed metallic inks may require relatively large drop sizes. The use of different drop sizes for different inks provides another way that a viewer of the security document can check for authenticity.

Printed security documents often require a corona pretreatment. Advantageously, this can be provided on the digital print press to streamline manufacture and prevent degradation of the substrate by subjecting it to multiple independent processes. Therefore, preferably, the digital print press further comprises a corona treatment unit configured to perform a corona treatment on the surface of the security document substrate, wherein the transport path of the transport system takes the security document substrate past the corona treatment unit upstream of the digital print heads and/or offset printing unit.

Similarly, printed security documents often require a varnish overcoat to prevent damage and degradation to the print on the note. While this could be performed in a separate process, advantageously, this can be provided on the digital print press to streamline manufacture and prevent degradation of the substrate by subjecting it to multiple independent processes. Therefore, preferably the digital print press further comprises a finishing digital print head, the finishing digital print head configured to print a varnish coating onto the security document substrate, wherein preferably the transport path of the transport system takes the security document substrate past the finishing digital print head, or past an offset finishing unit adapted to transfer the varnish coating printed by the digital print head to the security document substrate, downstream of the digital print heads and/or offset printing unit.

We will also describe a method of digitally printing a security document. A method of digitally printing a security document may comprise: receiving a set of printing instructions relating to a security document; controlling a first digital print head so as to print a first print working, the first print working being received on a security document substrate in a first region in accordance with the set of printing instructions; and controlling a second digital print head so as to print a second print working, the second print working being received on the security document substrate in a second region in accordance with the set of printing instructions; wherein the first and second digital print heads are configured to print either directly onto the security document substrate, or to print onto a print area of one or more offset printing surfaces of an offset printing unit, wherein the one or more offset printing surfaces subsequently transfers the print received from the first and second digital print heads to the security document substrate; wherein the first digital print head is controlled so as to print at a first resolution and the second digital print head is controlled so as to print at a second resolution different from the first resolution; whereby the first print working on the printed security document comprises a first array of printed elements arranged according to a first grid of lattice points corresponding to the first resolution and the second print working on the printed security document comprises a second array of printed elements arranged according to a second grid of lattice points corresponding to the second resolution.

These methods generally correspond to methods of printing using the printing presses as described above Accordingly, the above discussion applies equally to this method.

As noted, the result of this printing method is that a first print working comprises a first array of printed elements is arranged according to a first grid of lattice points corresponding to the first resolution and the second print working on the printed security document comprises a second array of printed elements arranged according to a second grid of lattice points corresponding to the second resolution. For example, if the first digital print head was configured to print at 600 DPI in both directions, there would be 600 possible print positions, i.e. lattice points, along every inch in the cross-feed direction and 600 possible print positions, i.e. lattice points, along every inch in the feed direction. However, as will be appreciated, not every possible print position will be occupied by a dot of ink. The positions that do receive dots of ink will be determined based on the image being built up. However, the resolution of the print working will still be determinable based on the spacing of a number of dots across the working.

Preferably, the first region and the second region at least partially overlap. One print working may therefore be directly compared with another to check for the different resolutions and thereby authenticate the digitally printed security document.

Preferably, the first digital print head is controlled so as to print at a first resolution, the first resolution being made up of a first cross-feed resolution and a first feed direction resolution, the first cross-feed resolution being either the same as or different than the first feed direction resolution, and wherein the second digital print head is controlled so as to print at a second resolution, the second resolution being made up of a second cross-feed resolution and a second feed direction resolution, the second cross-feed resolution being either the same as or different than the second feed direction resolution. Further preferably, the first digital print head is controlled so as to print at a first feed-direction resolution and the second digital print head is controlled so as to print at a second feed-direction resolution different from the first feed-direction resolution. Alternatively, or in addition, the first digital print head has a first cross-feed resolution and the second digital print head has a second cross-feed resolution different from the first cross-feed resolution, and the first digital print head is controlled so as to print at the first cross-feed resolution and the second digital print head is controlled so as to print at the second cross-feed resolution. The advantages of these resolution variation options are discussed above with respect to the disclosed digital printing press.

In many examples, as noted above, the first and/or second digital print heads are inkjet print heads. Other types of digital print head may also be used, however, as noted above.

Preferably, the first digital print head is controlled so as to print a plurality of different dot sizes and/or the second digital print head is controlled so as to print a plurality of different dot sizes. The plurality of different dot sizes printed by the first digital print head is preferably different from the plurality of different dot sizes printed by the second digital print head. In some examples, the first digital print head is controlled so as to print at least one dot size smaller than, preferably at least 25% smaller than, more preferably 50% smaller than, the smallest dot size printed by the second digital print head and/or wherein the second digital print head is configured so as to print at least one dot size larger than, preferably 50% larger than, more preferably 100% larger than, the largest dot size printed by the first digital print head. Dot size variation contributes to the authenticatability of the resulting printed security document for the reasons described above with respect to the disclosed digital printing press.

Preferably, the first digital print head is of a higher resolution than the second digital print head. In some particular examples, the first resolution is at least 600 DPI, preferably at least 900 DPI, more preferably at least 1200 DPI, in either or both of the feed direction and the cross-feed direction. As mentioned, higher resolution print heads typically print with smaller dot sizes and so preferably the first digital print head is an inkjet print head and is configured to print with at least one drop size of at most 50 picolitres, preferably at most 30 picolitres, more preferably at most 10 picolitres, most preferably at most 5 picolitres. Similarly, the second digital print head is preferably of lower resolution than the first digital print head. In some particular examples, the second resolution is at most 600 DPI, preferably at most 360 DPI, further preferably at most 200 DPI, in either or both of the feed direction and the cross-feed direction. Preferably this low resolution digital print head is an inkjet print head and is configured to print with at least one drop size of at least 10 picolitres, preferably at least 30 picolitres, more preferably at least 50 picolitres, most preferably at least 100 picolitres. Some specific preferable combinations include: that the first digital print head is at least 600 DPI and the second digital print head is at most 360 DPI; that the first digital print head is at least 600 DPI and the second digital print head is at most 200 DPI; that the first digital print head is at least 900 DPI and that the second digital print head is at most 600 DPI; that the first digital print head is at least 1200 DPI and that the second digital print head is at most 600 DPI; and that the first digital print head is at least 900 DPI and that the second digital print head is at most 360 DPI.

In many examples of the method, more than two print workings will be printed. Preferably, the method further comprises controlling a third digital print head so as to print a third print working on the substrate in a third region at a third resolution, whereby the third print working on the printed security document comprises a third array of printed elements arranged according to a third grid of lattice points corresponding to the third resolution. Preferably, the third resolution is different from the first and/or second resolutions. Fourth and higher print workings may also be printed by corresponding print heads, as required.

Preferably, the first digital print head is configured to print in a first colour and the second digital print head is configured to print in a second colour different from the first colour. Where a third working is provided, preferably the third digital print head is configured to print in a third colour and the third colour is preferably different from the first and/or second colours. In any case, preferably at least one of the first, second and third colours is not one of CMYK, and wherein further preferably at least one of the first, second and third colours lies outside of the CMYK colour gamut. The advantages associated with different colour variations are described above with respect to the digital printing press.

As noted above, the first and second regions are preferably arranged so that they at least partially overlap such that the first and second print workings at least partially overlap on the substrate. Where a third working is printed in a third region, preferably the third region at least partially overlaps the first and/or second regions, more preferably all three overlap in one sub-region, such that the third print working at least partially overlaps the first and/or second print workings on the substrate.

As with the above digital printing press, preferably, the first and/or second nozzle diameters are in the range 1 to 100 microns, preferably in the range 6 to 80 microns, wherein preferably one of the first and second nozzle diameters is in the range 1 to 40 microns, preferably in the range 6 to 20 microns, and the other is in the range 40 to 100 microns, preferably in the range 60 to 80 microns. However, other nozzle diameters may be used depending on the requirements for a particular security document.

Preferably, the first and second digital print heads are held static while printing the first and second print workings respectively. This helps improve precision of the printing, improving the consistency of the printed security documents and achieving high registration, which increase the security of the resulting documents.

In many examples, the first digital print head comprises a first array of print nozzles having a first pitch in a direction transverse to the direction the security document substrate or the print area of the offset printing substrate is transported past the first digital print and wherein the second array of print nozzles has a second pitch in in a direction transverse to the direction the security document substrate or the print area of the offset printing substrate is transported past the second digital print head, the second pitch being different from the first pitch. Preferably, the first and second pitches are between 300 microns and 10 microns. As noted above, digital print heads that are physically different in their nozzle spacing, i.e. have different native resolutions, will advantageously print at these differing resolutions, thereby achieving a higher quality, and therefore more secure, printed document. Preferably, one of the first and second pitches is a non-integer multiple of the other, so that it is harder to emulate the different resolutions with identical print heads. As will be clear, typically, the first resolution corresponds to the first pitch of the first array of print nozzles and wherein the second resolution corresponds to the second pitch of the second array of print nozzles, such that the first print head is controlled to print the first print working having a first cross-feed resolution and the second print head is controlled to print the second print working having a second cross-feed resolution different from the first cross-feed resolution. Preferably one of the first and second resolutions is a non-integer multiple of the other, wherein preferably a cross-feed resolution of one of the first and second resolutions is a non-integer multiple of the cross-feed resolution other. This may be achieved by the use of different pitches on the digital print heads.

Preferably, the first and/or second digital print heads extend across a width corresponding to the cross-feed width of the security document substrate so that they can print edge to edge, although this is not essential, as described above.

To achieve high registration, preferably the first and second print workings are printed in a single pass of the first and second digital print heads or the offset printing unit. This improves the security of the printed security document.

Preferably, the method comprises printing with the first digital print head with one or more drop sizes, and printing with the second digital print with one or more drop sizes, and wherein the one or more drop sizes of the first digital print head is different from the one or more drop sizes of the second digital print head. As noted above, this helps a viewer distinguish between the two printed workings and helps authenticate the document.

Additional method steps that may be performed include performing a corona treatment on the surface of the security document substrate before printing the first and second print workings on the security document substrate, an/or printing a varnish coating onto the security document substrate after printing the first and second print workings on the security document substrate.

While the above method has described only digital printing steps, it will be appreciated that conventional printing steps, e.g. lithographic, flexographic, intaglio and/or gravure printing steps, could also be used at any stage during the method, but preferably before or after all of the digital printing steps have been performed. For example, the substrate that is initially provided to the first digital print head may have already been printed using a non-digital printing process, e.g. a background print may have been applied using a conventional technique.

Alternatively, an un-printed substrate may be provided to the digital print heads, e.g. comprising a substrate and any primer or opacifying coatings etc., which is digitally printed with first and second workings, before being overprinted using a non-digital printing process. The combination of two different printing techniques in this way will significantly improve the security of the resulting security document. It will be appreciated that pre or post-printing using non-digital techniques may be incorporated into any of the aspects of the invention disclosed herein.

In accordance with a first aspect of the present invention, there is provided a digitally printed security document comprising: a security document substrate; a first digitally printed print working on a first surface of the substrate in a first region, the first print working comprising a first array of printed elements arranged according to a first grid of lattice points having a first pitch; and a second digitally printed print working on the first surface of the substrate in a second region, the second print working comprising a second array of printed elements arranged across a second grid of lattice points having a second pitch different from the first pitch.

This printed security document may be printed on a printing press described above and/or by a method described above. The above description of advantageous features and effects of those features applied equally to the security document according to this first aspect of the invention.

As noted above, the resolution of the print press is made up of a resolution in two orthogonal directions. The security document may therefore have a grid of lattice points that is a two-dimensional grid of lattice points defined by a first unit cell, and a second grid of lattice points that is a two-dimensional grid of lattice points defined by a second unit cell, wherein the first and second unit cells are different from one another. Again, here, reference is made to the fact that the unit cell defines possible printed element locations and not every location need be provided with a printed element. It should be noted that while such a unit cell is preferred, it is not essential that the grid of lattice points be regular. For example, the digital print head used to produce the security document may have irregular spacing of the nozzles which will lead to security documents with a similarly irregular array of lattice points. In all embodiments of all aspects, however, it is preferable that the resolution or spacing of printed elements is regular.

Preferably, the first and second grids are each regular, square grids of lattice points, or rectangular grids of lattice points. These are the types of grids printed by the majority of digital print heads. Preferably, the first grid of lattice points has a pitch in each of two orthogonal directions and the second grid of lattice points has a pitch in each of two orthogonal directions, wherein optionally each pitch of the first grid of lattice points is different from both pitches of the second grid of lattice points. As with the digital print heads of the printing press, preferably one of the first and second pitches of the grids of lattice points is a non-integer multiple of the other. This effect is harder to replicate without a custom digital printing press.

As noted above, the different print heads used to print the security document will typically print with different dot sizes and so preferably at least some of the printed elements of the first array of printed elements have a smallest lateral dimension smaller than, preferably 25% smaller than, more preferably 50% smaller than, a smallest lateral dimension of the printed elements of the second array of printed elements, and/or wherein at least some of the printed elements of the second array of printed elements have a smallest lateral dimension larger than, preferably 50% larger than, more preferably 100% larger than, a smallest lateral dimension of the printed elements of the second first of printed elements.

The first working will preferably be higher resolution than the second working and so preferably the pitch of the first grid of lattice points corresponds to a print resolution of at least 600 DPI, preferably at least 900 DPI, more preferably at least 1200 DPI, in at least one direction. For this high resolution working, preferably at least some of the printed elements of the first array of printed elements have a smallest lateral dimension of at most 200 micrometres, preferably at most 100 micrometres, more preferably at most 50 micrometres, most preferably at most 20 micrometres. The second working will also preferably be lower resolution than the first working and so preferably the pitch of the second grid of lattice points corresponds to a print resolution of at most 600 DPI, preferably at most 360 DPI, further preferably at most 200 DPI, in at least one direction. For this low resolution working, preferably at least some of the printed elements of the second array of printed elements have a smallest lateral dimension of at least 20 micrometres, preferably at least 50 micrometres, more preferably at least 100 micrometres most preferably at least 200 micrometres.

Preferably the first and second regions at least partially overlap one another such that the first and second print workings at least partially overlap one another on the first surface of the substrate. This allows an immediate comparison of the two workings.

It will be preferable to very clearly demonstrate the resolution of each working and so preferably the first print working comprises a printed element on each lattice point of the first grid of lattice points across at least a sub-region of the first region such that the first array of printed elements has the first pitch across said sub-region. Similarly, preferably the second print working comprises a printed element on each lattice point of the second grid of lattice points across at least a sub-region of the second region such that the second array of printed elements has the second pitch across the second sub-region. Preferably these sub regions overlap. An authenticator may then know which area(s) of the security document to inspect for a clear indication as to the authenticity of the document.

In many embodiments, the first print working is printed in a first material, preferably a first ink, and the second print working is printed in a second material, preferably a second ink, different from the first material. This enables the first and second materials to be provided with different optical characteristics such the different resolutions can be very clearly recognised on the security document. For example, as described above, the materials may have different colours, e.g. the workings may be printed in different coloured inks. Alternatively, or in addition, the first and second materials may have different overt or covert optical effects. For example, one or both materials may be selected from a colour-shifting ink, metallic ink, luminescent ink, fluorescent ink, phosphorescent ink, infrared absorbing ink, thermochromic ink, or photochromic ink. Suitable inkjet inks with covert properties include those sold by Luminescence Sun Chemical Security, The Fairway, Harlow, Essex, CM18 6NG, UK, or by Kao Collins Inc., 1201 Edison Drive, Cincinnati, Ohio 45216, US. In particular where one of the materials has a covert effect, or where they have different covert effects, the materials may have substantially the same colour, i.e. the same visible colour under standard illumination conditions, so that the differing resolutions forms part of a covert authentication procedure. It will be noted that this will be secure from even the most sophisticated CMYK scanner-copiers, which will not be able to replicate the covert optical characteristics of the material(s).

One or more printed elements of the first print working may be provided in proximity of one or more printed elements of the second print working such that said printed elements form a composite printed element. Composite printed elements may be used where the materials used to form each composite element are the same, or different. Where the materials are different, they may differ in colour, i.e. visible colour under standard illumination conditions, or may appear the same colour under standard illumination conditions and differ by overt or covert optical effects, such as those given above.

Where the materials are the same, or at least the same visible colour, this may give the composite printed element the appearance to a viewer of a single printed element, whereas it is in fact produced by the combined effect of two different workings. Composite elements may have the appearance of symbols, indicia, alphanumeric characters, or logos etc.

Preferably, a plurality of composite printed elements are provided across the first surface of the substrate. Each of the plurality of composite elements will be formed by the combination of the two different workings. Here, we are effectively using multiple different digital print workings with different resolutions to collectively define a single array of screen elements. These screen elements, i.e. the composite elements, may be closely inspected to confirm that they are indeed composed of printed elements having different resolutions, which is very difficult to replicate with conventional digital printers. It will be appreciated that additional screen elements, i.e. appearing to belong to the same screen, may be provided that are formed only by one or the other of the printed workings.

In particularly preferable embodiments, the plurality of composite printed elements vary in one or more of their size and/or shape across the first surface of the substrate by variation in the number of printed elements, the positioning of the printed elements, the size of the printed elements and/or the spacing of the printed elements of the first and/or second arrays of printed elements. That is, the number of dots, the dot sizes and the lattice points on which the dots are printed in a relative sense between workings may be varied in different regions of the substrate so as to vary the appearance of the composite elements.

Variation of the size and/or shape of the composite printed elements may, for example, include the provision of different composite elements defining different indicia, alphanumeric characters, symbols, or logos. The composite elements may be used to define different letters within a word for example. The use of differing size and/or shape inherently increases security as the authentication process may then involve checking for the expected shapes and/or sizes of the composite elements.

Additionally, the plurality of composite printed elements may vary in their size and/or shape across the first surface of the substrate such that they provide regions of different tone defining a multi-tonal image, preferably a half-tone image. The provision of a multi-tonal image may also involve the composite elements varying in their spacing. In these embodiments, the differing, size, shape and spacing of the composite elements varies the density of the material(s) on the first surface of the substrate to produce multiple tones, i.e. regions with different densities of material. It should be noted that the provision of multiple tones should not be considered to be limited to multiple tones of the same hue. As explained above, the composite elements may comprise individual elements printed in different colours. Indeed, as will be explained below, the hue may also be deliberately varied by varying the proportion of different materials making up the composite elements.

In some embodiments, the plurality of composite printed elements vary their proportional composition of printed elements of the first print working and printed elements of the second print working across the first surface of the substrate. Here, proportional composition refers to the print density of each of the first and second materials. For example, if dot size remains consistent for each working, then the proportional composition of a composite element will change when the ratio of dots of the two workings changes.

The plurality of composite printed elements may vary in their proportional composition of printed elements of the first print working and printed elements of the second print working across the first surface of the substrate such that they provide regions of different appearance defining a printed image. For example, varying the proportional composition of elements formed in materials of different colours may provide regions of different colour defining a multi-colour printed image. This may provide different colours without any change in the shape, size or spacing of the composite printed elements. For example, the composite elements may vary from predominantly being printed in red ink to predominantly being printed in blue ink across the substrate to provide a gradual colour change. However, preferably, the varying proportional composition of printed elements of the first and second print workings will be accompanied by varying size, shape and/or spacing of the composite printed elements so as to provide for tonal control within any particular hue. The combination of controlling tone by size, shape and spacing of the composite elements and controlling hue by controlling the proportional composition of the composite elements enables for precise colour control and highly secure patterns of screen elements.

If one material has a covert optical characteristic, or if both materials have different covert optical characteristics, then varying the proportional composition of the composite elements may provide different levels of that covert effect in different regions of the print working. For example, if both materials are infra-red absorbing, but to different extents, then the array of screen elements will have differing infra-red responses in different regions depending on their proportional composition. Authentication may then involve inspecting the regions to check for the correct response levels in different regions.

In embodiments in which composite printed elements are provided, it may be preferred that one of the first and second pitches is an inter multiple of the other. That is, the grids of lattice points on which the printed elements of the two workings are arranged share an integer multiple relationship. This helps when attempting to coordinate the dots to form the composite printed elements.

As noted above, at least a third working will typically be provided and so preferably the document further comprises a third digitally printed print working on the first surface of the substrate in a third region, the third print working comprising a third array of printed elements arranged across a third grid of lattice points. Preferably, the third grid of lattice points has a third pitch different from the first and/or second pitches.

Where a third working is provided, this may also contribute to one or more composite elements to increase the complexity of the composite elements, but this may also be used to provide additional colour control. That is, one or more of the composite printed elements may additionally be formed by one or more printed elements of the third print working, wherein the proportional composition of printed elements of the first, second and third print workings varies across the first surface of the substrate so as to define at least three different colour regions of the printed image. For example, the three workings may be printed respectively in red, blue and green, or cyan, magenta and yellow, and the proportional composition varied across the array to enable full colour printing with a single array of screen elements, i.e. the array of composite elements formed by elements from each working. Again, some screen elements may be provided that only contain elements from only one or two of the print workings as desired, e.g. if a desired region requires no magenta contribution, or requires only a single colour, such as a cyan region of the image. While this example is explained using CMY colours for the three different workings, for the reasons specified elsewhere in this disclosure, it is preferred that non-standard colours (i.e. at least one colour being not one of CMYK and preferably lying outside of the CMYK colour space) are used to increase the difficulty of replicating the colour patterns with conventional printing techniques.

As will be explained in more detail below in relation to the fifth aspect of the invention, it is also preferred that the printed elements of the different workings have different thicknesses. This provides another feature of the printed document that can be checked in order to authenticate the security document, i.e. to confirm that it was printed by a secure digital printing technique. For example, depending on the size of the thickness difference, this may be checked for by touch or by magnified inspection of the digitally printed elements. More specifically, preferably, at least one element of the printed elements of the first print working has a first element thickness in a direction perpendicular to the surface of the security document substrate, and at least one element of the printed elements of the second print working has a second element thickness in the direction perpendicular to the surface of the security document substrate, the second element thickness being greater than the first element thickness. These different thicknesses of the printed elements cannot be replicated by conventional digital printers that print all three inks with the same dot size and hence approximately the same element thickness.

As mentioned above, there are a number of preferred ways in which printed elements of different thickness may be implemented. These are explained in detail below in relation to the fifth aspect of the invention. Any of those preferable features may be incorporated into this aspect of the invention.

Any type of security document may be provided according to the invention. Preferable security documents include a banknote, a polymer banknote, a cheque, a passport, an identity card, a certificate of authenticity, a fiscal stamp, a licence, an identification document and a visa. The security document may be formed on a polymer substrate, such as biaxially-oriented polypropylene (BOPP), or on a paper substrate as required. One or more layers may be provided between the substrate and the printed working. For example, where the substrate is a polymer substrate, an opacifying layer may be disposed across the surface of the polymer substrate to provide a preferably white background to the printed workings. Other examples of pre-printing layers include primer layers, anti-static layers, and ink receptive coatings. Indeed, preferably the print workings are one of the outermost layers applied to the substrate so that good visibility of the printed workings is provided.

As noted above, one of the advantages of digital printing is that it is possible to change the printed pattern from one document to the next. Preferably, a plurality of printed security documents are provided, wherein the first and/or second print workings provide each of the plurality of security documents with fixed content and variable content, the fixed content being the same for each of the plurality of security documents and the variable content changing between at least some of said plurality of security documents, the variable content preferably being unique to each of said plurality of security documents. Suitable fixed content may be denomination and value of a banknote, while variable content may include serial numbers.

According to a second aspect of the invention, there is provided a method of digitally printing a security document, the method comprising: digitally printing a first print working on a first surface of a security document substrate in a first region, first print working comprising a first array of printed elements arranged according to a first grid of lattice points having a first pitch; digitally printing a second print working on the first surface of the substrate in a second region, the second print working comprising a second array of printed elements arranged across a second grid of lattice points having a second pitch different from the first pitch. This method corresponds to a method of printing the security document according to the first aspect. This method may be adapted to provide any one or more of the preferable features of the digitally printed security document described above.

There is also disclosed here a computer implemented method for converting a source image to be printed into a set of printing instructions for execution by a digital printing press comprising a first digital print head configured to print in a first colour at a first resolution, and a second digital print head configured to print in a second colour at a second resolution less than the first resolution, the method comprising: receiving a source image to be printed; identifying a plurality of image layers of the source image; for each of the plurality of image layers, associating at least one of the first and second digital print heads with said image layer; for each of the plurality of image layers, generating printing instructions for the corresponding associated at least one of the first and second digital print heads; wherein the resulting set of printing instructions relating to the plurality of image layers includes printing instructions relating to printing at least part of an image layer or a colour component of at least part of an image layer for each of the first digital print head and the second digital print head at the corresponding first or second resolution.

The present method corresponds to a method of generating printing instructions for a digital print press as described above. This technique may therefore be used to digitally print a security document according to any aspect of the invention. Features described as advantageous above in relation to any of the above will therefore have corresponding advantageous implementations for the present computer implemented method.

The production of a printed security document will typically involve a designer digitally creating a print design for replication on the security document. The design, referred to as a source image, will typically comprise a plurality of layers, each carrying different elements of the final printed design. The security of the resulting printed security document is ensured according to the present invention by providing that different image layers are printed by different digital print heads at different resolutions. The present computer implemented method therefore has, as an input, a source image, identifies a plurality of layers of the source image, and then associates various layers of the source image to different digital print heads, before generating the printing instructions for printing those layers in the respective native resolutions of the digital print heads. It should be noted here that there may be various pre-processing steps performed on the source image before the layers are identified and associated with digital print heads. For example, certain layers may be combined with one another, such as fixed and variable content being combined into a single layer. Alternatively, the source image may comprise vector image content, which may be rasterised as a pre-processing step.

There is also disclosed a computer implemented method for converting a source image to be printed into a set of printing instructions for execution by a digital printing press comprising a first digital print head configured to print at a first resolution, the first digital print head being configured to print in a first colour, and a second digital print head configured to print at a second resolution less than the first resolution, the second digital print head being configured to print in a second colour different from the first colour, the method comprising: receiving a source image; identifying an image layer of the source image, the image layer having a resolution no less than the first resolution and comprising an array of pixels, each pixel having a respective ideal colour (i.e. the design colour of the corresponding pixel, which may have no perfect match obtainable based on the colours and intensities providable by the first and second print heads); based on the ideal colour of each pixel of the image layer, identifying a corresponding array of pixels of a first colour component image at the first resolution for printing in the first colour by the first digital print head; based on the ideal colour of each pixel of the image layer, identifying a corresponding array of pixels of a second colour component image at the second resolution for printing in the second colour by the second digital print head; generating printing instructions for the first digital print head based on the first colour component image and generating printing instructions for the second digital print head based on the second colour component image.

As noted above, the digital print press according to the invention comprises digital print heads having different resolutions, and so if the source image comprises at least one layer that needs to be printed using two different colours supplied at two different resolutions, then the method of converting the source image into printing instructions preferably provides this function. It will be appreciated that the present method for processing one image layer may be incorporated into the above described computer implemented method.

There is also disclosed here a computer-readable medium containing computer executable instructions for converting a source image to be printed into a set of printing instructions for execution by a digital printing press comprising a first digital print head configured to print at a first resolution, the first digital print head being configured to print in a first colour, and a second digital print head configured to print at a second resolution less than the first resolution, the second digital print head being configured to print in a second colour different from the first colour, the computer executable instructions comprising: receiving a source image; identifying an image layer of the source image, the image layer having a resolution no less than the first resolution and comprising an array of pixels, each pixel having a respective ideal colour; based on the ideal colour of each pixel of the image layer, identifying a corresponding array of pixels of a first colour component image at the first resolution for printing in the first colour by the first digital print head;

based on the ideal colour of each pixel of the image layer, identifying a corresponding array of pixels of a second colour component image at the second resolution for printing in the second colour by the second digital print head; generating a printing instructions for the first digital print head based on the first colour component image and generating printing instructions for the second digital print head based on the second colour component image. Again, this essentially corresponds to a computer-readable medium containing instructions for performing the computer implemented method described previously.

There is also disclosed herein another digital printing press for printing security documents, the digital printing press comprising: a first digital print head; a second digital print head, the second digital print head being offset from the first digital print head in a cross-feed direction; optionally, an offset printing unit, the offset printing unit comprising one or more offset printing surfaces, wherein the offset printing unit is adapted to transport a print area of the one or more offset printing surfaces past each of the first and second digital print heads, and subsequently to transfer print received from the first and second digital print heads to a security document substrate; a transport system adapted to transport a security document substrate along a transport path through the digital printing press, wherein either the transport path takes the security document past the first and second digital print heads in a feed direction, or the transport path takes the security document substrate past the offset printing unit, if provided, in a feed direction; a controller adapted to control both the first and second digital print heads to execute a set of printing instructions for printing on a security document substrate transported past the first and second digital print heads by the transport system or to print on the print area of the one or more offset printing surfaces transported past the first and second digital print heads, the set of printing instructions including printing instructions at a first resolution for the first digital print head for printing a first print working and printing instructions at a second resolution different from the first resolution for the second digital print head for printing a second print working, the first print working being printed in a first region of the security document substrate and the second print working being printed in a second region of the security document substrate offset from the first region in a direction corresponding to the cross-feed direction; wherein the first digital print head is configured to print at the first resolution and the second digital print head is configured to print at the second resolution.

The digital print press is similar to that described above but is specifically configured to print in different resolutions in different lateral regions of the security document. This allows for resolution differences to be identified by inspecting different regions of the document as part of the authentication process. These laterally offset regions can be inspected without any visual confusion owing to overlapping of the arrays, which can be helpful where the arrays are of similar colour or dot size, for example.

There is also disclosed a method of digitally printing a security document, the method comprising: receiving a set of printing instructions relating to a security document; controlling a first digital print head so as to print a first print working, the first print working being received on a security document substrate in a first region in accordance with the set of printing instructions; and controlling a second digital print head so as to print a second print working, the second print working being received on the security document substrate in a second region in accordance with the set of printing instructions, wherein the second digital print head is laterally offset from the first digital print head in a cross-feed direction such that the second region is laterally offset from the first region in a direction corresponding to the cross-feed direction; wherein the first and second digital print heads are configured to print either directly onto the security document substrate, or to print onto a print area of one or more offset printing surfaces of an offset printing unit, wherein the one or more offset printing surfaces subsequently transfers the print received from the first and second digital print heads to the security document substrate; wherein the first digital print head is controlled so as to print at a first resolution and the second digital print head is controlled so as to print at a second resolution different from the first resolution; whereby the first print working on the printed security document comprises a first array of printed elements arranged according to a first grid of lattice points corresponding to the first resolution and the second print working on the printed security document comprises a second array of printed elements arranged according to a second grid of lattice points corresponding to the second resolution.

This method may be performed using a digital printing press described previously. Each of the above preferable features of the printing press has corresponding features in the context of this method.

As has been mentioned above, the use of non-standard colours enhances the security of a security document and this is not dependent on a resolution difference between different workings. Therefore, in accordance with a third aspect of the present invention, there is provided a method of digitally printing a security document, the method comprising: digitally printing a first print working on a first surface of a security document substrate in a first region, wherein the first print working comprises a first array of printed elements in a material of a first colour; digitally printing a second print working on the first surface of the substrate in a second region, wherein the second print working comprises a second array of printed elements in a material of a second colour and wherein the first and second regions at least partially overlap one another such that the overlapping first and second arrays exhibit a combined colour; and wherein at least the first colour is not one of CMYK. Preferably neither of the first and second colours is one of CMYK. Preferably at least the first colour is a hue that is not one of CMY.

CMYK colours are considered to be those used in conventional CMYK printing, as will be described in more detail below. Printing in non-standard colours, particularly colours outside of the CMYK colour gamut, ensures that the appearance of the resulting printed security document is more difficult to accurately replicate with a conventional CMYK printer. For example, if the inks used all lie within the CMYK colour gamut, but do not provide the full range of the CMYK colour gamut, this can cause scanners to adjust the scanned colours to correct what it perceives as errors in the detected colours. This can lead to poor colour replication in attempted counterfeits. Alternatively, if the inks used are not the standard CMYK, an area of an authentic security document might use only one working, whereas a counterfeit made using CMYK might have to mix the colours of two workings to reproduce that colour, thereby providing a means of detecting a counterfeit.

Specific information concerning CMYK values may be found in the ISO12647 standard. In particular, the ISO12647-7 standard specifically deals with “Proofing processes working directly from digital data”. As set out in this standard, a colour will be considered to be one of CMYK if the Euclidean distance $\Delta E^*_{ab}$ (often referred to as "Delta E") between the colour used and any one of CMYK in CIELAB colour space (i.e. the CIE 1976 L*a*b* colour space) is 5 or less. The value of $\Delta E^*_{ab}$ is measured using the formula $$\Delta E^*_{ab}=\sqrt{(\Delta L^*)^2+(\Delta a^*)^2+(\Delta b^*)^2}$$

Where $\Delta L^*$, $\Delta a^*$ and $\Delta b^*$ are the distance between the two colours along the L*, a* and b* axes respectively (see "Digital Color Imaging Handbook" (1.7.2 ed.) by G. Sharma (2003), CRC Press, ISBN 0-8493-0900-X, pages 30 to 32). The colour difference $\Delta E^*_{ab}$ can be measured using any commercial spectrophotometer, such as those available from Hunterlab of Reston, Va., USA. With the CMYK colours being defined by $\Delta E^*_{ab}$, the CMYK colour gamut will be considered as the range of colours producible by all possible combinations of CMYK up to $\Delta E^*_{ab}=5$.

It will be noted that, in the present aspect, the first colour overlaps the second colour so as to exhibit a combined colour. In other words, the first colour is analogous to a so-called "process colour" rather than a "spot colour". CMYK printing has often been supplemented with "spot colours", which provide one specific colour, e.g. brand colours for printed matter associated with a company brand. Spot colours differ from process colours in that they are not generally used as a colour component for generating a combined colour. The standard process colours are overprinted with one another to provide access to the full CMYK colour gamut, e.g. cyan and yellow are overprinted to provide green.

Most preferably, at least one of the colours lies outside of the CMYK colour gamut, in which case the printed security document may contain colours that simply cannot be replicated with the inks available in a conventional CMYK printer. In this case, preferably the exhibited combined colour also lies outside of the CMYK colour gamut so that conventional CMYK printing cannot replicate the combination of the first and second colours either.

Certain conventional printing techniques utilise additional inks, such as orange and green as part of an expanded colour gamut. Preferably the method avoids these colours as well so that these rarer conventional digital printers cannot accurately replicate the security document either. That is, preferably at least the first colour is not one of CMYKOG, and preferably lies outside of the CMYKOG colour gamut. CYMKOG, also known as the "hexachrome" system, is described in U.S. Pat. No. 5,734,800A. In this preferred example, preferably the exhibited combined colour lies outside of the CMYKOG colour gamut as well.

So that the non-standard first colour is clearly visible as an authentication means, preferably at least part of the first region is not overlapped by the second region such that the first colour is exhibited in said part of the first region.

As mentioned above, not only is it preferable to print using a non-standard colour, it is preferred if one of the standard colours is entirely omitted from the printing process. That is, preferably at least one of CMYK, more preferably at least one of CMY, is not used. This may reduce the colour gamut of the printed banknote and lead to errors when attempting to scan the printed document.

It will be appreciated that the above preferred implementations of non-CMYK colours may be used in any of the other aspects of the invention.

In accordance with a fourth aspect of the present invention, there is provided a digitally printed security document comprising: a security document substrate; a first digitally printed print working on a first surface of the security document substrate in a first region, wherein the first print working comprises a first array of printed elements in a material of a first colour; a second digitally printed print working on the first surface of the security document substrate in a second region, wherein the second print working comprises a second array of printed elements in a material of a second colour and wherein the first and second regions at least partially overlap one another such that the overlapping first and second arrays exhibit a combined colour; and wherein at least the first colour is not one of CMYK.

This corresponds to a security document printed using the method according to the third aspect of the invention. The preferable features discussed above with respect to the third aspect apply equally to this aspect of the invention.

Preferably, the security document is one of a banknote, a polymer banknote, a cheque, a passport, an identity card, a certificate of authenticity, a fiscal stamp, a licence, an identification document and a visa According to a fifth aspect of the invention, there is provided a digitally printed security document comprising: a security document substrate; a first digitally printed print working on a first surface of the substrate in a first region, the first print working comprising a first array of printed elements, at least one of the elements having a first element thickness in a direction perpendicular to the surface of the security document substrate; and a second digitally printed print working on the first surface of the substrate in a second region, the second print working comprising a second array of printed elements, at least one of the elements having a second element thickness in the direction perpendicular to the surface of the security document substrate, the second element thickness being greater than the first element thickness.

This fifth aspect of the invention enhances the security of digitally printed security documents by requiring different printed elements within different workings to have different thicknesses. As mentioned above when this concept was introduced in relation to the first aspect of the invention, this provides a feature of the printed document that can be checked in order to authenticate the security document, i.e. to confirm that it was printed by a secure digital printing technique. These different thicknesses of the printed elements cannot be replicated by conventional digital printers that print all three inks with the same dot size and hence approximately the same element thickness.

It will be noted that this technique does not require the printed workings to be in different resolutions, i.e. to have different grids of lattice points representing the possible printed element positions. However, the combination of differing resolutions and differing element thicknesses does present a particularly secure combination and so all of the features discussed below in relation to this aspect of the invention may also be applied to the security document of the first aspect.

It should be noted that the document according to this aspect of the invention may have only a single element in the first working with the first, smaller thickness and/or a single element in the second working with the second, larger thickness. For example, all other elements could have the same thickness as one another. Such a document may then be authenticated by inspecting, e.g. with a microscope, a predetermined location of the security document to verify that there are these anomalous printed elements with differing thicknesses. However, in the vast majority of cases, it will be preferred that a plurality of the elements in each working have the respective first and second thicknesses. Indeed, it may be preferred that each printed element in the first array of printed elements, or in the first print working, has the first thickness, and each printed element in the second array of printed elements, or in the second print working, has the second thickness. In order to counterfeit such documents, it would be necessary to achieve the required thickness variation of the printed elements at various positions across the document, or even across the whole printed document.

The element thickness will be influenced by a number of factors. In particular the ink drop size, the impact velocity (and so the nozzle ejection velocity), the density and viscosity of the ink, and the surface tension of the ink will affect the thickness of a digitally, i.e. inkjet, printed element. Further information on how these factors influence element thickness may be found in "Impact of an Ink Drop on Paper", Akira Asai et al., Journal of Imaging Science and Technology, 37: 205-207 (1993). A simple way to increase element thickness would be to use different inks having similar densities, viscosities, and surface tensions, and use similar impact velocities, but increase the ink drop size between the workings. Alternatively, it may be desired to use an ink that is more viscous and has a higher surface tension for the printing of the second working.

Preferably, the first element thickness is at most 30 μm, preferably at most 25 μm, further preferably at most 20 μm, most preferably in the range 5 to 15 μm, and the second element thickness is at least 15 μm, preferably at least 20 μm, further preferably at least 25 μm, most preferably the range 25 to 35 μm. The sizes selected will depend upon the type of design desired. For example, if large print elements are required for a coarse print working, e.g. so that this varying thickness effect is readily distinguishable, then the first element thickness could be as large as 30 μm, in which case the second element thickness would be even larger, e.g. 60 μm. On the other hand, if it desired to disguise this effect to the naked eye, then the second element could be as small as 15 μm, in which case first element should be even thinner, e.g. 5 μm. Some preferred relative thicknesses are given below.

Preferably, the second element thickness will be at least 10% greater than the first element thickness, preferably at least 25% greater, more preferably at least 50% greater, most preferably at least 100% greater than the first element thickness. In practice, the second element thicknesses may exceed double the first element thickness and this relationship may go to e.g. the second element thickness being 150% greater than the first element thickness. It will be clear that significantly different thickness variations are preferred so that this property of the print workings can be clearly identified. That is, the larger the thickness difference, the easier it will be to authenticate the document by inspecting the dot thicknesses. Indeed, larger thicknesses may be authenticatable by touch, e.g. by comparing the feel of a region entirely or predominantly containing elements of the second print working with regions entirely or predominantly containing elements of the first print working. In contrast with known tactile features, these printed elements are integrated directly into two digitally printed workings, which may be used to digitally print images, and a user will be able to check that the different levels of tactility correspond to different areas of the combined digitally printed images, which may have different appearances, e.g. different colours, that correlate with tactility. On the other hand, smaller thickness differences may provide a more covert authentication feature, being one that e.g. needs a microscope to detect, and which may not even be identified as a feature to be replicated by one attempting to counterfeit the document.

One option for producing elements of the second working that have a greater thickness than the elements of the first working is to print the second working with larger drop sizes in order to increase the amount of material deposited. By controlling this in combination with the properties of the materials deposited, e.g. the viscosity of the inks used for the two workings, and in combination with printing parameters such as nozzle jet velocity, it is possible to ensure that the larger drop sizes will result in significantly different thicknesses of the printed elements. However, the use of larger drop sizes will typically produce a significant increase in dot size along with the increase in thickness. In certain circumstances, it may be preferred to keep the dot sizes of the two workings comparable while still obtaining significant thickness variations. Not only could this help from an aesthetic perspective, but it may pose a challenge to counterfeiters attempting to replicate the varying thicknesses of the printed elements if they are simultaneously faced with the challenge of keeping dot size consistent between the workings. One way the present inventors have found that thickness can be increased is to provide that one or more elements of the second array of printed elements having the second element thickness are provided by at least two superposed layers of material having substantially the same optical characteristics, and preferably they are the same material, e.g. the same ink. For example, one or more elements may be formed by printing a first element layer, e.g. a first dot, with a digital print head, allowing the dot to dry, and then printing a second element layer directly on the first, i.e. printing a second dot directly on the first dot. Alternatively, as will be described below, the first layer may be printed with a material having a curable additive, e.g. a curable ink, and the second layer printed with a material having the same optical characteristics, either with the curable material (e.g. the same curable ink) or without the curable additive. It has been found that this significantly increases the thickness of the printed element without increasing its lateral dimensions significantly. This way of forming the elements with the second thickness will be described in more detail below.

In embodiments in which the elements with the second thickness are formed by two superposed layers, preferably each of the one or more elements of the second array of printed elements having the second element thickness comprises a first layer disposed on the security document substrate and a second layer disposed on the first layer, wherein the second layer preferably has smaller lateral dimensions than the first layer, or wherein the second layer preferably has larger lateral dimensions than the first layer. While the second dot printed onto the first dot may be identical e.g. same drop size and ejection velocity etc., it may be preferred to adjust the parameters of the second dot that will be printed over the first dot to form the thicker elements of the second working. For example, if the second layer is printed with a drop size smaller than that of the first layer, it may provide more registration tolerance for increasing height without increasing lateral dimensions of the elements. For example, with dots of the same size, any misregister will lead to the dots partially overlapping. This will increase height, but will also increase lateral dimensions. If the second dot is smaller, then there are a range of positions that the second dot may fall and remain entirely within the first dot forming the lower first layer. Alternatively, it may be desired to adjust the parameters of the second dot that will be printed over the first dot to form the thicker elements of the second working so that it has larger lateral dimensions, e.g. it is printed with a larger drop size. This is a second approach to masking misregistration between the dots. Here, the second dot forming the second later will envelope the first dot forming the first layer. The final lateral dimensions will to a large part be predetermined by the parameters of the second dot. The position of the first dot relative to the second dot will largely be disguised by the encompassing nature of the second dot.

In particular in embodiments in which the elements with the second thickness are formed by two superposed layers of the second material, it is possible to achieve consistent lateral dimensions of the printed elements. Preferably, at least some of the elements of the second array of printed elements having the second element thickness have a smallest lateral dimension, no more than 100% greater than a smallest lateral dimension of the elements of the first array of printed elements having the first element thickness, preferably no more than 50% greater, more preferably no more than 25% greater, most preferably no more than 10% greater than the smallest lateral dimension of the elements of the first array of printed elements having the first element thickness. Indeed, in some embodiments, the smallest lateral dimensions for the elements having the first and second thicknesses may be substantially the same. While the preferred way to provide these comparable lateral dimensions may be through double layering of the second printed elements, it would also be possible to achieve similar results by controlling properties of the printed materials, e.g. using a more viscous ink for the second print working, and/or by controlling the printing parameters, e.g. using a lower nozzle velocity for the second working.

As has been mentioned above, preferably, the first and second regions at least partially overlap one another such that at least one element of the first array of printed elements having the first element thickness is provided adjacent at least one element of the second array of printed elements having the second element thickness. This enables for a direct comparison of the two element thicknesses. In some embodiments, the first and second regions may overlap without the elements with different thicknesses being adjacent to one another, but this will still make the device more readily authenticatable as the differing thickness elements will nonetheless be closer to one another. Furthermore, overlapping workings will reveal any misregister in counterfeits that have used separate printers to print the different workings, e.g. to try to mimic the differing element thicknesses using different types of printer.

As has been mentioned above, the first print working is printed typically in a first material, preferably a first ink, and the second print working is printed in a second material, preferably a second ink, different from the first material. However, it would also be possible to print the two workings in the same material, if this was desired.

Preferably, the first and second materials have different optical characteristics. Optical characteristics include the colour of the material, as well as other optical properties, such as its opacity or translucency, or whether it contains reflective particles, e.g. a metallic ink. Greater differences in optical characteristics increase the discrimination of the two different workings. Examples have been given above as to how materials may differ, e.g. the materials may be selected from the list: colour-shifting ink, metallic ink, luminescent ink, fluorescent ink, phosphorescent ink, infrared absorbing ink, thermochromic ink, or photochromic ink.

Again, the digitally printed security document is preferably one of a banknote, a polymer banknote, a cheque, a passport, an identity card, a certificate of authenticity, a fiscal stamp, a licence, an identification document and a visa.

Typically a plurality of security documents of this type will be provided and some advantageous ways of doing so will now be described.

A plurality of digitally printed security documents according to the fifth aspect may be provided in which the or each element of the first array of printed elements having the first element thickness has the same position relative to the or each element of the second array of printed elements having the second element thickness on each of the plurality of digitally printed security documents. In other words, the elements with the differing heights may appear in the same relative position on each note. This ensures that a viewer can know where to look on the document to find the elements having different heights. For example, if the workings are provided to define an image, such as a portrait, the viewer may know that the elements in a certain area of the portrait should contain a mixture of elements with the first and second thicknesses. While this is preferable, it would also be possible to randomly provide elements with different thicknesses across the digitally printed workings, in which case the documents would differ from one another.

In another example, a plurality of printed security documents are provided according to the fifth aspect, in which the first and/or second print workings provide each of the plurality of security documents with fixed content and variable content, the fixed content being the same for each of the plurality of security documents and the variable content changing between at least some of said plurality of security documents, the variable content preferably being unique to each of said plurality of security documents. Other printing techniques which could be used to provide elements of differing thickness, e.g. tactile security features, typically cannot produce variable content, e.g. flexographic printing, which uses engraved plates. The use of secure digital printing, however, enables two digital print workings to provide elements of different heights and to simultaneously define the printed content of the security document, including variable content. Preferably, the variable content of each of the plurality of security documents is defined at least partially by the at least one element (typically a plurality of elements) of the second array of printed elements having the second thickness, and/or is defined at least partially by the at least one element (typically a plurality of elements) of the first array of printed elements having the first thickness. Most preferably, a combination of elements from the first working having the first thickness and elements from the second working having the second thickness will be used to define the variable content. Here, we are deliberately providing the elements with varying thickness in the variable content to clearly display that the printing technique used was able to print different elements with different thicknesses in different positions, as required. A counterfeiter will find it very difficult to convincingly replicate these capabilities with conventional means.

According to a sixth aspect of the present invention, there is provided a method of digitally printing a security document, the method comprising: digitally printing a first print working on a first surface of a security document substrate in a first region such that the first print working comprises a first array of printed elements, at least one of the elements having a first element thickness in a direction perpendicular to the surface of the security document substrate; digitally printing a second print working on the first surface of the substrate in a second region such that the second print working comprises a second array of printed elements, at least one of the elements having a second element thickness in the direction perpendicular to the surface of the security document substrate, the second element thickness being greater than the first element thickness. This method corresponds to a method of digitally printing a security document according to the fifth aspect of the invention. This method may therefore be adapted to provide any of the preferable features described above with respect to this aspect.

Preferably, digitally printing the first print working comprises digitally printing the first print working with a first digital print head and wherein digitally printing the second print working comprises digitally printing the second print working with a second digital print head different from the first digital print head. The use of different types of print head in a digital printing press has been described above. This enables significantly different materials, i.e. significantly different inks, to be used by the different print heads for printing the first and second workings. As we have explained above, varying the characteristics of the ink, together with the ejection speed and drop size of the digital print head, can be used to control the thickness of the digitally printed elements. Therefore, the use of different heads is very useful for enabling the printing of these security documents.

As we explained above, one way in which the printed elements may be made thicker is by superposing two layers of the same material, i.e. double printing a dot. While this could be performed by one and the same print head, i.e. the same nozzle could print both layers of the same printed element, it is expected that this would significantly slow the digital printing process, as the first layer of the printed element should be allowed to dry before it is overprinted with the second layer. Therefore, preferably, digitally printing the second print working comprises digitally printing an array of elements in a second material with the second print head and further comprises digitally printing in a third material with a third digital print head onto one or more of the array of elements printed by the second digital print head so as to form the element(s) of the second array of elements having the second thickness, wherein the third material has substantially the same optical characteristics as the second material, preferably wherein the third material is the same as the second material. Here, the third digital print head will typically be the same as the second digital print head. This will allow it to print in the same (or a similar) ink as the second digital print head and will allow it to print the second layer, i.e. the second dot, with the same size and on the same positions, i.e. on the same grid of lattice points. It will be important to register the printing of the second and third digital print heads so that the third print head can accurately print its dots onto the dots already printed by the second print head. Such registration may be facilitated by using a web-based rather than sheet-fed system, and by using conventional registration techniques for digital printing, such as detectable registration marks. We also disclose further below techniques that will improve registration tolerances by adjusting the size of the drop that forms the second layer of each element.

In some embodiments, the second material is a curable material, and the method further comprises curing the second material at least partially before digitally printing in the third material with a third digital print head onto one or more of the array of elements printed by the second digital print head. In this embodiment, the third material may or may not be curable. For example, it may be exactly the same curable ink, or it may lack curable additives. Providing the second material as a curable material and curing before overprinting ensures that the first printed dot has hardened and provides a firm surface on which the third print head may print its dot.

BRIEF DESCRIPTION OF THE DRAWINGS

The present invention will now be described with reference to the accompanying Figures, of which:

FIGS. 4A to 4D show, schematically, a print head of another print bar in front view and a cross-section during the dispensing of three different drops of ink respectively;

DETAILED DESCRIPTION

A first printing press and method of printing a security document will now be described with reference to FIGS. 1A to 7C.

Figure 1A:
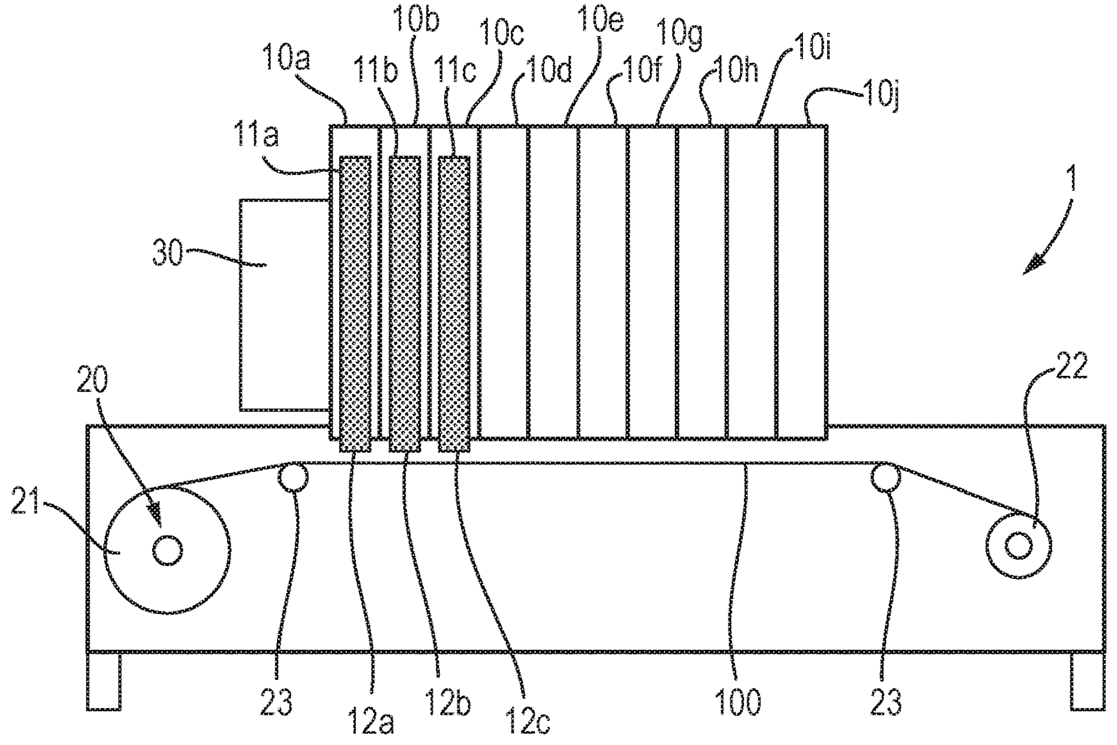
FIG. 1A illustrates, schematically, a digital printing press and FIG. 1B

FIG. 1A shows a digital printing press. The digital printing press comprises an array of print bar holders 10*a* to 10*j*. Each of the print bar holders is able to receive and support a respective digital print bar over a substrate 100. In FIG. 1A, only the first to third print bar holders 10*a* to 10*c* are illustrated as holding a respective print bar 11*a* to 11*c*. In practice, more print bars may be provided in respective ones of the print bar holders 10*a* to 10*j*, up to the maximum of 10 permitted on the illustrated machine.

The digital print press 1 comprises a transport system 20. The transport system 20 feeds a web of substrate 100 from a pre-print spool 21 to a post-print spool 22. Between the pre-print and post-print spools 21 and 22, the web of substrate 100 is fed sequentially past each print bar supported by the respective print bar holders 10*a* to 10*j* in such a way as to allow the digital print heads of the digital print bars to print onto the first surface (upper surface) of the web of substrate material 100. The web of substrate material 100 is fed between the pre-print and post-print spools 21 and 22 by a plurality of rollers 23, which act to guide and support the substrate web 100 as it passes through the digital print press 1.

The first print bar 11*a* comprises a first digital print head 12*a* located at the bottom of the print bar 11*a*. Similarly, the second and third print bars 11*b* and 11*c* comprise respective second and third digital print heads 12*b* and 12*c* located at the bottom of the print bar 11*b*, 11*c*. The digital print heads 12*a* to 12*c* face down so as to be able to print onto the upper facing surface of the substrate web 100 as it is conveyed through the digital print press 1, sequentially beneath each of the digital print bars.

The system may be fitted with conventional print bars, some examples of which will now be given. One print bar that may be included in the digital print press is the Dimatrix Samba G3L manufactured by Fujifilm Dimatrix, which prints with a resolution of 1200 DPI and drop sizes of 2.4 to 13 picolitres, and may be configured to print in red using aqueous or UV inks and may print fine line patterns or microtext onto the security document substrate. Another example is the KM1800i, manufactured by Konica Minolta, which prints at 600 DPI and with drop sizes of 3.5 to 18 picolitres and may print in green or orange using aqueous, solvent, UV and speciality inks, and is suitable for printing more general design elements of the printed security document, such as portraits or backgrounds. Another example is the Saffire QS256, manufactured by Fujifilm Dimatrix, which prints at 100 DPI with drop sizes of 10, 30 and 80 picolitres, and may use UV, aqueous, thermochromic, MICR and conductive inks, for example. A further print bar that may be used is the KM1024, manufactured by Konica Minolta, which prints at 360 DPI with drop sizes of 6, 14 and 42 picolitres, and may use aqueous, solvent, UV and speciality inks. As will be described below, the digital print press is configured such that the different print heads print at distinctively different resolutions and dot sizes, so in practice, a mixture of different print bars will typically be installed into the digital print press.

Figure 16:
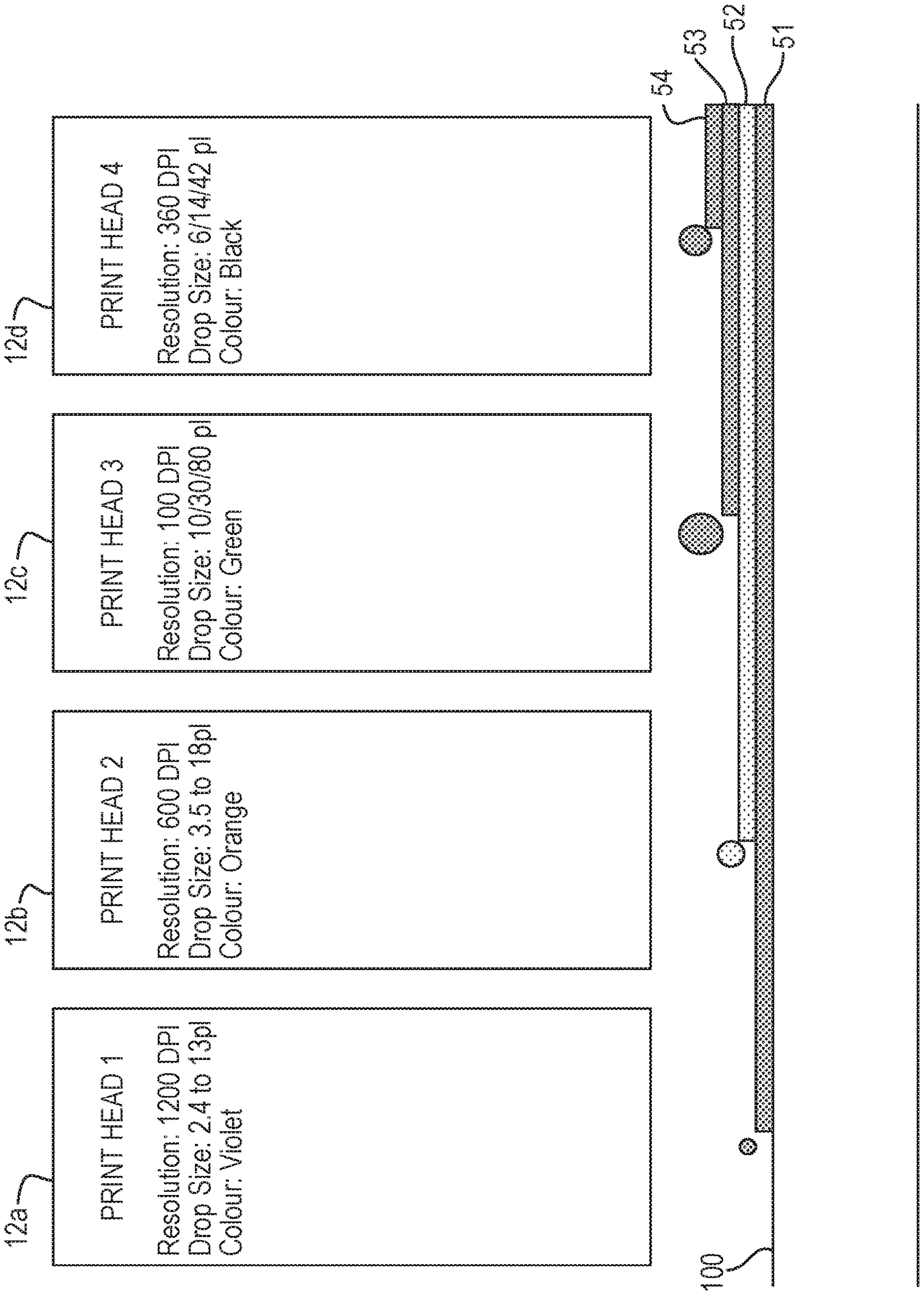
FIG. 16 illustrates one specific configuration of the digital print press FIG. 1A.

FIG. 16 is included, which shows one specific set-up of the digital print press of FIG. 1A. In this example, the first digital print head 12*a* is configured to print with a resolution of 1200 DPI, drop sizes from 2.4 to 13 pl, and in the colour violet. The nozzle size of this print head may be 5 microns. This high resolution print head is configured to print a first working 51 onto the surface of the substrate 100. This working may be, for example, a fine line pattern. The second digital print head 12*b* is configured to print with a resolution of 600 DPI, drop sizes from 3.5 to 18 pl and in the colour orange. The nozzle size of this print head may be 20 microns. This may print a working 52 comprising general elements, such as a portrait, onto the security document. The third digital print head 12*c* is configured to print with resolution 100 DPI, drop sizes 10, 30 and 80 pl and in the colour green. The nozzle size of this print head may be 80 microns. This may print a working 53, for example, a visibly screened background, i.e. comprising large printed dots, to the document. Finally, a fourth digital print head 12*d*, which may be provided as part of a digital print bar in the fourth print bar holder 10*d*, is configured to print in a resolution of 360 DPI, with drop sizes of 6, 14 and 42 pl and in the colour black. The nozzle size of this print head may be 40 microns. This may print another screened working 54 to the surface of the document. While FIG. 16 shows each printed working as a complete layer, with each overlapping all previously printed workings, it will be appreciated that this is for schematic representation of the workings only. The workings will each typically have gaps and variations in accordance with their respective printed patterns and different ones of the workings may be provided in different regions of the security document and may overlap or partially overlap one another as desired and as required for building up the complete printed security document. It should be noted that the nozzle pitch of the above print heads will be equal to the resolutions with which they are configured to print. 100 and 360 DPI is an example of print heads having nozzle pitches that share a non-integer multiple relationship. The resulting printed resolution will likewise share a non-integer multiple relationship. In this example, each digital print head extends the full width of the transport path so as to be able to print on the whole document surface.

The digital print press shown in FIG. 1A also includes a controller 30 adapted to control the various print bars installed in the print bar holders 10*a* to 10*j*. In particular, the controller controls the print bars so as to print in accordance with the methods that will be described below.

Figure 1B:
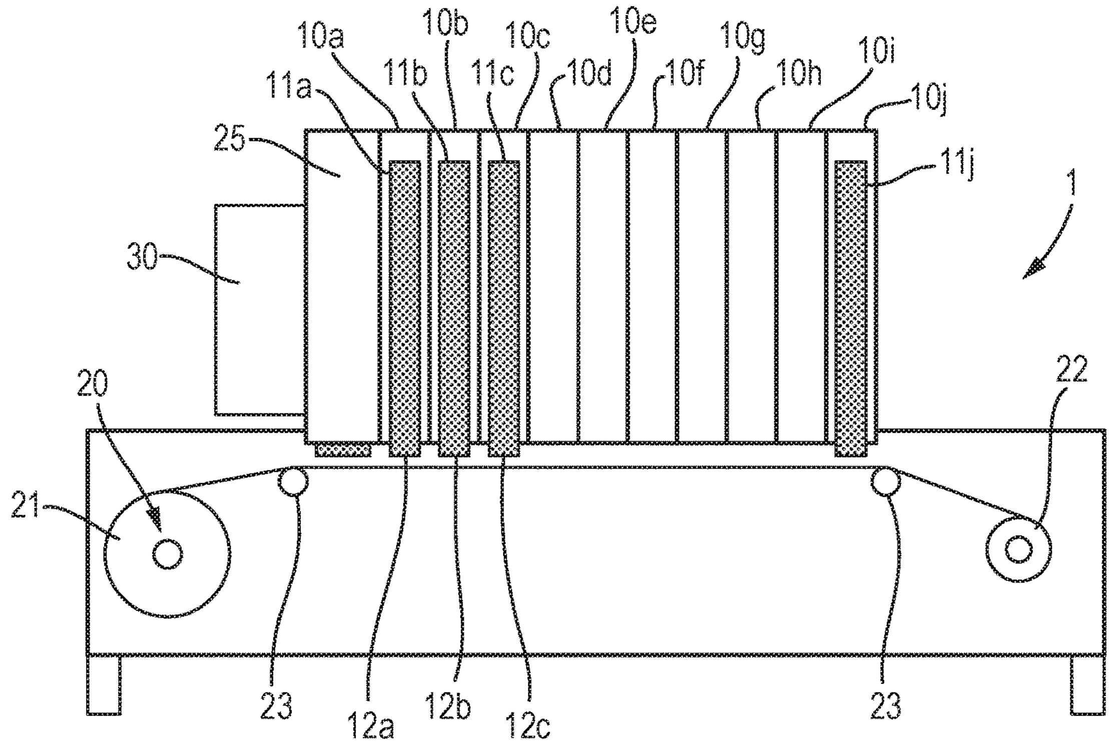
FIG. 1C illustrates alternative digital printing presses.

FIG. 1B shows an alternative digital print press. This print press is identical to that shown in FIG. 1A, except in that it includes a corona treatment unit 25 and a finishing digital print bar 11*j* in the final print bar holder 10*j*. The corona treatment unit is configured to provide a corona treatment to the substrate prior to printing and the finishing digital print bar 11*j* is configured to print down a varnish coating onto the security document substrate after printing. While this is shown in the final print bar holder, it could be provided in any of the print bar holders, but should be the last printing step.

Figure 1C:
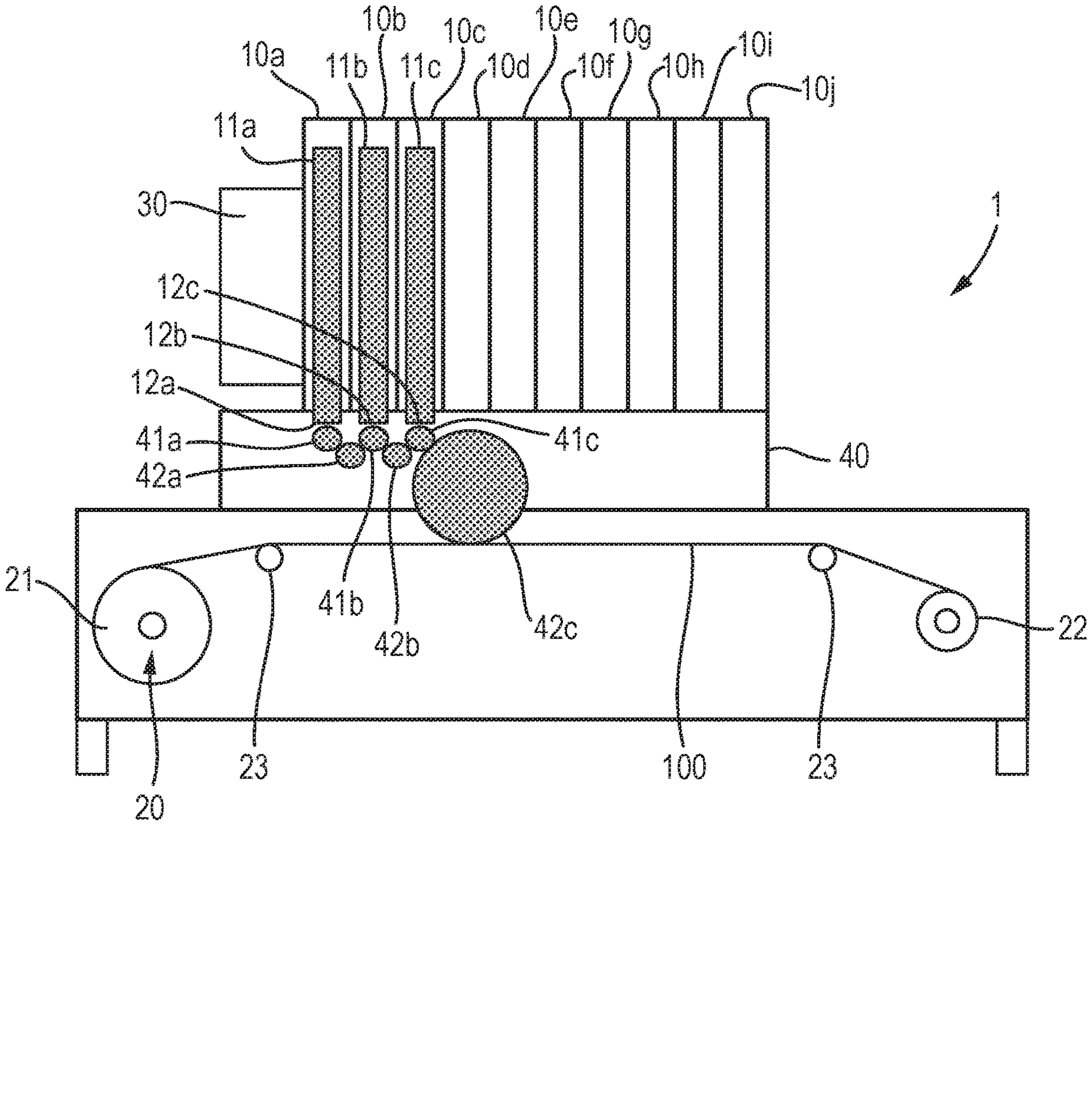

FIG. 1C shows another alternative digital print press. This print press is again identical to that shown in FIG. 1A, except in that it includes an offset printing unit 40. Instead of each digital print head 11*a*, 11*b* and 11*c* printing directly onto the security document substrate web 100, a series of offset print cylinders are provided 41*a* to 41*d* between the print heads and the substrate web. The first digital print head 12*a* prints its print working onto the first offset print cylinder 41*a*. The first offset print cylinder 41*a* rotates and transfers this print working onto a second offset print cylinder 41*b*, via an intermediate offset print cylinder 42*a*. As the print working passes underneath the second digital print head 12*b*, it prints the second print working over the first print working on the second offset print cylinder 41*b*. The second offset print cylinder 41*b* rotates and transfers this print working onto a third offset print cylinder 41*c*, via a second intermediate offset print cylinder 42*b*. As the two print workings pass underneath the third digital print head 12*c*, it prints the third print working over the first and second print workings on the third offset print cylinder 41*c*. The third offset print cylinder 41*b* rotates and transfers this print working onto a final intermediate offset print cylinder 42*c*, which rotates and transfers all three workings onto the security document substrate web 100.

Figure 2A:
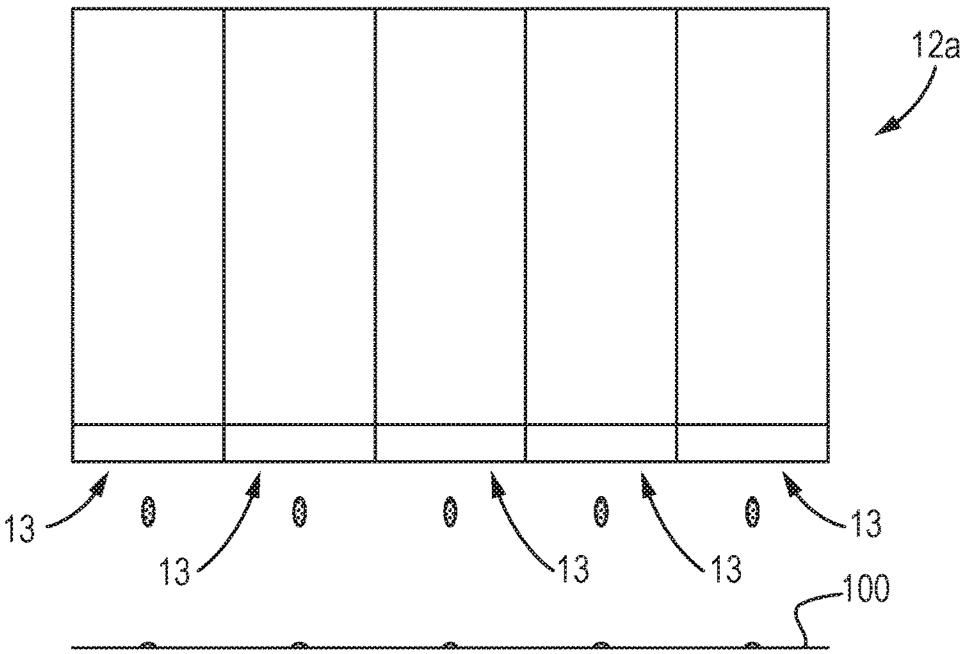
FIGS. 2A and 2B show, schematically, a print head of the print head shown in FIG. 1A is front and cross-section respectively.
Figure 2B:
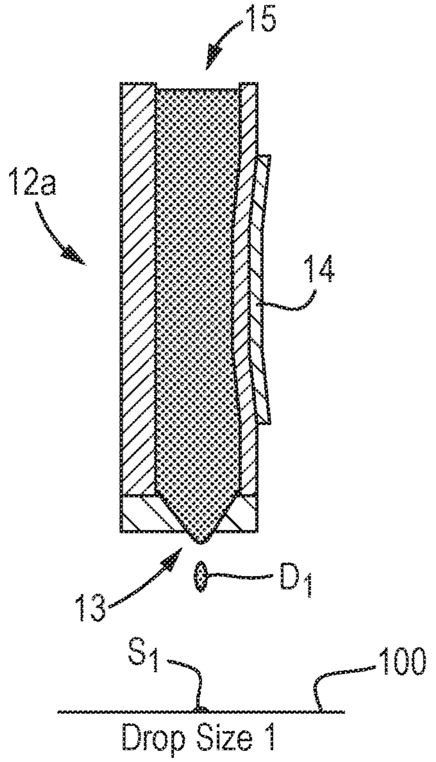

FIGS. 2A and 2B schematically illustrate the construction of the first digital print head 12*a*. FIG. 2A shows that the first digital print head 12*a* comprises an arrangement of nozzles 13 arranged along a cross-feed direction of the printing press. That is, the array of nozzles 13 extends in a direction perpendicular to the direction in which the substrate web 100 is transported through the digital print press 1. The arrangement of nozzles 13 along the cross-feed direction enables the nozzles to print across the full width of the substrate web at 100. It should be noted here that the arrangement of the nozzles 13 along the cross-feed direction determine the cross-feed resolution of the first digital print head 12*a*. That is, the arrangement of the nozzles 13 determines the distance between the printed dots on the surface of the substrate 100 in the cross-feed direction. It should be noted here that while only five nozzles 13 are shown extending along the cross-feed direction in FIG. 2A, this is purely for schematic illustration. In practice, many more nozzles will be provided, e.g. enough to provide the desired DPI across the full width of the substrate web 100.

FIG. 2B shows a cross-section through part of the first digital print head 12*a*. This shows that the digital print head 12*a* comprises, for each nozzle 13, a corresponding ink chamber 15 that holds an ink to be printed via the print nozzle 13, the ink chamber being in fluid communication with the print nozzle 13. In this example, each ink chamber 15 of the first digital print head 12*a* contains an ink of a first colour, which is preferably not a colour used in standard CMYK printing. Adjacent to the fluid chamber 15 is a piezoelectric element 14. The element 14 is controllable by a controller so as to urge a drop $D_1$ of ink through the respective nozzle 13. Each nozzle 13 of the digital print head 12*a* has its own respective chamber 15 and piezoelectric element 14 so that each nozzle 13 can be independently activated so as to dispense drop of ink $D_1$, thereby printing a dot having size $S_1$ onto the substrate 100. The first digital print head 12*a*, in the present case, has a relatively low resolution, for example, 200 DPI in the cross-feed direction, and is controllable so as to print a single relatively large drop size, for example 40 picolitres.

FIGS. 3A to 3D schematically illustrate the second digital print head 12*b*, provided by the second print bar 11*b* installed into the second print bar holder 10*b*.

This second digital print head 12*b* again comprises an array of nozzles 13 extending along the cross-feed direction of the digital print head. FIG. 3 shows only 8 nozzles; however, it will be appreciated that many more nozzles will typically be provided so as to achieve the desired resolution across the full width of the substrate 100. In this example, the second digital print head 12*b* may be provided with a second cross-feed resolution of, for example, 600 DPI.

Figure 3A:
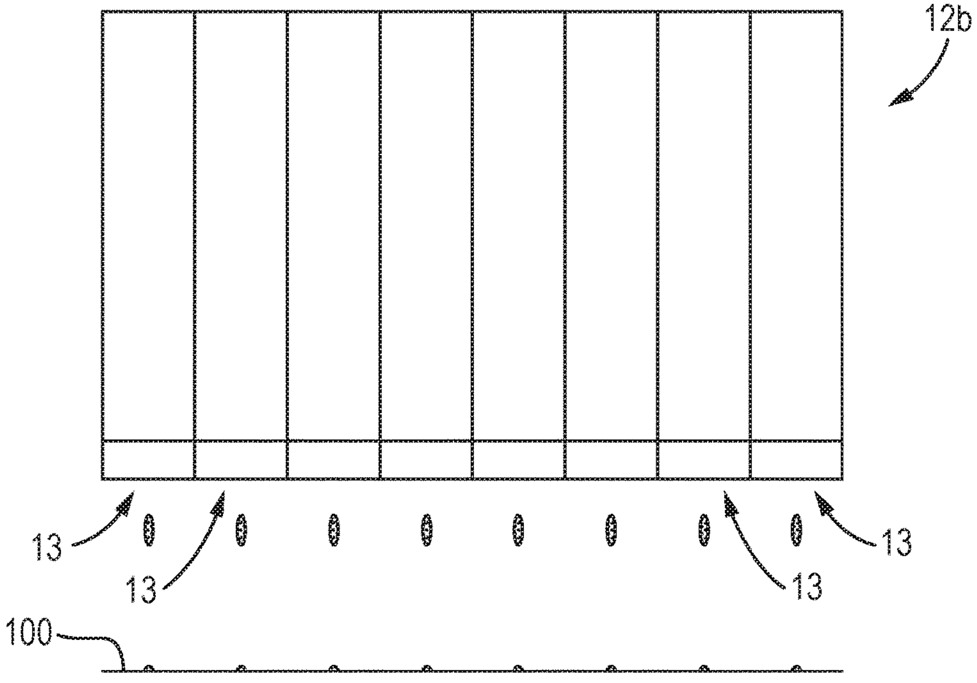
FIGS. 3A to 3D show, schematically, a print head of another print bar in front view and a cross-section during the dispensing of three different drops of ink respectively.
Figure 3B:
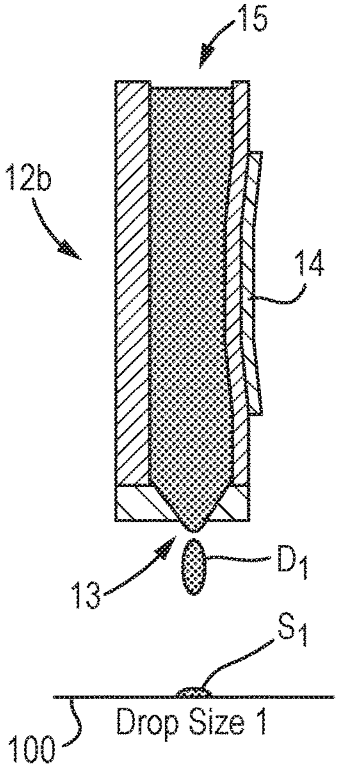
Figure 3C:
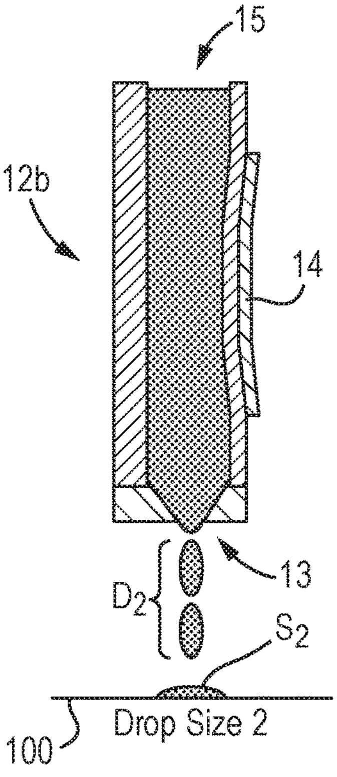
Figure 3D:
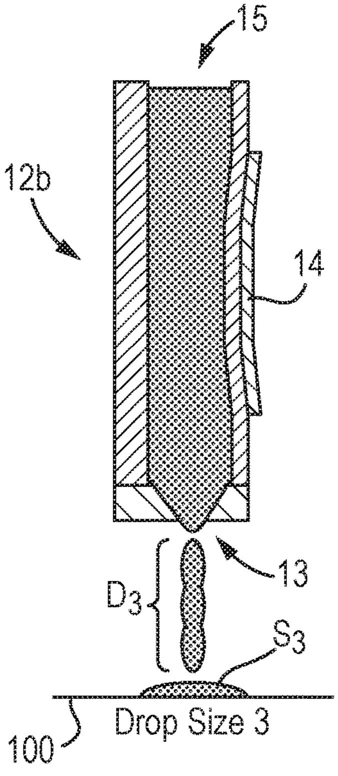

FIGS. 3B to 3D show respective cross-sections through part of the second digital print head 12*b*. These show a nozzle 13 dispensing each of the three different drop sizes $D_1$ to $D_3$. FIGS. 3B to 3D illustrate that the second digital print head 12*b* has the same general construction as the first digital print head 12*a*. That is, each nozzle 13 is supplied by a respective ink chamber 15 and is made to dispense a drop of ink by a respective piezoelectric element 14. In this example, each ink chamber 15 of the second digital print head 12*b* contains an ink of a second colour, which is different from the first colour and preferably not an ink used in CMYK printing. FIG. 3B illustrates one nozzle 13 of the second digital print head 12*b* printing a first drop size $D_1$, which may be 5 picolitres, so as to print a dot having a first dot size $S_1$. This first drop size is provided by the controller causing the piezoelectric element to follow a first predetermined actuation profile. FIG. 3C illustrates the nozzle 13 as it is made to dispense a second drop size $D_2$ by the controller causing the piezoelectric element to follow a second different actuation profile. This may cause the nozzle to dispense a drop size of, for example, 10 picolitres, so as to print a dot having a dot size $S_2$ larger than the first dot size $S_1$. Finally, FIG. 3D illustrates the nozzle 13 as it is made to dispense a third drop size $D_3$ by the controller causing the piezoelectric element 14 to follow a third actuation profile. This may cause the nozzle to dispense a drop size of, for example, 20 picolitres, so as to produce a dot having a third dot size $S_3$ larger than either of the first or second dot sizes $S_1$ and $S_2$. It will be noted that each of these printed dots varies in thickness in dependence on the drop size, and that this dot thickness may be selected to be different from the dot thickness of the dots printed by the print head shown in FIG. 2B. The precise dot thickness will depend not only on the drop size, but on the ejection velocity, and on the characteristics of the ink, i.e. its density, viscosity, and surface tension. In order to increase the difference in dot thickness, the ink in the second digital print head may be selected to, for example, be less viscous and have a lower surface tension than the ink used in the first digital print head.

FIG. 4A schematically illustrates the third digital print head 12*c* included in the third digital print bar 11*c* provided in the third digital print bar holder 10*c*. As illustrated in FIG. 4A, this third digital print head again comprises an array of nozzles 13, this time providing a third cross-feed resolution that is higher than provided on either of the first and second digital print heads 12*a* and 12*b*. The third cross-feed resolution may be, for example, 900 DPI. Again, while only eleven nozzles 13 are shown extending along the cross-feed direction in FIG. 4A it will be appreciated that many more nozzles will typically be provided so as to achieve the desired cross-feed resolution across the entire width of the substrate 100.

FIGS. 4B to 4D show different cross-sections through part of the third digital print head 12*c* and illustrate that the print head has the same generally construction as described with respect to the first and second digital print heads 12*a* and 12*b*. In this example, each ink chamber 15 of the third digital print head 12*c* contains an ink of a third colour different from the first and second colours and which is again preferably not a colour used in standard CMYK printing. These Figures again show that this digital print head is configured so as to dispense three different drop sizes $D_1$, $D_2$ and $D_3$ by the specific actuation profile of the piezoelectric element 14. In this example, the three drop sizes may be, for example, 3.5 picolitres, 7 picolitres and 13 picolitres. These three different drop sizes $D_1$ to $D_3$ will result in printed dots with three different dot sizes $S_1$ to $S_3$. These dots may have thicknesses less than those shown in FIGS. 3B to 3D. As mentioned above, in combination with the smaller drop sizes, the ink may be selected, for example, to have lower viscosity and lower surface tension in order to increase the thickness difference relative to the dots printed by the first and second digital print heads.

FIGS. 5 to 7C illustrate the print workings that may be formed by each of the first, second and third digital print heads 12*a* to 12*c* and how they combine to produce the final image.

Figure 5:
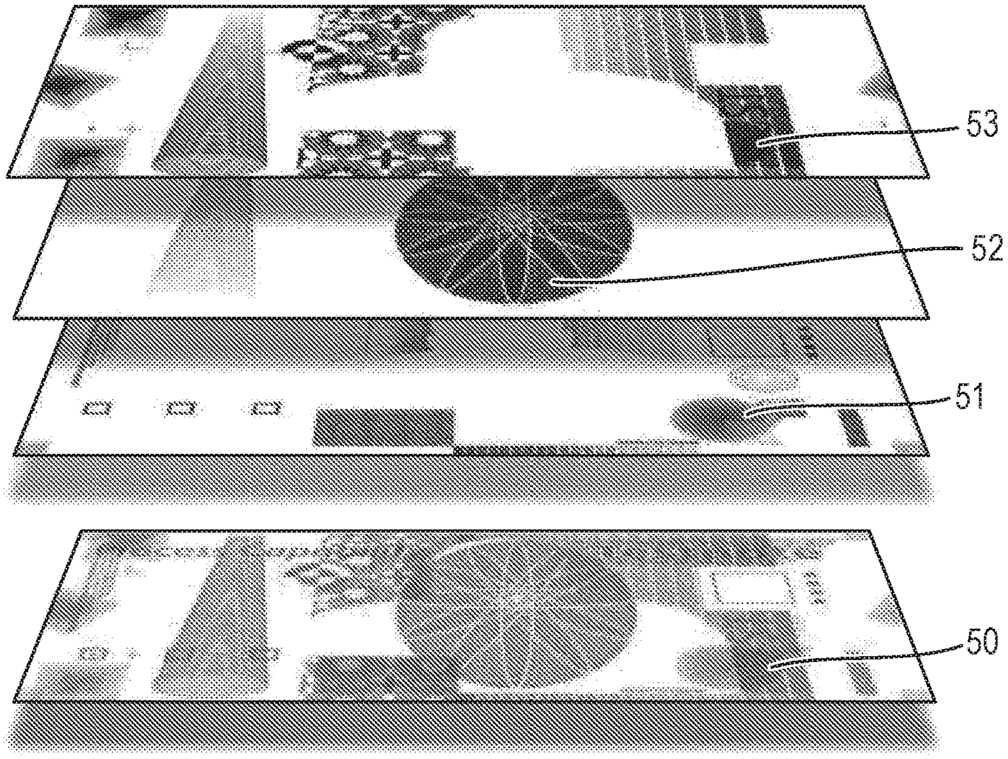
FIG. 5 shows three different printed workings as may be printed using the printing press of FIG. 1A and their combined appearance.

FIG. 5 shows the final printed image 50 that is produced by the combination of three printed workings 51, 52 and 53 printed respectively by the first to third digital print heads 12*a* to 12*c*.

In more detail the first print working 51 comprises part of a final printed banknote that will be printed by the first digital print head 12*a*. This print working will be printed in a first resolution corresponding to the resolution of the first digital print head 12*a*. As has been explained above, the resolution of the first digital print head in a cross-feed direction is set by the spacing of the print nozzles 13, while the resolution in a feed direction is determined by the controller, which controls the speed at which the substrate 100 passes beneath the first digital print head 12*a* and the rate in which the piezoelectric elements 14 are made to actuate to dispense drops of ink. Typically, the print head will be controlled so that the resolution in the feed direction is the same as the cross-feed resolution set by the spacing of the nozzles; however, this is not essential. The first working 51, which is printed in the first resolution, is also printed in the first colour, which is the colour of the ink contained in the first digital print head 12*a*.

The second print working 52 is the part of the final printed bank note printed by the second digital print head 12*b*. Again, this second print working will be in a second resolution that is different from the first resolution since the second digital print head 12*b* is configured to print at a different resolution to the first digital print head 12*a*. Furthermore, the second print working 52 will be printed in a second colour which is the colour of the ink contained in the second digital print head.

Finally, the third working 53 is printed by the third digital print head 12*c*. The third print working 53 is printed at a third resolution determined by the resolution of the third digital print head. The third working 53, therefore, has a resolution different to the first and second print workings 51 and 52. Again, the third print working 53 will be printed in the third colour, which is the colour of the ink provided in the third digital print head 12*c*.

As mentioned above, preferably one or more of the first second and third colour is not a standard CMYK colour. Further preferably, one or more of the colours is outside of the CMYK colour gamut. The final printed image will accordingly have non-CMYK components which cannot accurately be replicated using a conventional CMYK printer.

Figure 6:
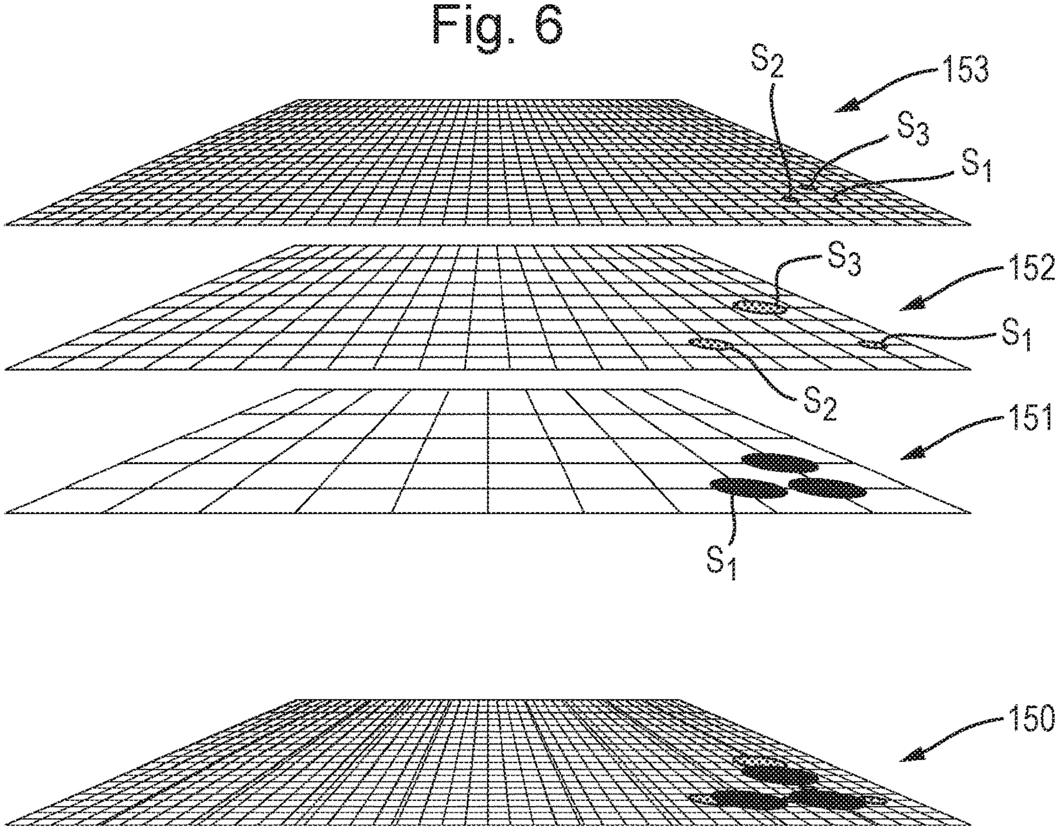
FIG. 6 shows an enlarged part of the three different printed workings and grid of lattice points on which the printed dots are arranged.

FIG. 6 illustrates a small part of each of the first to third print workings 51 to 53. Specifically, FIG. 6 shows a first grid 151, which represents all the possible locations at which the first digital print head 12*a* may print a dot of ink. This illustrates that only some of these positions will be provided with a dot of ink of size $S_1$ in accordance with the parts of the overall printed image being built up by the first print working 51. This Figure also shows a grid 152 of possible positions in which the second digital print head may print dots of ink. This also shows the different sized dots of ink $S_1$, $S_2$ and $S_3$ that may be printed by the second digital print head 12*b* at each one of these possible print positions. Finally, grid 153 represents all of the possible locations at which the third digital print head 12*c* may print a dot of ink. Again, this shows that certain locations are printed with one of the three possible dot sizes $S_1$, $S_2$ and $S_3$.

FIG. 6 also shows the combination of the three print workings 150 and illustrates that the dots of differing sizes and colours may overlap one and other and together contribute to building up the full printed image on the banknote. The security of the digitally printed security document is thereby improved since a user can closely inspect the print workings of the security document and confirm that the expected variation in dot size and spacing for each of the print workings in different colours is provided. Any attempted counterfeit of the digitally printed security document using a conventional digital printer would not accurately replicate the required dot sizes and spacings in the replica of the final image 50. Furthermore, the use on non-CMYK colours may provide a visual colour difference between an authentic security document and one that has been counterfeited using more conventional printing techniques.

Figure 7A:
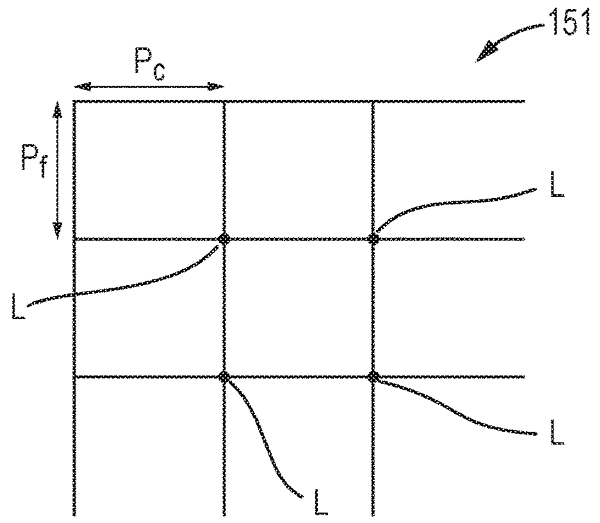
FIGS. 7A to 7C show a further enlarged portion of the grid of lattice points on which the printed dots of the workings in FIG. 5 are arranged.
Figure 7B:
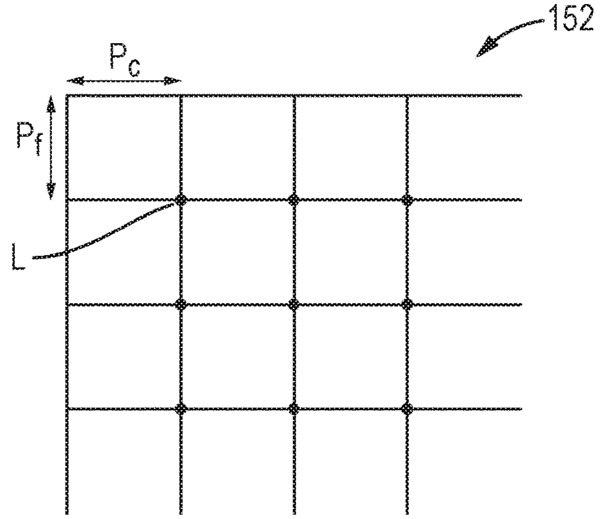
Figure 7C:
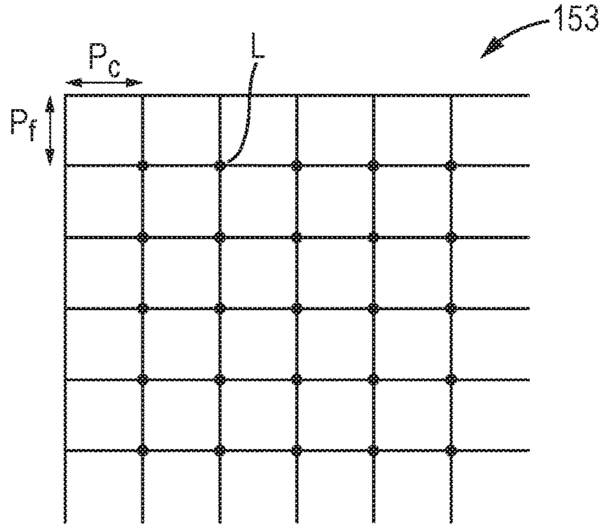

FIGS. 7A to 7C show these grids of possible print positions 151 to 153 in more detail. FIG. 7A shows an enlarged part of the first grid 151. As can be seen from FIG. 7A, there is provided a regular, square grid of possible print locations, which are referred to as lattice points elsewhere in the specification. These lattice points L have a spacing in a cross-feed direction determined by the positioning of the print nozzles 13 and a spacing in the feed direction that is determined by the controller, as has been described above. The result is an array of lattice points L that have a pitch in a cross-feed direction of $P_c$ and a pitch in the feed direction of $P_f$. Since the first digital print head was configured to print at a resolution of 200 DPI in both the feed and cross-feed directions, both pitches of the grid 152 of lattice points L will be 200 DPI. Similarly, FIG. 7B shows an enlarged part of the second grid 152 corresponding to the working of the second digital print head 12*b*. This grid also comprises a regular, square grid of possible print locations, or lattice points L, that have a pitch in a cross-feed direction of $P_c$ and a pitch in the feed direction of $P_f$. Since the second digital print head was configured to print at a resolution of 600 DPI in both the feed and cross-feed directions, both pitches of the grid 152 of lattice points L will be 600 DPI. Finally, FIG. 7C shows an enlarged part of the third grid 153 corresponding to the working of the third digital print head 12*c*. This grid also comprises a regular, square grid of possible print locations, or lattice points L, that have a pitch in a cross-feed direction of $P_c$ and a pitch in the feed direction of $P_f$. Since the third digital print head was configured to print at a resolution of 900 DPI in both the feed and cross-feed directions, both pitches of the grid 153 of lattice points L will be 900 DPI.

A method of printing a security document using the digital print press shown in FIGS. 1A to 1C will now be described.

First, a roll of substrate web is installed in the transport system 20 of the digital print press. The substrate web may be a web of polymer substrate, such as BOPP, suitable for forming polymer banknotes, or may be a paper substrate web, suitable for forming paper banknotes. If the substrate web is a polymer substrate web, preferably the polymer substrate is coated with an opacifying layer to provide a preferably white background on which the plurality of print workings may be printed by the digital print heads. The web of substrate material is installed such that the pre-print spool 21 holds the unprinted substrate material and such that the substrate web extends through the digital print press to the post-print spool 22, on which the substrate web is rewound downstream of the digital print heads.

The transport system 20 is then driven by the controller of the digital print press to move the substrate material 100 sequentially beneath each of the digital print heads installed in the print bar holders 10*a* to 10*j*. The controller receives a set of printing instructions relating to each of the digital print heads 12*a* to 12*c*. The set of printing instructions defines the working that will be printed on to the substrate 100 by each of the digital print heads 12*a* to 12*c*. A process of generating printing instructions based on a source image to printed will be described in more detail below.

As the substrate web 100 is transported first beneath the first digital print head 12*a*, said first digital print head is controlled so as to print the first print working 51 onto the surface of the substrate 100. As defined in the printing instructions, the first print working 51 is built up by an array of dots of size $S_1$ (produced by a drop size of 40 picolitres) arranged across a grid 151 of lattice points L (representing possible print positions for those dots). As explained above, the lattice points L for the first working are spaced from one another in both the feed and cross-feed direction so as to have a resolution of 200 DPI. The first digital print head 12*a* repeatedly prints versions of the first print working 51 on the substrate 100 to form a plurality of banknotes.

A region of the substrate 100 that is printed with the first print working 51 is then conveyed to the second digital print head 12*b* installed in the second print bar holder 10*b*. Again, the set of printing instructions include printing instructions directed at the second digital print head 12*b* for printing a second working 52 onto the surface of the substrate 100 over the first digital print working 51. The second print working 52 is formed by printing dots having one of three possible sizes $S_1$, $S_2$ and $S_3$ (corresponding to drop sizes of 5, 10 and 20 picolitres) across a grid 152 of possible dot position (lattice points L), which again have a pitch in both the feed and cross-feed direction of 600 DPI, corresponding to the resolution of the second digital print head 12*b*.

Once the second working 52 is printed over the first working 51, the substrate 100 continues to the third digital print head 12*c*, which prints the third print working 53 over the first and second print workings 51 and 52. Again, the third print working 53 is formed by the printing of dots of three different sizes $S_1$, $S_2$ and $S_3$ (corresponding to drop sizes of 3.5, 7 and 13 picolitres) across a grid 153 of possible dot positions L. The array of lattice points L have a pitch in both the feed and cross-feed directions of 900 DPI, corresponding to the resolution of the third digital print head 12*c*.

The result of the above three print processes is a final image 50 composed of three separate print workings 51, 52 and 53 at three different resolutions and in three different colours, as has been described above.

As explained above, the resulting digitally printed security document, is made up of three different arrays of printed dots having different characteristic dot sizes and spacings as can be seen in FIG. 6 in the combined grid 150.

Figure 15A:
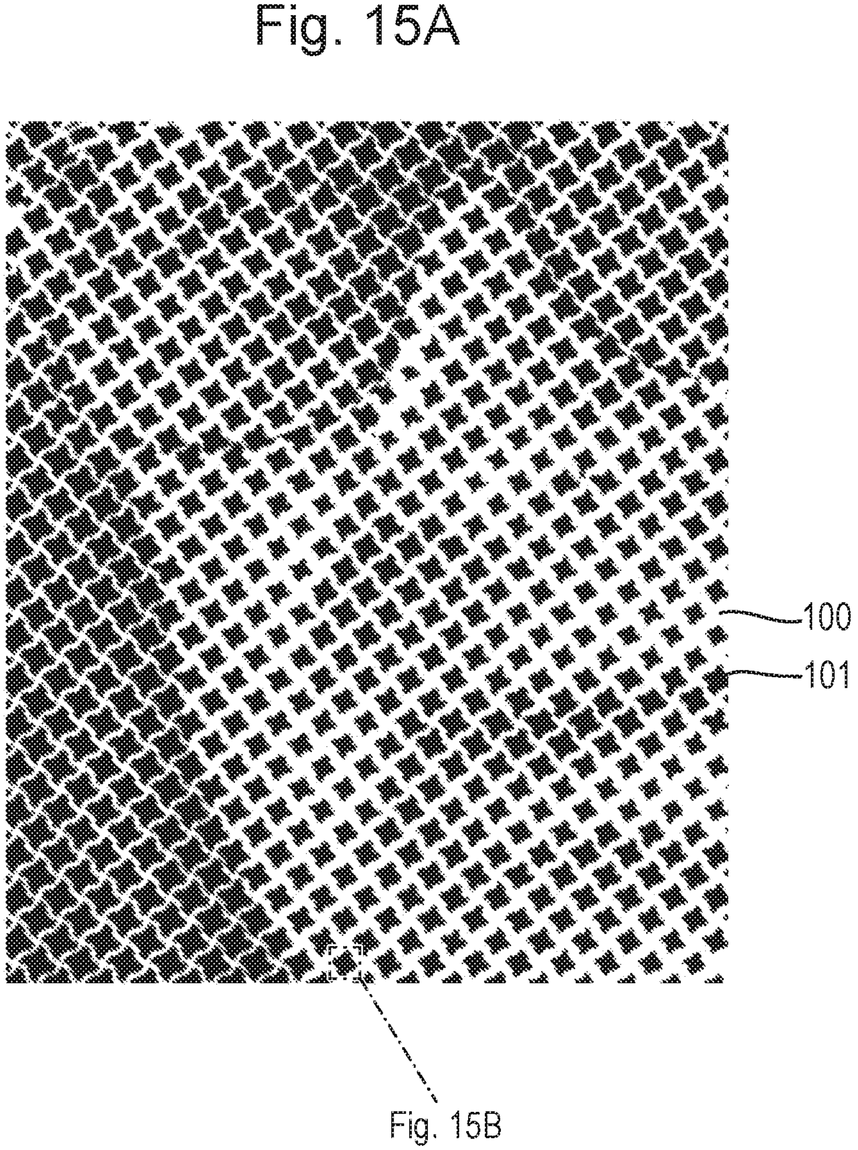
FIGS. 15A and 15B show part of a printed security document according to an embodiment of the invention, with FIG. 15B showing an enlarged portion of FIG. 15A.
Figure 15B:
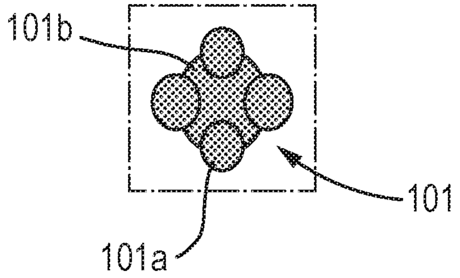

A particularly advantageous manner of printing a security document in accordance with the above is shown in FIGS. 15A and 15B. Here, we have substrate 100 printed with an array of printed elements 101. As can be seen in FIG. 15B, each printed element 101 is actually a composite of a number of dots printed by a digital print head. In this embodiment, each printed element 101 comprises a large dot 101*b* located at the centre of the printed element 101 and four smaller dots 101*a* which partially overlap the large central dot 101*b* and are equally spaced around the circumference of the large dot 101*b*. The small dots 101*a* are printed by a first digital print head 12*a* and the large dot 101*b* is printed by a second digital print head 12*b*. In this embodiment, the dots are printed in the same colour to present a seamless composite element 101; however, different colours could also be used to produce composite elements. As can be seen from FIG. 15A, the array of composite printed elements 101 vary in their size across the security document. This is achieved by varying the size of the dots 101*a* and 101*b* and varying their spacing for each composite element. This may be controlled by providing for suitable dot sizes and a suitable resolutions for the first and second digital print heads 12*a*, 12*b*, i.e. so that the lattice points of possible positions provide for the dots to be spaced by a number of different amounts and such that there are sufficient different dot sizes for the different sizes of the composite element to be produced.

Figure 17A:
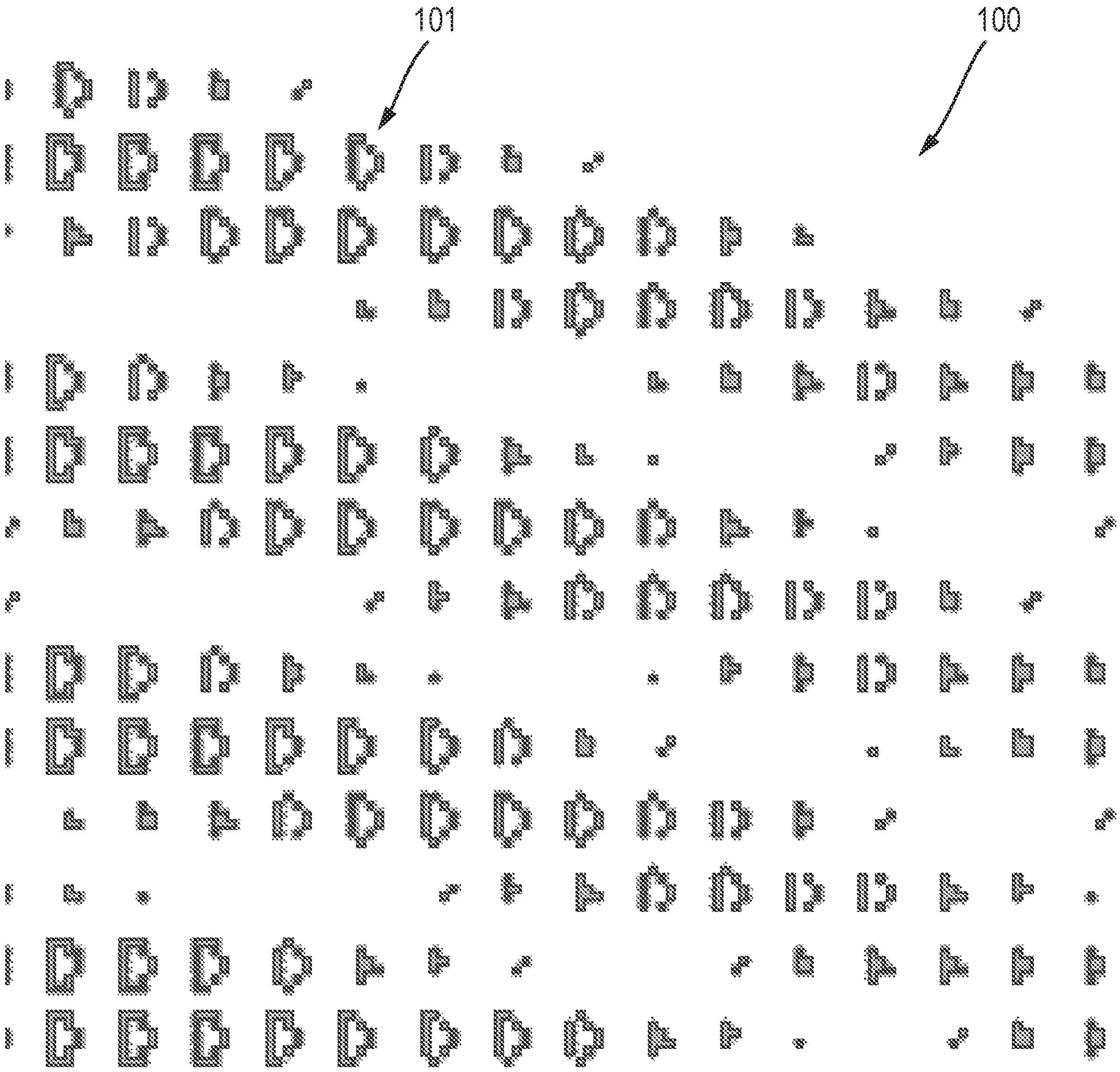
FIGS. 17A and 17B show part of a printed security document according to an embodiment of the invention, with FIG. 17B showing an enlarged portion of FIG. 17A.
Figure 17B:
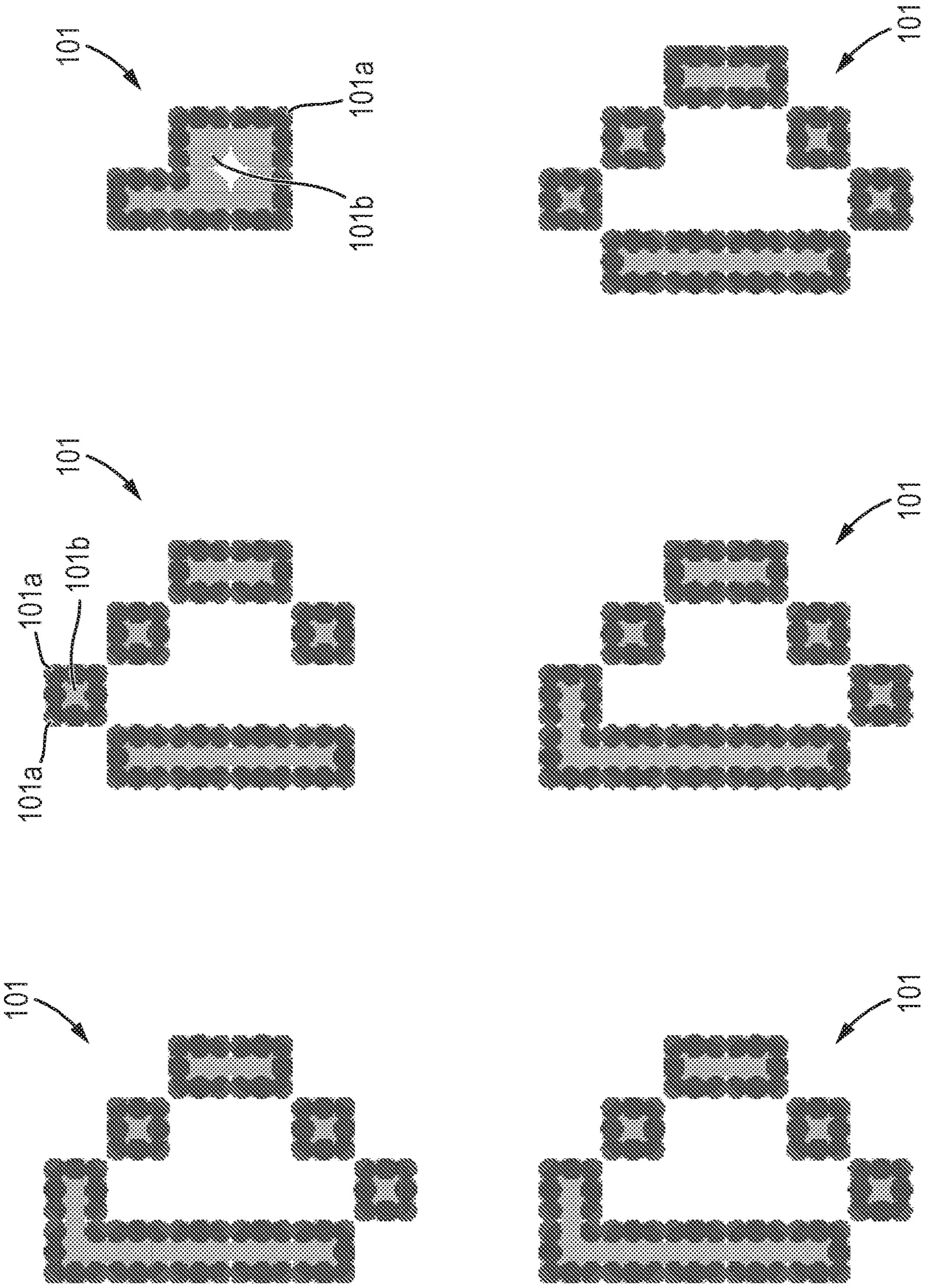

Another example of a security document printed with an array of composite printed elements is shown in FIGS. 17A and 17B. As can be seen in this Figure, here a plurality of composite elements are provided, each in the form of the letter 'D'. As shown most clearly in FIG. 17B, each composite element 101 is formed by an array of smaller printed red dots 101*a* in combination with an array of larger printed green dots 101*b*. In this embodiment, the pitch of the red dots is three times that of the green dots, such that the area of one printed green dot corresponds to a nine-by-nine arrangement of red dots. These dots are arranged and overprinted so that they both describe the outline of a letter 'D' for each composite element 101.

The composite elements are also made to vary in their shape and size across the security document substrate 100. In this embodiment, the composite elements show the letter 'D' in different sizes. Here, the different sizes of the letter 'D' is used to vary the colour tone of the combination of the printed workings. That is, this effectively provides a halftoning effect to the combined digital print workings. As can be seen in FIG. 17A, which shows a small area of the artwork forming the printed image, the composite printed elements are reducing in their size from the left side to the right side of the image to provide a gradually varying tone.

Figure 18A:
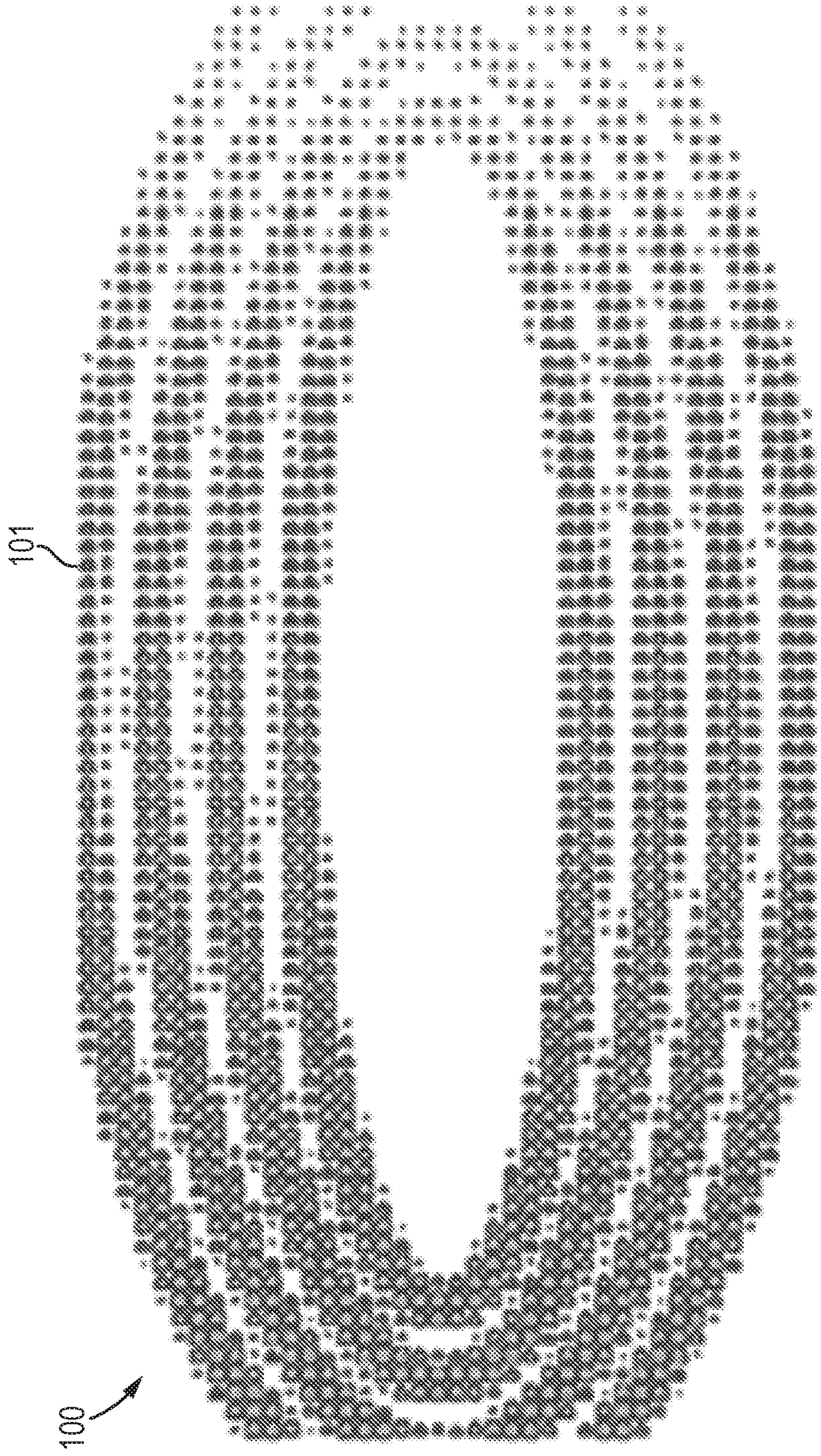
FIGS. 18A to 18C show part of a printed security document according to an embodiment of the invention, with FIGS. 18B and 18C showing different enlarged portions of FIG. 18A.
Figure 18B:
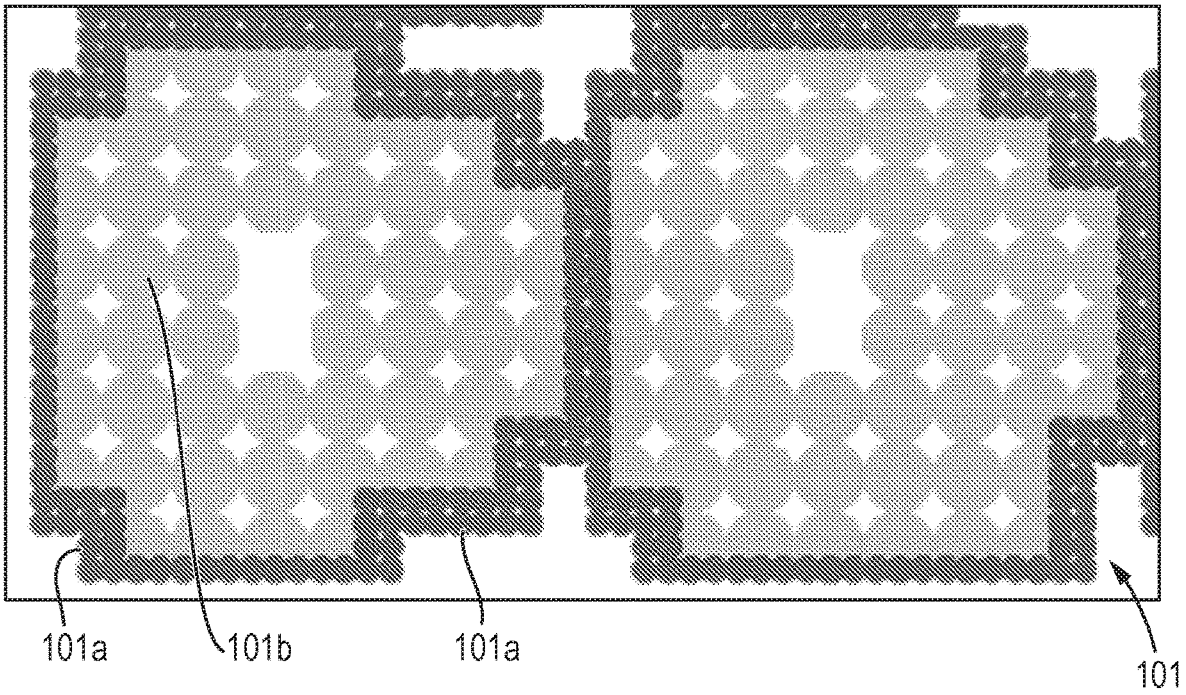
Figure 18C:
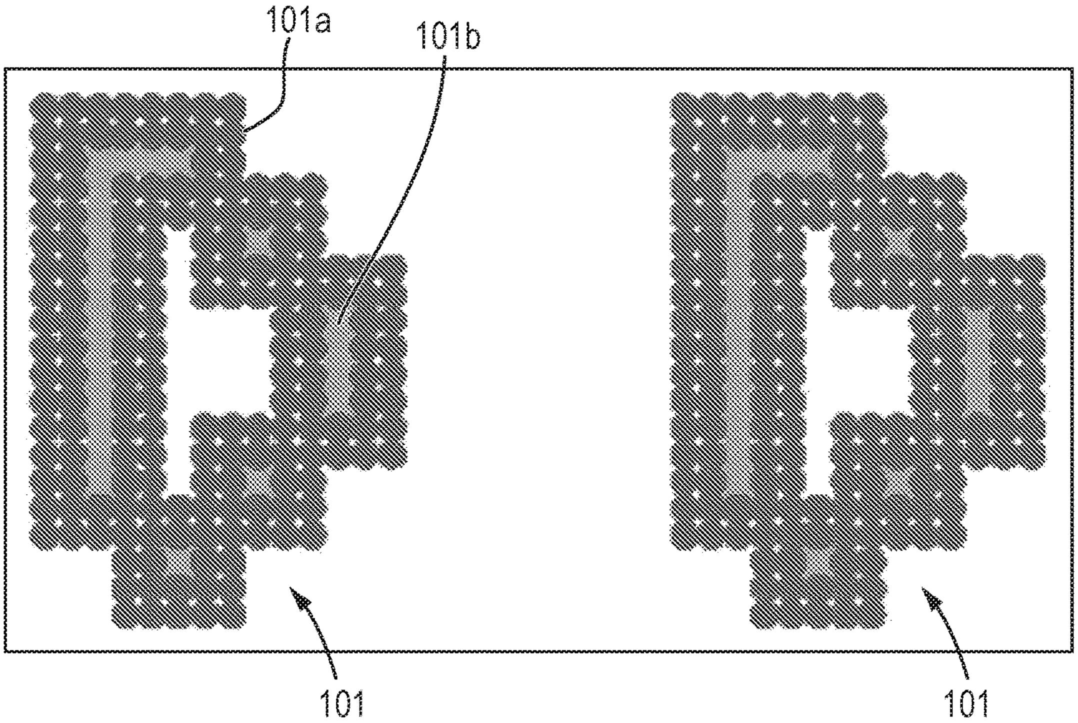

A further example of a security document printed with an array of composite printed elements is shown in FIGS. 18A to 18C. Again, this document is printed with a plurality of composite elements 101, each again in the form of the letter 'D'. A large portion of the printed image can be seen in FIG. 18 and comprises an oval shape that varies from predominantly green on the left-hand side to predominantly red on the right-hand side of the image. The size of the composite elements also decreases from left to right across the image so that the tone as well as the hue varies across the image.

FIG. 18B shows two composite elements taken from the left side of the image shown in FIG. 18A. As can be seen in FIG. 18B, each composite element 101 is made up of an array of printed red dots 101*a*, which are printed with smaller dot sizes and at a higher resolution, and an array of printed green dots 101*b*, which are printed with a larger dot size and at a lower resolution. Each composite element 101 at the left side of the image, as shown in FIG. 18B, is predominantly composed on the larger green dots 101*b*. This provides the image of FIG. 18A with its more green hue at the left-hand side.

FIG. 18C shows two composite elements 101 taken from the right side of the image shown in FIG. 18A. Each composite element 101 is made up of the same type of printed dots, i.e. red dots 101*a*, which are printed with smaller dot sizes and at a higher resolution, and green dots 101*b*, which are printed with a larger dot size and at a lower resolution. However, here, the each composite element is smaller, and is predominantly formed by red dots 101*a*. This provides the image of FIG. 18A with its more red hue at the right-hand side. The decreasing size of the composite elements also provides a lighter tone to this side of the image.

Figure 19:
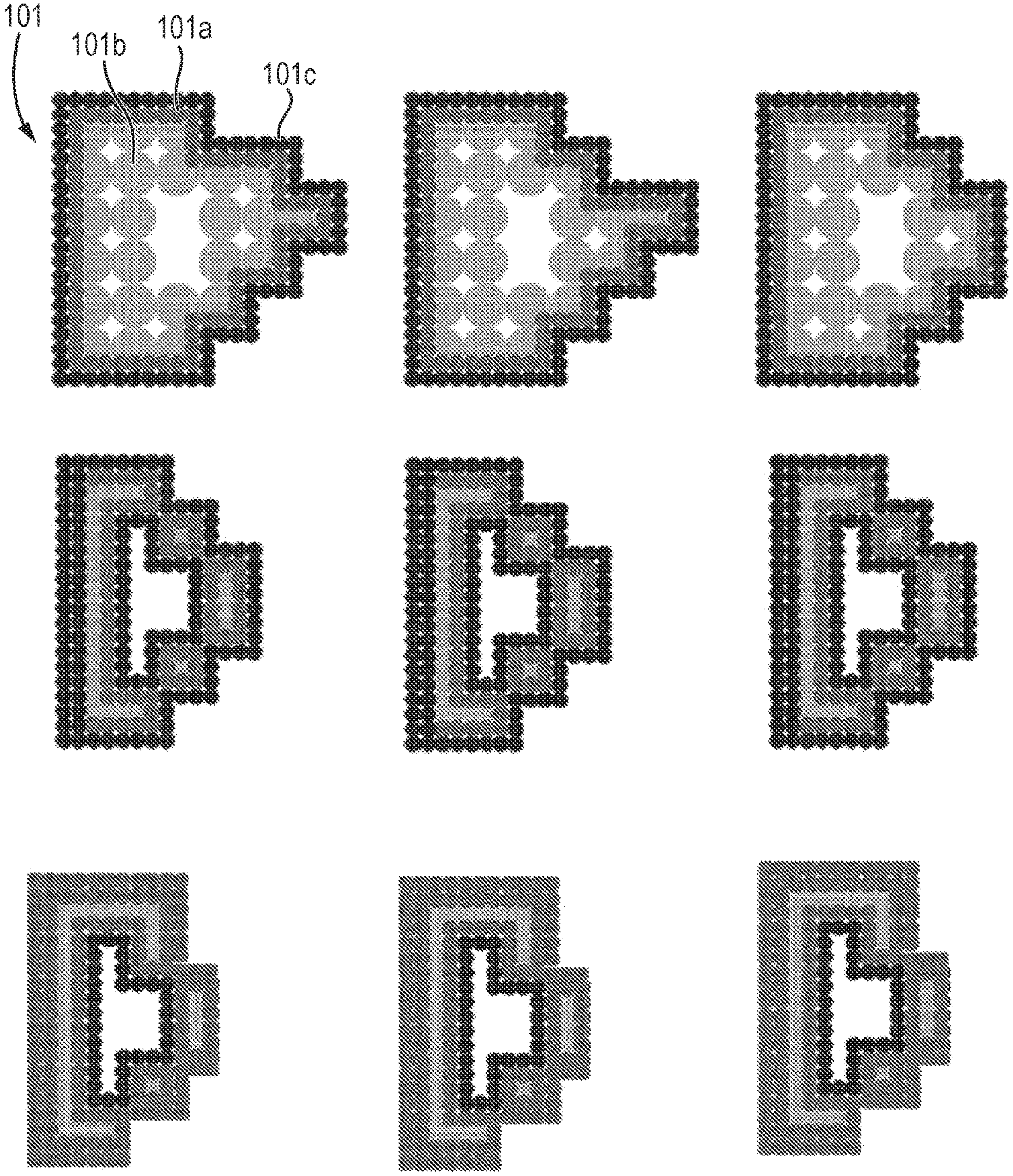
FIG. 19 shows printed composite elements that may be used to print a security document according to another embodiment.

FIG. 19 shows an alternative composite element arrangement. In this embodiment, the printed elements will still define an array of screen elements in the form of letters 'D'; however, each composite element 101 is now made up of the printed dots of three different workings. Specifically, each composite element 101 is formed by an array of red dots 101*a* printed by a first digital print head, an array of green dots 101*b* printed by a second digital print head, and an array of blue dots 101*c* printed by a third digital print head. As with the preceding embodiment, the red dots 101*a* are smaller and higher resolution than the green dots 101*b*. In this case, the blue dots are selected to be the same size and resolution and the red dots, but any dot size and resolution could have been chosen. FIG. 19 again illustrates that the proportional composition of the composite elements may be varied across an image to alter the colour in different regions of the image. Specifically, FIG. 19 shows three rows of composite elements 101. In the top row, the composite elements are predominantly formed of green dots 101*b* from the second working. That is, the greatest proportion of the printed area is made up of green dots. This row will provide a greener appearance to the image printed with composite elements of this design. The middle row shows composite elements 101 predominantly formed of blue dots 101*c* from the third working. An area of the image printed with composite elements of this design will have a bluer overall colour. Finally, the bottom row shows composite elements 101 predominantly formed of red dots 101*a* from the first working. An area of the image printed with composite elements of this design will have a redder overall colour. It will be appreciated from this explanation that full colour images may be printed with different areas of the images having different colours based on the proportional composition of the composite elements in those areas, and with the tone being controllable by the size, shape and spacing of the composite elements. This may be provided while maintaining the high security provided by the workings being in different resolutions and with different dot sizes.

A second type of print head suitable for use in a digital print press will now be described with reference to FIGS. 8 and 9.

Figure 8:
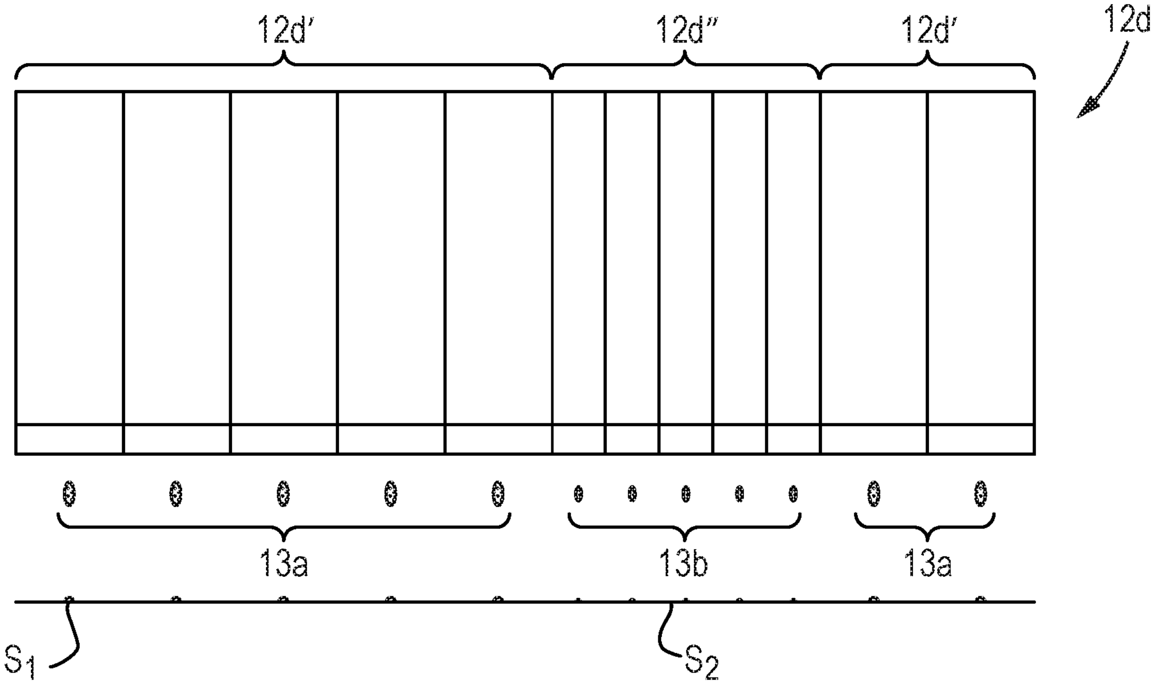
FIG. 8 shows, schematically, a print head according to another example in front view.

FIG. 8 shows a fourth digital print head in 12D in schematic front view. This digital print head 12*d* comprises a first portion 12*d*' and a second portion 12*d*". An array of nozzles extends along a cross-feed direction of the digital print press. The first portion 12*d*' of the digital print head 12*d* comprises nozzles 13*a* having a first size and spacing suitable for printing relatively large drops of ink at a relatively low resolution. The second portion 12*d*" of the digital print head 12*d* comprises nozzles 13*b* having a second size and spacing, in particular being smaller and more closely spaced than the nozzles 13A, such that this second portion 12*d*" is suitable for printing relatively small drops of ink at a relatively high resolution. For example, the nozzles 13*a* in the first portion 12*d*' of the print head 12*d* may be configured to print at a resolution of 900 DPI with dot sizes of 30 picolitres, while the nozzles 13*b* in the second portion 12*d*" of the print head 12*d* may be configured to print at a resolution of 1200 DPI with dot sizes of 10 picolitres.

Figure 9:
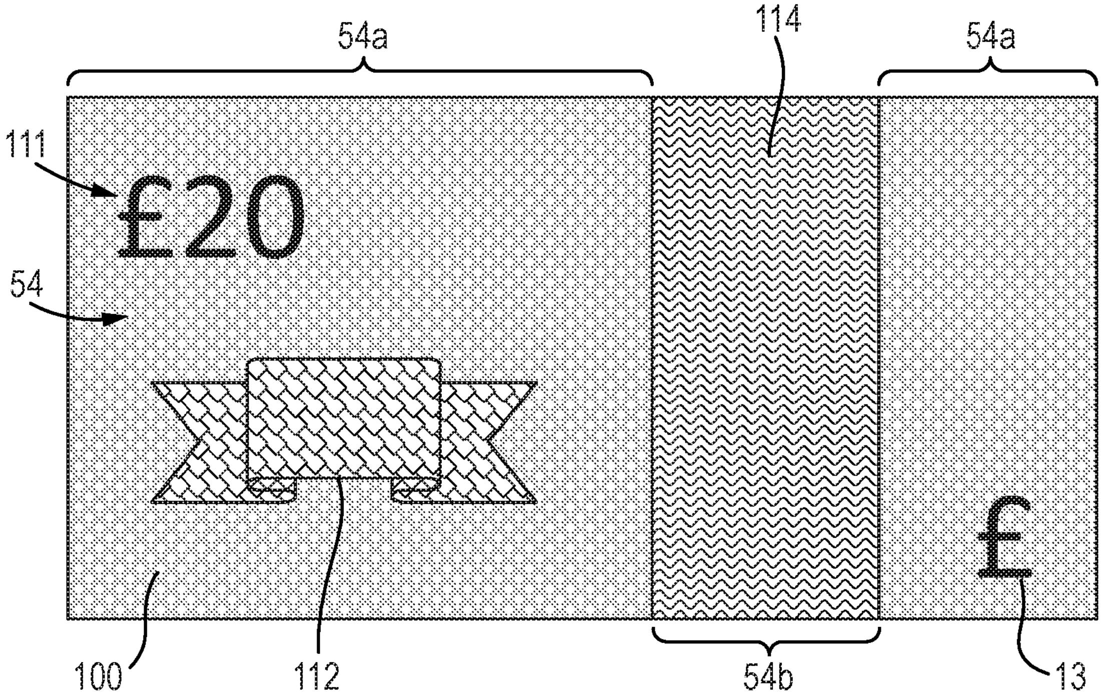
FIG. 9 shows, schematically, a printed security document as may be printed using the print head of FIG. 8.

FIG. 9 shows a security document that has been digitally printed using the digital print head 12*d* described above. The security document comprises a substrate 100 on which is printed a single print working 54. A single print working is shown here to clearly illustrate the effect of the above described head and it will be appreciated that, in practice, additional workings will be provided across the bank note to build up a more complex appearance. The print working 54 shown in FIG. 9 comprises a first region 54*a* that has been printed at the relatively low resolution, i.e. 900 DPI, and a second region 54*b* that has been printed at the relatively high resolution, i.e. 1200 dpi. The first region 54*a* corresponds to those parts of the working 54 printed by the nozzles 13*a* in the first portion 12*d*' of the digital print head 12*d*, while the second region 54*b* of the print working 54 corresponds to the part of the working printed by the nozzles 13*b* in the second portion 12*d*" of the digital print head 12D.

In this case, the printed security document is a banknote and the high resolution part of the working forms a security stripe feature 114. The security stripe feature 114 may be visually inspected to confirm that it is at a higher resolution than other features of the security document 111, 112 and 113 that are printed in the first region 54A of the print working 54.

A method of printing using the fourth digital print head 12D may comprise controlling the low resolution and high resolution nozzles 13*a*, 13*b* separately by essentially treating them as separate digital print heads. For example, the low resolution portion of the print head may receive printing instructions separate from printing instructions for the high resolution portion of the digital print head. However, by providing the use of two different resolution portions on the same digital print head, a very high level of registration between the different regions of the print working 54 may be ensured.

The above discussion has focused on the process of taking printing instructions and printing multi-resolution, multi-coloured security documents. In practice, the designer of a security document will design a source image to be printed by the digital printing press which will then need to be converted to such printing instructions for execution on the digital printing press. We will now describe with reference to FIG. 10 a method, e.g. a computer implemented method, for taking a source image and generating printing instructions for a digital printing press.

Figure 10:
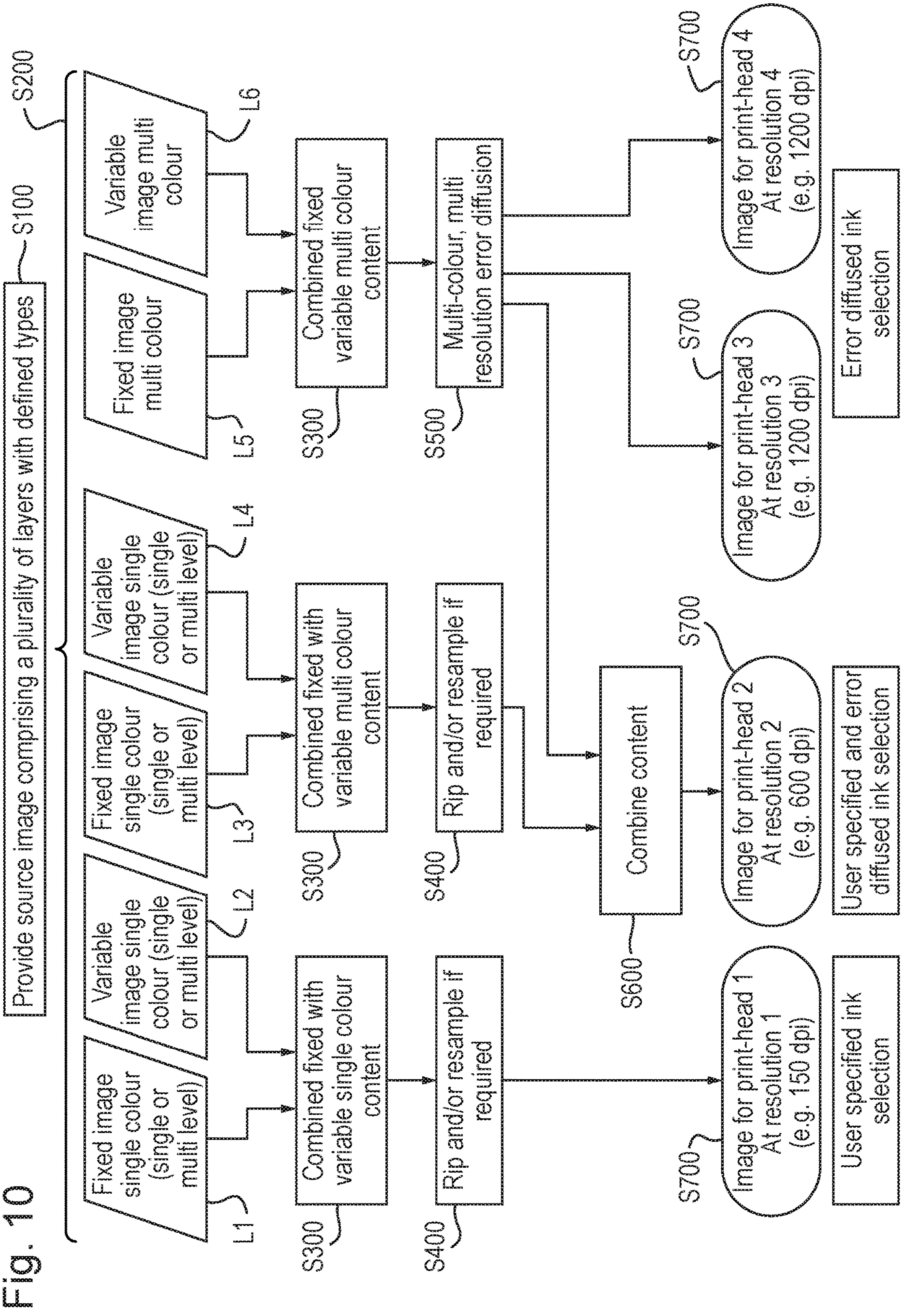
FIG. 10 shows a flow diagram for the conversion of a source image into printing instructions for the digital printing press of FIG. 1A.

As indicated in FIG. 10, the process begins with the provision of a source image comprising a plurality of layers with defined types in step S100. Whereas in many fields, designers design their printed images without much consideration for the specification of the printing press that will print the image, for security purposes, the printing of a security document according to the invention will typically be performed from start to finish with the secure digital printing press in mind. Accordingly, if the digital printing press consists of four digital print heads, as shown in FIG. 10, each having a predetermined different colour and printing at a predetermined resolution that is different for at least some of the print heads, the source image may be designed to the specific constraints of the digital print press. In particular, it would be preferable for the designer to design a source image whose number of pixels exactly corresponds to the print DPI multiplied by the printed area. For example, a 6 inch by 2.5 inch (approximately 15 cm by 6 cm) banknote printed by a first digital print head at 2400 DPI will be printed using a source image wherein the layer(s) targeted at the first digital print head have an image resolution of 14400 pixels by 6000 pixels (i.e. 6×2400 and 2.5×2400 respectively) for a total of 86400000 pixels. In this case, each possible printed dot on the banknote corresponds to exactly one pixel of the corresponding layer(s) of the source image. While this may be how the source image is typically produced, this is not essential and the source image layers may not have this one to one relationship between image resolution and print resolution. For example, the layers may be upsampled or downsampled after being designed. Alternatively, as will be described below, the layers may comprise vector image content that is sampled to the resolution of the corresponding print head(s).

The digital print press of FIG. 10 comprises four heads, a first head operating, for example, in orange, at a resolution of 150 DPI. The second print head operates, for example, in green, at a resolution of 600 DPI. Finally, the third and fourth digital print heads operate, for example, in cyan and magenta, at resolutions of 1200 DPI. The designer of the security document will be aware of the colours and resolutions of the various digital print heads and may therefore design the printed image for the security document accordingly. In this case, the designer designs essentially three different images for printing on the security document. A first image is designed in the orange printable by the first digital print head and is provided by layers L1 and L2. A second image is designed in the green printable by the second print head and is provided by layers L3 and L4. Finally, a multicolour image, provided by layers L5 and L6, is designed for printing by the second, third and fourth print heads and may be designed within the non-standard colour gamut providable by green, cyan and magenta from the second to third print heads.

In step S200, the various image layers are assigned to respective print heads. In this example, the designer has designed the layers for printing by specific print heads and may tag each layer with an identifier identifying the corresponding print head. Therefore, the controller may read an identifier associated with layer L1 and assign that layer to the first print head, before reading layer L2 and performing an assignment to the same head. Layers L3 and L4 may similarly be identified as being directed toward the second print head. Finally, layers L5 and L6 may be identified as a multi-coloured image to be printed by the second, third and fourth print heads together.

The first image provided by layers L1 and L2 comprises fixed and variable content. In this case, layer L1 provides fixed content that will be printed substantially identically on each of a plurality of security documents, while L2 provides variable content, which is preferably a unique identifier, such as a banknote serial number. In step S300, the fixed and variable content are combined into a single image layer. Layers L3 and L4, and L5 and L6 similarly provide fixed and variable content and are also respectively combined in corresponding steps S300.

Returning to the first image, any required ripping and/or resampling is now performed on the image layer resulting from the combination of L1 and L2 in step S400. This step should produce an image layer at the resolution of the first image head in which each pixel has an intensity level that corresponds to a drop size printable by the first digital print head. The layers L1 and L2 may be designed at a resolution of 150 DPI and with the printable intensity levels (i.e. drop sizes, in mind, in which case this stage may not be necessary. However, the image layers may alternatively comprise vector image content that needs rasterising or may be at a resolution higher than that printable by the first digital print head and require resampling.

Once any processing in S400 is completed for the first image, the result is a raster image with appropriate resolution and intensity levels for the first digital print head. This raster image may then be converted to printing instructions for the digital print head in step S700.

Turning to the second image provided by the combination of layers L3 and L4, this may also undergo a ripping or resampling process in S400 to produce an image layer at the resolution of the second printing head and having intensity levels corresponding to the drop sizes printable by the second digital print head.

The third image, provided by the combination of layers L5 and L6, must now be processed. Here, we have a multi-coloured image that must be printed with green, cyan and magenta colour components, wherein the green printed working will be at a different resolution to the cyan and magenta print workings. In step S500, a multi-colour, multi-resolution error diffusion processing step is performed to convert the multi-coloured image layer to three separate colour component images at the required resolutions and intensities. This process will be described in more detail below with reference to FIGS. 11A to 14.

The result of step S500 is three different colour component images for printing by the second, third and fourth print heads. Before the instructions for the second print head can be produced, the colour component of the third image must be combined with the second image initially provided by layers L3 and L4. This is performed in step S600, which outputs a single raster image with the resolution and intensity levels of the second digital print head.

Following the processing in step S600, the raster image representing the combination of the second image originating from L3 and L4 and the green colour component of the third image from L5 and L6 may be converted to printing instructions for the second digital print head in step S700. Similarly, the cyan and magenta colour components of the third image, which are each raster images at resolutions and intensity levels corresponding to the third and fourth digital print heads, may be converted into printing instructions for the third and fourth digital print heads.

A multi-colour, multi-resolution error diffusion process, such as performed in step S500, will now be described with reference to FIGS. 11A to 14.

Figure 11A:
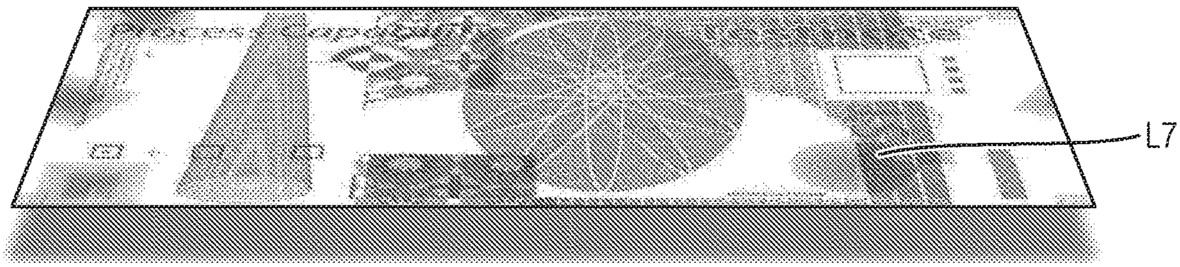
FIGS. 11A and 11B show a multi-coloured image layer and a number of the pixels of the image layer respectively.

FIG. 11A shows an image layer L7 which is a multi-coloured image layer that is targeted at multiple print heads at different resolutions. In this case, the process will be described with respect to two different print heads in two different colours and at two different resolutions. The first digital print head of this example may be configured to print in a red ink at 600 DPI in both the cross-feed and feed directions, while the second digital print head is configured to print in a green ink at 150 DPI in both the ross-feed and feed directions.

Figure 11B:
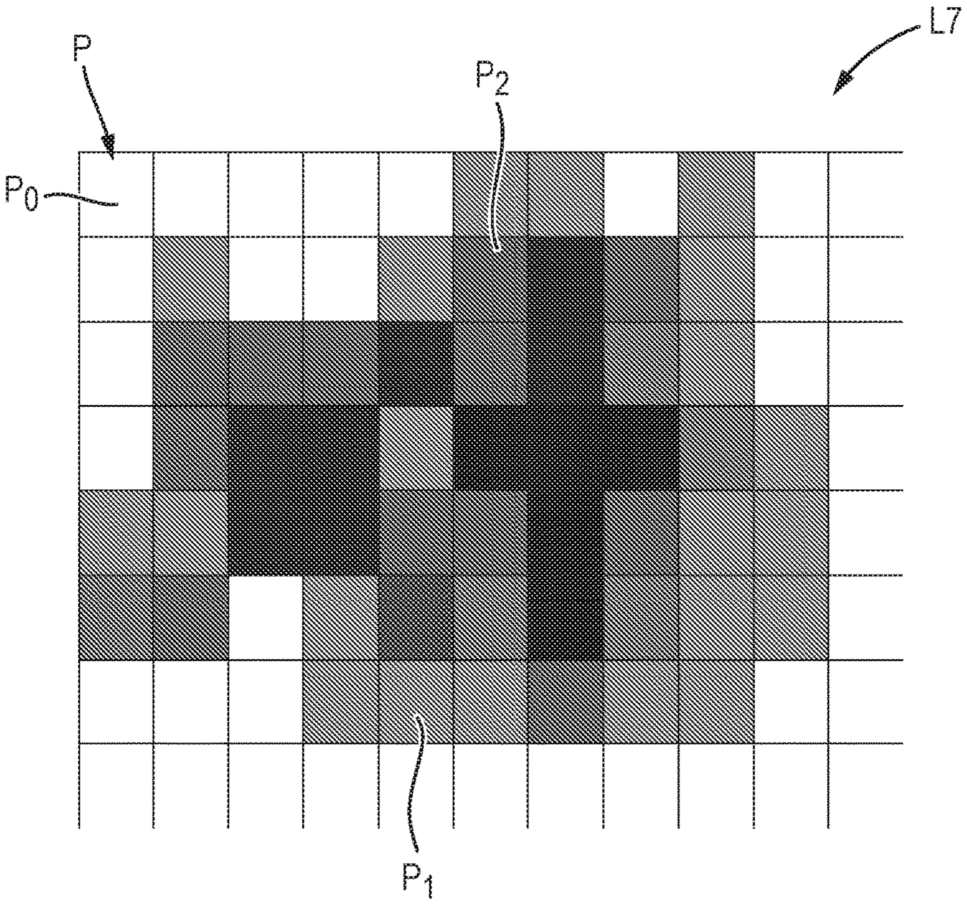

FIG. 11B shows a number of pixels P of the image layer L7. Each pixel has a colour value, i.e. an ideal colour, and many different colours with slight variations may be included across the image. In this case, layer L7 has been produced at 600 DPI, i.e. the resolution of the first digital print head, although in other examples, the image may require ripping or resampling to 600 DPI.

The process for converting the image layer L7 into two different colour components at two different resolutions uses information concerning the print-head resolution, the number of intensity levels that each print-head uses and the ink colour to be used in each print-head. A palette (i.e. list) of all possible output pixel colours resulting from the colours printable by the first and second print heads is created—the "full colour palette"—where each palette entry is a function of the colour that will be produced by the ink on the output media, the intensity levels available for each output ink to generate the colour (the intensity levels being between 0, i.e. no ink, up to a maximum value, with a different intensity value for each drop size deliverable by the corresponding print head). Each entry in the palette may be generated by a single ink or a combination of (overprinted) inks. For those entries that use a combination of (overprinted) inks, the printed pixel colour may be determined experimentally or predicted using a software algorithm.

The process begins with the image layer L7 at the higher resolution of the two digital print heads, i.e. 600 DPI. For each pixel, the ideal colour is identified and the closest colour available in the "full colour palette" is selected. This closest colour available, i.e. the target colour, will have an associated intensity level of the first ink, corresponding to a drop size of the first digital print head, and an associated intensity level of the second ink, corresponding to a drop size of the second digital print head. In the present example, the first digital print head is able to print only a single drop size and so has available intensities of 0 and 1. The second digital print head has three different drop sizes and so has intensities of 0, 1, 2 and 3. It should be noted that the drop sizes printable by the second digital print head are printed at a resolution of 150 DPI, whereas image layer L7 is being processed at 600 DPI. Since this resolution difference means that each pixel at 600 DPI will represent 1/16 of a pixel at 150 DPI, the intensities of 0, 1, 2 and 3 at 600 DPI are treated as an intensity corresponding to 1/16 of the corresponding intensity at 150 DPI.

Figure 12A:
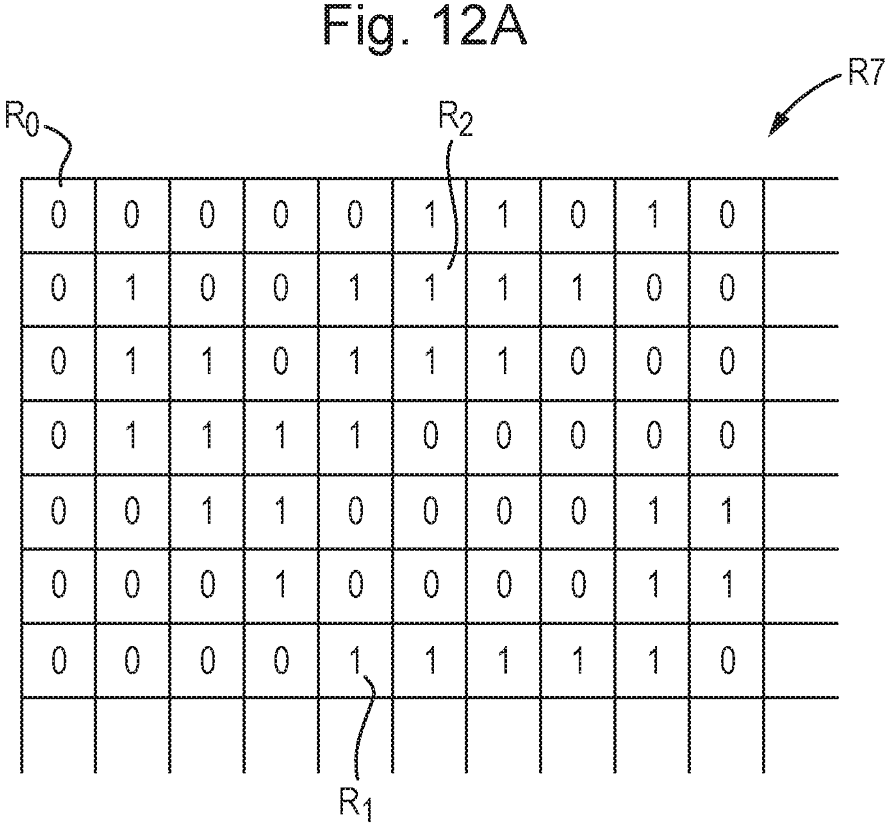
FIGS. 12A and 12B show a first colour component of the image layer and the printed working of the first colour component image respectively.
Figure 13A:
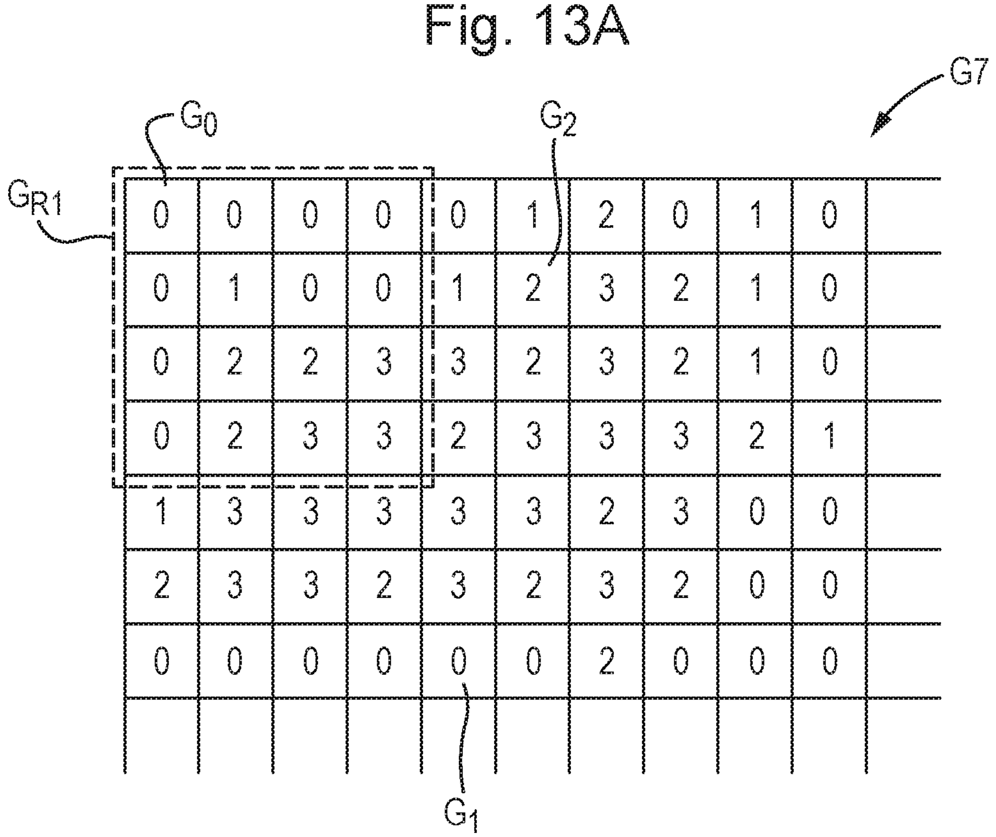
FIGS. 13A to 13C show a second colour component image, a downsampled version of the second colour component image, and a printed working of the downsampled colour component image respectively.

With the target colour identified, a first colour component image R7 is updated with an intensity value of the first ink for that pixel and a second colour component image G7 updated with an intensity value of the second ink for that pixel. It will be noted here that the second colour component image G7 is being generated at 600 DPI, i.e. each pixel of the image layer L7 is mapped with a one to one relationship to a pixel of the second colour component image G7. For example, FIG. 11B shows that there is substantially no colour provided in the top left pixel (labelled $P_0$) of the image layer L7. As a result, the top left pixel (labelled $R_0$) of the first colour component image R7, shown in FIG. 12A, is assigned an intensity value of 0, and the top left pixel (labelled $G_0$) of the second colour component image G7, shown in FIG. 13A, is assigned an intensity value of 0. The pixel labelled $P_1$ in FIG. 11B does have a colour, which is matched to a target colour produced by an intensity level of 1 for the ink in the first digital print head and an intensity level of 0 for the ink in the second digital print head. As a result, the corresponding pixel $R_1$ of the first colour component image R7, shown in FIG. 12A, is assigned an intensity value of 1, and the corresponding pixel $G_1$ of the second colour component image G7, shown in FIG. 13A, is assigned an intensity value of 0. As a final example, the pixel labelled $P_2$ in FIG. 11B has a colour, which is matched to a target colour produced by an intensity level of 1 for the ink in the first digital print head and an intensity level of 2 for the ink in the second digital print head, i.e. the colour is best replicated by an overprinting of both inks with the corresponding intensity levels. As a result, the corresponding pixel $R_2$ of the first colour component image R7, shown in FIG. 12A, is assigned an intensity value of 1, and the corresponding pixel $G_2$ of the second colour component image G7, shown in FIG. 13A, is assigned an intensity value of 2.

When each pixel is processed, an error is also assessed, which is the difference between the ideal colour and the selected target colour from the available palette colours. This error is distributed to the following pixels of the image layer L7 so as to modify the ideal colour to correct for the error in the previous pixel. The error may be distributed to the pixel to the right and/or to the pixel below the processed pixel, for example.

Figure 12B:
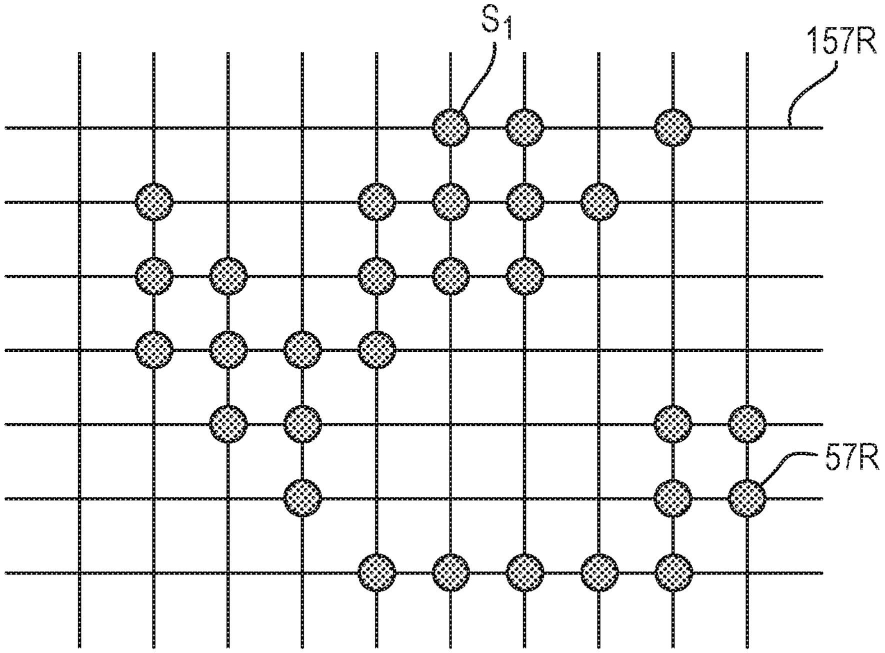

Once each pixel is processed, the result will be a first colour component image R7 at the resolution of 600 DPI and a second colour component image G7 also at the resolution of 600 DPI. The first colour component image will be suitable for directly converting into printing instructions for the first digital print head since it is at the resolution of the first digital print head and comprises intensities providable by the first print head, in this case 0, corresponding to no printed dot, and 1, corresponding to a printed dot with size $S_1$. FIG. 12B shows the print working 57R that will be printed by the first digital print head and also shows the grid 157R of possible dot positions (or lattice points) across the working 57R.

Figure 13B:
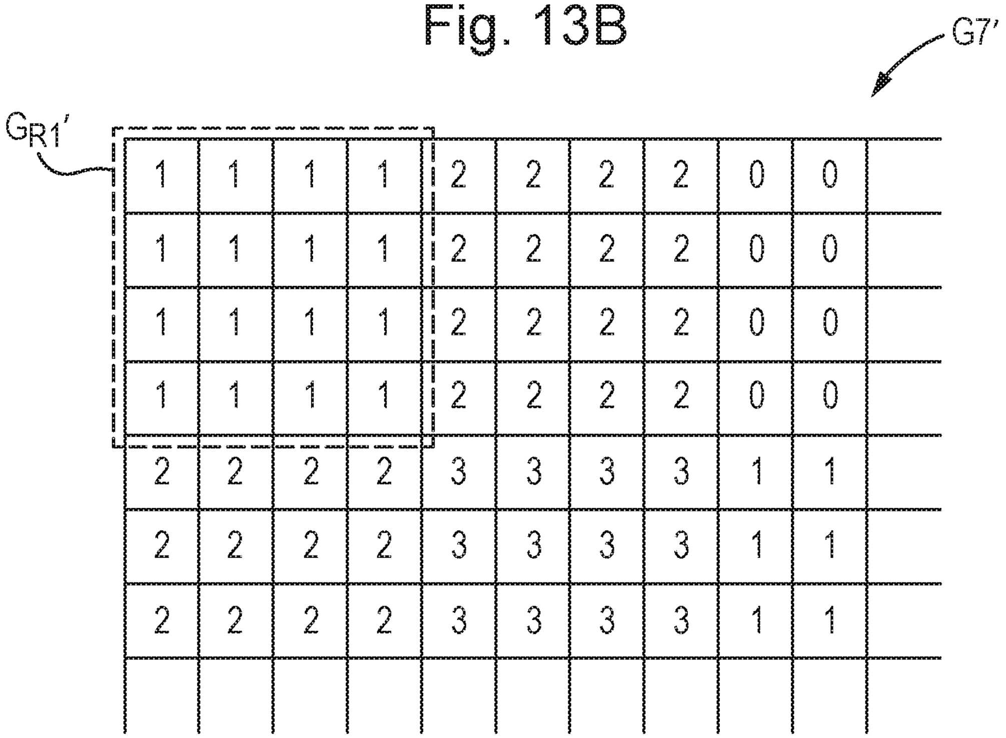
Figure 13C:
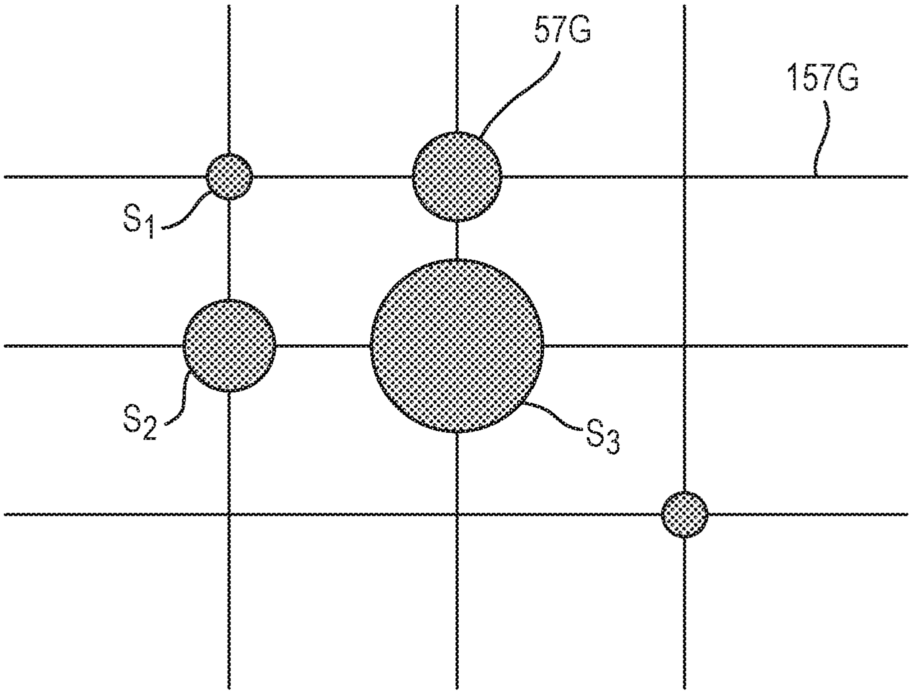
Figure 14:
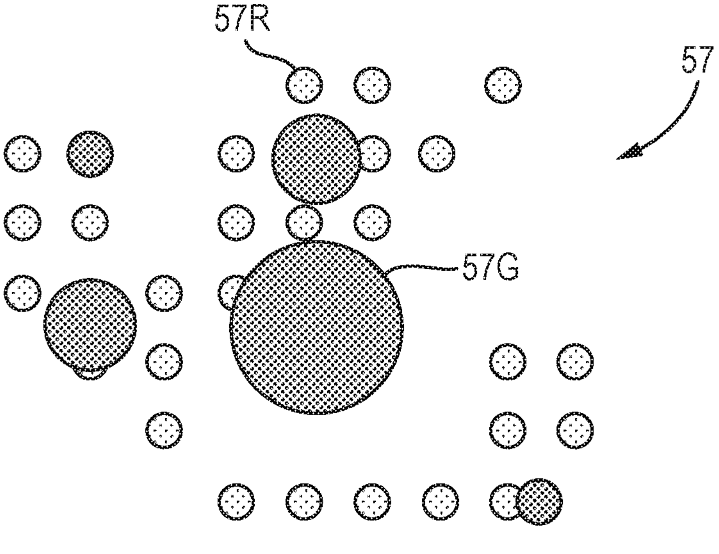
FIG. 14 shows the combination of the printed workings of FIGS. 12B and 13C, which replicates the portion of the image layer shown in FIG. 11B.

The second colour component image G7, however, is at a resolution higher than that printable by the second digital print head (which prints at 150 DPI). Accordingly, a downsampling process must be applied to the second colour component image. FIG. 13B shows a downsampled second colour component image G7'. In this case, to downsample the first colour component image G7, the pixels are grouped into regions of 4×4. Using the example of the top left hand corner of the first colour component image G7, the 4×4 region $G_{R1}$ of pixels comprises a mixture of intensities ranging from 0 to 3. The intensities across this region $G_{R1}$ are averaged and the result is an average intensity of 1 (total intensity of all pixels in $G_{R1}$ is 16 and this is averaged across the 16 pixels included in this region). Therefore, the first pixel $G_{R1}'$ of downsampled second colour component image G7' is assigned an intensity of 1. This process is repeated for each 4×4 region of pixels in the second colour component image G7 to produce a complete downsampled second colour component image G7' at the required resolution of 150 DPI and with the required intensities ranging from 0 to 3. The downsampled second colour component image G7' will then be suitable for converting into printing instructions for the second digital print head since it is at the resolution of the second digital print head and comprises intensities providable by the second print head, in this case intensities of 0 to 3 corresponding to no printed dot and dot sizes $S_1$ to $S_3$ respectively. FIG. 13C shows the print working 57G that will be printed by the second digital print head and also shows the grid 157G of possible dot positions (or lattice points) across the working 57R.

These print workings 57R (the red colour component of the layer L7) and 57G (the green colour component of the layer L7) are then printed on to a substrate and form a printed image 57 that reproduces the multi-colour image provided initially in layer L7. This printed image can be inspected to verify that it is produced by the combination of workings at two different resolutions and with different sets of dot sizes. An attempt to counterfeit this printed document with a conventional digital printer would not accurately replicate the resolutions and dot sizes shown in FIG. 14, meaning that the counterfeit may be easily detected.

The above method for converting a multi-coloured image into two different workings at two different resolutions comprised a downsampling process performed after production of a second colour component image at the higher resolution of 600 DPI; however, other variations of the method would be equally viable. For example, the first colour component image could be produced as described above, before producing a second colour component image by downsampling the multi-coloured image layer L7 to 150 DPI and performing the process again but this time at the second resolution to directly produce a second colour component image at 150 DPI.

Figure 20A:
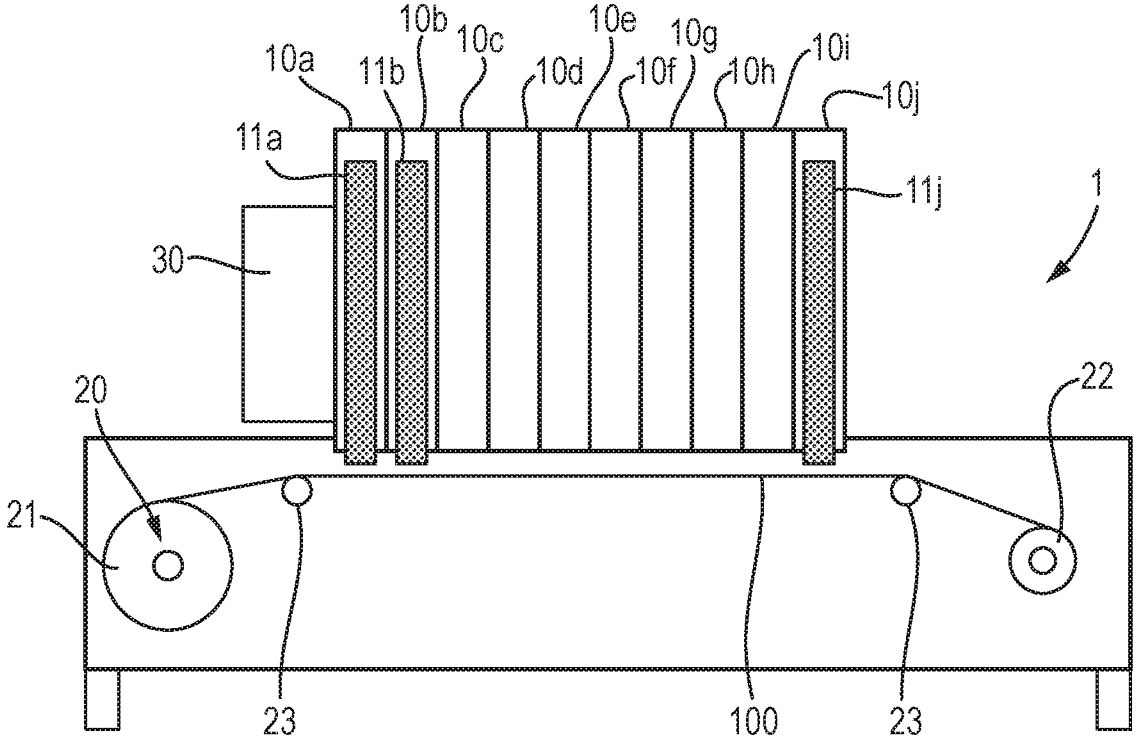
FIGS. 20A and 20B show, schematically, a digital printing press and one specific configuration of the digital print press, respectively.
Figure 20B:
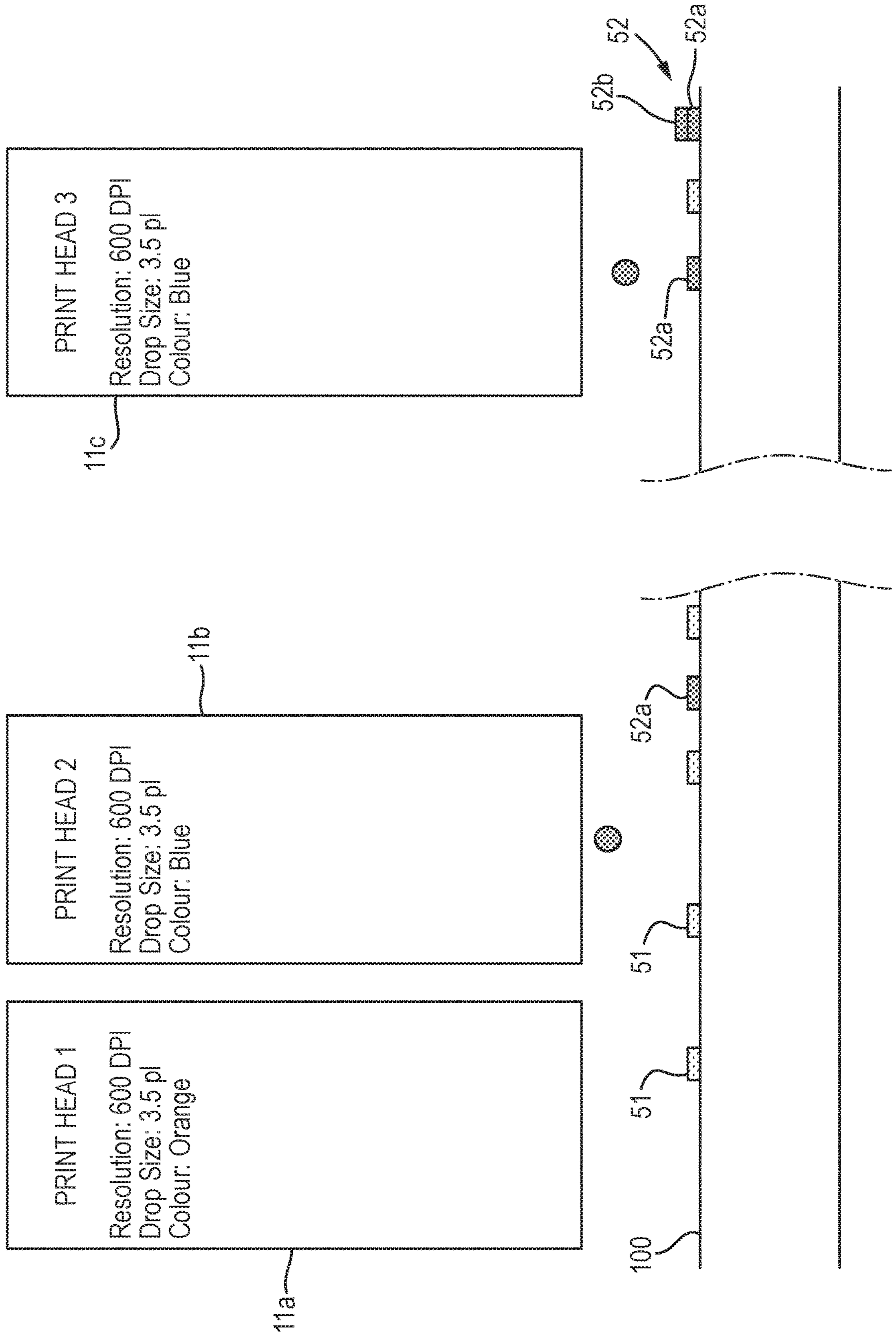

FIGS. 20A and 20B show a digital printing press for printing a security document in which the printed elements have different thicknesses. The digital printing press shown in FIG. 18A is substantially the same as the digital printing press described above with respect to FIG. 1A, where it differs is in the print bars inserted into the print bar holders 10*a* to 10*j*.

In this embodiment, the first digital print bar holder 10*a* receives a first digital print bar 11*a*, which is configured to print at a resolution of 600 DPI, with a drop size of 3.5 pl. This digital print bar 11*a* is configured to print with an ink having a first set of optical characteristics, which in this case is an orange ink, which may also have other optical properties, such as the covert optical characteristics described previously. The second digital print bar holder 10*b* receives a second digital print bar 11*b*. In this case, the second digital print bar 10*b* is configured to print at the same resolution and with the same drop size as the first digital print bar 10*a* and may even be the same type of digital print bar. In this case, the second digital print bar 11*b* is configured to print with a second ink having a different set of optical characteristics which in this case is a blue ink, although again it may have other optical properties, such as covert optical characteristics.

Spaced from the first and second print bars, located in the final digital print bar holder 10*j* is a third digital print bar 11*c*. This digital print bar 11*c* is identical to the second digital print bar 11*b* and is configured to print in the same ink, although as will be mentioned below, the digital print head may be different if, for example, a different drop size is needed. The third digital print bar 11*c* is spaced from the second digital print bar 11*b* by substantially the whole length of the digital printing press so that dots printed by the second digital print bar 11*b* are at least partially dry by the time the substrate has reached the third print bar 11*c*. As an alternative to this, the ink printed by the second digital print bar may be a curable ink, e.g. a UV curable ink, and a curing station, e.g. a UV light source, may be included between the second and third digital print bars to at least partially cure the ink printed by the second print bar. If a fourth digital bar head is needed, e.g. to produce the elements shown in FIG. 21C and discussed below, this may either be spaced from the third digital print bar 11*c* to allow the ink to dry at least partially, or the ink printed by the third digital print bar may be curable and a curing station inserted between the third and fourth digital print bars.

As shown in FIG. 20B, this digital print press may be used to produce a security document having printed elements of different thicknesses, but which have similar lateral dimensions. The first digital print bar 11*a* prints down dots forming the first print working 51 onto the substrate 100. The substrate is moved through the digital printing press until it reaches the second digital print bar 11*b*. The second digital print bar 11*b* then prints down dots that form part of the second print working 52. Specifically the printed dots form a first layer 52*a* of each of the elements within the second print working 52. The substrate is moved further through the digital printing press until it reaches the third digital print bar 11*c*, by which time both sets of dots are at least partially dry. The third digital print bar then prints down a second set of dots onto the first set of dots that form the first layer 52*a* of each of the elements within the second print working 52, i.e. the dots printed by the second digital print bar 11*b*. Each dot printed by the third digital print head 11*c* is received on top of a corresponding dot that forms the first layer 52*a* of one element of the second working 52, and forms a second layer 52*b* of the printed elements of the second working 52. This printed dot increases the height of the elements in the second working 52 without significantly affecting the lateral dimensions of the printed elements.

FIGS. 21A to 21D show four different ways in which printed dots of different heights may be formed.

Figure 21A:
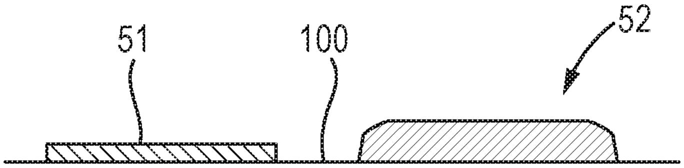
FIGS. 21A to 21D show, schematically, four different printing arrangements which may be used to print security documents according to other embodiments.

FIG. 21A shows an element of a first digitally printed working 51 and adjacent to an element of a second digitally printed working 52. In this embodiment, the element of the first digitally printed working 51 is printed in a first material and the element of the second working 52 is printed in a second material with a higher viscosity and surface tension. Accordingly, the element of the second working 52 does not spread as far when it impacts the substrate 100 and so retains a larger thickness.

Figure 21B:
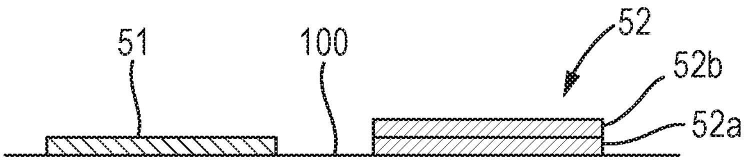
Figure 21C:
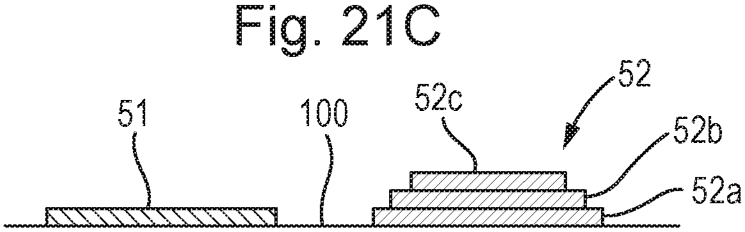
Figure 21D:
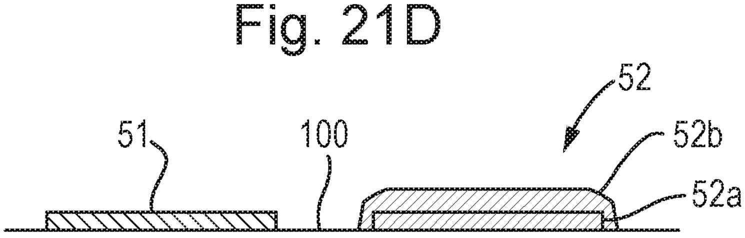

FIG. 21B shows an element of a first digitally printed working 51, which is identical to that shown in FIG. 21A, adjacent this time to an element of a second digitally printed working 52, which is formed of a first and a second layer 52*a*, 52*b* of the same material. This dot may be produced using the printing press described above with respect to FIGS. 20A and 20B in that two dots of the same size are printed down one on top of the other to form the first and second layers.

FIG. 21C shows again an element of a first digitally printed working 51, adjacent to another different type of digitally printed element of a second working 52. In this case, the element of the second working 52 is formed by three layers 52*a*, 52*b*, 52*c* printed down one on top of the other. These layers will typically by printed by three successive print heads, which may be spaced from one another along the digital print press to allow the dots time to dry before overprinting. Whereas in the previous example, the dots forming the first and second layers were printed down with the same drop size to have substantially the same lateral dimensions, in this example, the drop used for each layer is successively smaller than the preceding layer. That is, the second layer 52*b*, printed as a second dot on top of the first dot that forms the first layer 52*a*, is printed with a smaller drop size than said first dot. Accordingly, this second layer 52*b* has smaller lateral dimensions than the first layer 52*a*. The third layer 52*c* is printed as a third dot on top of the first and second dots forming the first and second layers 52*a*, 52*b*, with a smaller drop size than either of the first and second dots. Accordingly, this third layer 52*c* has smaller lateral dimensions than either of the first and second layers. This gives each element of the second working 52 an effectively pyramid shape.

Finally, FIG. 21D shows again an element of a first digitally printed working 51, adjacent to another different type of digitally printed element of a second working 52. In this example, the element of the second digitally printed working 52 is formed of a first and a second layer 52*a*, 52*b* of the same material. However, the second dot that is printed down over the first dot is printed with a larger drop size than said first dot. This second dot therefore envelops the first dot, providing a dot with greater height and slightly larger lateral dimensions. Not only does this provide that the elements of the second working 52 have a significantly greater height than the elements of the first working 51 without significantly greater lateral dimensions, but it disguises any misregsiter between the first layer 51*a* and the second layer 52*b*. This type of printed element may be printed using a digital press as shown in FIG. 20A, in which the third digital print bar 11*c* is configured to print drops that are slightly larger than that of the second print bar. For example, the second print bar may print with a drop size of 3.5 pl, while the third print bar prints with a drop size of 4.5 pl.

The invention claimed is:

1. A digitally printed security document comprising:

a security document substrate;

a first digitally printed print working on a first surface of the substrate in a first region, the first print working comprising a first array of printed dots arranged according to a first grid of lattice points having a first pitch, the first print working being printed in a first material; and a second digitally printed print working on the first surface of the substrate in a second region, the second print working comprising a second array of printed dots arranged across a second grid of lattice points having a second pitch different from the first pitch, the second print working being printed in a second material different from the first material, the first material and the second material having different optical characteristics, wherein the first region and the second region at least partially overlap one another such that the first print working and the second print working at least partially overlap one another on the first surface of the substrate.

2. A digitally printed security document according to claim 1, wherein the first grid of lattice points is a two-dimensional grid of lattice points defined by a first unit cell, and wherein the second grid of lattice points is a two-dimensional grid of lattice points defined by a second unit cell, wherein the first unit cell and second unit cell are different from one another.

3. A digitally printed security document according to claim 1, wherein at least some of the printed dots of the first array of printed dots have a smallest lateral dimension smaller than a smallest lateral dimension of the printed dots of the second array of printed dots, and/or wherein at least some of the printed dots of the second array of printed dots have a smallest lateral dimension larger than a smallest lateral dimension of the printed dots of the first array of printed dots.

4. A digitally printed security document according to claim 1, wherein the pitch of the first grid of lattice points corresponds to a print resolution of at least 600 DPI in at least one direction, and wherein the pitch of the second grid of lattice points corresponds to a print resolution of at most 600 DPI in at least one direction.

5. A digitally printed security document according to claim 1, wherein at least some of the printed dots of the first array of printed dots have a smallest lateral dimension of at most 200 micrometres and wherein at least some of the printed dots of the second array of printed dots have a smallest lateral dimension of at least 20 micrometres.

6. A digitally printed security document according to claim 1, wherein the first print working comprises a printed dot on each lattice point of the first grid of lattice points across at least a sub-region of the first region such that the first array of printed dots has the first pitch across said sub-region.

7. A digitally printed security document according to claim 1, wherein the second print working comprises a printed dot on each lattice point of the second grid of lattice points across at least a sub-region of the second region such that the second array of printed dots has the second pitch across the second sub-region.

8. A digitally printed security document according to claim 1, wherein the first print working is printed in a first colour and the second print working is printed in a second colour different from the first colour.

9. A digitally printed security document according to claim 1, wherein a plurality of composite printed elements are provided across the first surface of the substrate, wherein for each composite printed element one or more printed dots of the first print working are provided in proximity of one or more printed dots of the second print working such that said printed dots form said composite printed element.

10. A digitally printed security document according to claim 9, wherein the plurality of composite printed elements vary in one or more of their size and/or shape across the first surface of the substrate by variation in the number of printed dots of the first and/or second arrays of printed dots, the positioning of the printed dots of the first and/or second arrays of printed dots, the size of the printed dots of the first and/or second arrays of printed dots, and/or the spacing of the printed dots of the first and/or second arrays of printed dots.

11. A digitally printed security document according to claim 9, wherein the plurality of composite printed elements vary their proportional composition of printed dots of the first print working and printed dots of the second print working across the first surface of the substrate.

12. A digitally printed security document according to claim 9, wherein one or more composite printed elements are provided in the form of an alphanumeric character, symbol, or logo.

13. A digitally printed security document according to claim 8, wherein at least one of the first and second colours is not one of CMYK, and wherein preferably at least one of the first and second colours lies outside of the CMYK colour gamut.

14. A digitally printed security document according to claim 1, wherein at least one of the printed dots of the first print working has a first dot thickness in a direction perpendicular to the surface of the security document substrate, and wherein at least one of the printed dots of the second print working has a second dot thickness in the direction perpendicular to the surface of the security document substrate, the second dot thickness being greater than the first dot thickness.

15. A plurality of digitally printed security documents, each according to claim 1, wherein the first and/or second print workings provide each of the plurality of security documents with fixed content and variable content, the fixed content being the same for each of the plurality of security documents and the variable content changing between at least some of said plurality of security documents, the variable content preferably being unique to each of said plurality of security documents.

16. A method of digitally printing a security document according to claim 1, the method comprising: digitally printing a first print working on a first surface of a security document substrate in a first region, first print working comprising a first array of printed dots arranged according to a first grid of lattice points having a first pitch, the first print working being printed in a first material; digitally printing a second print working on the first surface of the substrate in a second region, the second print working comprising a second array of printed dots arranged across a second grid of lattice points having a second pitch different from the first pitch, the second print working being printed in a second material different from the first material, the first material and the second material have different optical characteristics, wherein the first region and the second region at least partially overlap one another such that the first print working and the second print working at least partially overlap one another on the first surface of the substrate.

* * * * *